United States Patent
Kamada

(10) Patent No.: US 7,477,483 B2
(45) Date of Patent: *Jan. 13, 2009

(54) PERPENDICULAR MAGNETIC RECORDING HEAD INCLUDING EXTENDED YOKE LAYER

(75) Inventor: Hiroshi Kamada, Niigata-ken (JP)

(73) Assignee: TDK Corporation, Tokyo (JP)

( * ) Notice: Subject to any disclaimer, the term of this patent is extended or adjusted under 35 U.S.C. 154(b) by 410 days.

This patent is subject to a terminal disclaimer.

(21) Appl. No.: 11/318,016

(22) Filed: Dec. 23, 2005

(65) Prior Publication Data

US 2006/0139801 A1 Jun. 29, 2006

(30) Foreign Application Priority Data

Dec. 27, 2004 (JP) .............................. 2004-377393

(51) Int. Cl.
*G11B 5/147* (2006.01)
(52) U.S. Cl. .......................... 360/125.12; 360/125.14; 360/125.15
(58) Field of Classification Search ............ 360/125.12, 360/125.14, 125.15
See application file for complete search history.

(56) References Cited

U.S. PATENT DOCUMENTS

| 6,687,084 | B2 | 2/2004 | Takahashi et al. | |
| 7,159,302 | B2* | 1/2007 | Feldbaum et al. | 29/603.12 |
| 7,180,705 | B2* | 2/2007 | Matono et al. | 360/125.12 |
| 7,181,829 | B2* | 2/2007 | Takahashi et al. | 29/603.15 |
| 2002/0080525 | A1* | 6/2002 | Sato et al. | 360/126 |
| 2005/0259357 | A1* | 11/2005 | Kameda | 360/126 |
| 2006/0109588 | A1* | 5/2006 | Le et al. | 360/126 |
| 2007/0115594 | A1* | 5/2007 | Takahashi et al. | 360/317 |

FOREIGN PATENT DOCUMENTS

| JP | 11-250416 | 9/1999 |
| JP | 2002-197615 | 7/2002 |
| JP | 2002-208114 | 7/2002 |
| JP | 2003-272111 | 9/2003 |
| JP | 2004-295987 | 10/2004 |

OTHER PUBLICATIONS

Notice of Preliminary Rejection for corresponding Japanese Patent Application Serial No. 2004-377393, dated Oct. 16, 2007.
Notification of Reasons for Refusal for corresponding Japanese Patent Application Serial No. 2004-377393, dated Dec. 14, 2006.

* cited by examiner

*Primary Examiner*—Jefferson Evans
(74) *Attorney, Agent, or Firm*—Brinks Hofer Gilson & Lione

(57) ABSTRACT

A perpendicular magnetic recording head capable of effectively inducing a recording magnetic field to a main magnetic pole front end portion and suppressing an occurrence of side fringing is provided. An auxiliary magnetic pole layer, which is a first magnetic portion, and a main magnetic pole layer, which is a second magnetic portion, disposed leaving a space to the above-described auxiliary magnetic pole layer are included, and a coil layer which applies a recording magnetic field to the above-described space between the auxiliary magnetic pole layer and the main magnetic pole layer is included. A yoke layer is disposed in contact with the above-described main magnetic pole layer, and the width dimension of the yoke layer is increased stepwise or continuously toward the rear in the height direction and the width dimension is increased stepwise or continuously from an upper surface toward a lower surface.

5 Claims, 28 Drawing Sheets

PERPENDICULAR MAGNETIC RECORDING HEAD INCLUDING EXTENDED YOKE LAYER

BACKGROUND OF THE INVENTION

1. Field of the Invention

The present invention relates to a perpendicular magnetic recording head for recording data on a recording medium, e.g., a disk having a hard surface, by applying a perpendicular magnetic field. In particular, it is an object of the present invention to provide a perpendicular magnetic recording head capable of suppressing an occurrence of fringing in a recording pattern and improving a recording efficiency.

2. Description of the Related Art

A perpendicular magnetic recording head by using a perpendicular magnetic recording system is a device for recording magnetic data on a recording medium, e.g., a disk, with a high density. A general structure of this perpendicular magnetic recording head is configured to include an auxiliary magnetic pole layer made of a ferromagnetic material and a main magnetic pole layer made of a ferromagnetic material and disposed leaving a space to this auxiliary magnetic pole layer.

A front end of the above-described auxiliary magnetic pole layer and a front end of the above-described main magnetic pole layer appear on a facing-surface opposed to the recording medium and are magnetically coupled to each other at the rear in a height direction. A coil layer is disposed in between the above-described auxiliary magnetic pole layer and the above-described main magnetic pole layer. When a recording magnetic field is induced to the above-described auxiliary magnetic pole layer and the above-described main magnetic pole layer through energization of this coil, a leakage recording magnetic field is generated in between the above-described auxiliary magnetic pole layer and the above-described main magnetic pole layer on the facing-surface opposed to the recording medium, this leakage recording magnetic field passes through the recording medium and, thereby, a recording signal is recorded on the recording medium.

Here, the ferromagnetic material used for the main magnetic pole layer has a high saturation magnetic flux density, but in general, the magnetic permeability is low. Therefore, the recording magnetic field induced to the main magnetic pole layer is difficult to induce to the front end of the above-described main magnetic pole layer. Consequently, there is also a perpendicular magnetic recording head in which a yoke layer made of a material having a large magnetic permeability is disposed in contact with the above-described main magnetic pole layer with the intention of inducing the recording magnetic field easily to the front end of the main magnetic pole layer.

In the perpendicular magnetic recording head including the yoke layer disposed as described above, it is effective to bring the above-described yoke layer close to the facing-surface opposed to the recording medium in order to effectively induce the recording magnetic field to the front end of the main magnetic pole. However, if the above-described yoke layer is excessively brought close to the facing-surface opposed to the recording medium, a recording magnetic field tends to also flow from the front end of this yoke layer and, thereby, a so-called side fringing problem occurs.

A perpendicular magnetic recording head, in which a front-end surface 35a of a yoke layer is formed from a sloped surface or a curved surface that approaches a facing-surface opposed to a recording medium with increasing proximity to an upper surface from a lower surface, is disclosed in FIG. 3 and FIG. 14 of U.S. Pat. No. 6,687,084 as a perpendicular magnetic recording head capable of suppressing such a side fringing problem, while another type of sloped surface or curved surface is also disclosed in FIG. 1 and FIG. 10.

In the perpendicular magnetic recording head disclosed in U.S. Pat. No. 6,687,084, since the yoke layer 35 made of a material having a large magnetic permeability is disposed in contact with a main magnetic pole layer 24, a recording magnetic field can be induced to the front end of the main magnetic pole layer 24. Furthermore, since the front-end surface 35a of the above-described yoke layer 35 is formed as a sloped surface or the like and the cross-sectional area is decreased, the magnetic volume of the yoke layer 35 is reduced in the neighborhood of the facing-surface opposed to the recording medium. Therefore, flowing of the recording magnetic field from the front-end surface of the yoke layer 35 to the recording medium can be suppressed and, thereby, an occurrence of side fringing can be suppressed.

In the perpendicular magnetic recording head disclosed in the above-described U.S. Pat. No. 6,687,084, a region in which the front-end surface 35a of the yoke layer 35 is disposed is formed in such a way that the thickness dimension is increased continuously toward the rear in the height direction. However, the height dimension is constant on the side behind the front-end surface 35a in the height direction. Furthermore, it is not clear whether the width dimension from the upper surface toward the lower surface of the above-described yoke layer 35 is constant or not. In the region in which the film thickness of the front-end surface of the above-described yoke layer is varied (inclined), it is not clear from the descriptions with respect to FIG. 1, FIG. 10, and the like whether the width dimension is varied in relation to the film thickness.

Therefore, the above-described yoke layer 35 in U.S. Pat. No. 6,687,084 is unsatisfactory to effectively induce the recording magnetic field to the main magnetic pole layer 24, since there is a limit in increasing the magnetic volume as a whole.

SUMMARY OF THE INVENTION

The present invention is to overcome the above-described known problems. Accordingly, it is an object of the present invention to provide a perpendicular magnetic recording head capable of effectively inducing a recording magnetic field to a main magnetic pole front end and suppressing an occurrence of side fringing.

The present invention provides a perpendicular magnetic recording head for recording magnetic data on a recording medium, the perpendicular magnetic recording head including a first magnetic portion, a second magnetic portion disposed leaving a space to the above-described first magnetic portion, and a coil layer which is disposed in the above-described space between the above-described first magnetic portion and the second magnetic portion and which applies a recording magnetic field to the above-described first magnetic portion and the above-described second magnetic portion, wherein a yoke layer is disposed in contact with the above-described second magnetic portion, and the width dimension in a direction orthogonal to a height direction of the front end of the above-described yoke layer is increased stepwise or continuously toward the rear in the height direction and is increased stepwise or continuously in a direction farther from the above-described second magnetic portion.

In this case, preferably, the above-described yoke layer is configured to include a region having a film thickness dimension increasing stepwise or continuously toward the rear in the height direction.

Preferably, the above-described yoke layer is configured to have a magnetic permeability larger than that of the above-described second magnetic layer.

In this case, it is preferable that the saturation magnetic flux density of the above-described yoke layer increases with increasing proximity to the above-described second magnetic portion, since the magnetic flux can easily be concentrated on the second magnetic portion.

The second magnetic portion may be disposed in the side nearer to a leading edge than is the above-described first magnetic portion. Alternatively, the second magnetic portion may be disposed in the side nearer to a trailing edge than is the above-described first magnetic portion.

In the perpendicular magnetic recording head of the present invention, the width dimension of the yoke layer is configured to be increased stepwise or continuously toward the rear in the height direction and is configured to be increased stepwise or continuously in a direction farther from the main magnetic pole layer. That is, the width dimension of the yoke layer is decreased with increasing proximity to the facing-surface opposed to the recording medium and is decreased with increasing proximity to the main magnetic pole layer. Therefore, the magnetic volume of the above-described yoke layer can be decreased with increasing proximity to the above-described main magnetic pole layer. Consequently, the recording magnetic field is resistant to flowing from the above-described yoke layer to the above-described recording medium and, therefore, an occurrence of side fringing can be suppressed.

The width dimension of the yoke layer is configured to be increased toward the rear in the height direction (Y2 direction shown in the drawing) and the magnetic volume of the above-described yoke layer is increased in a direction farther from the facing-surface opposed to the recording medium. Consequently, the magnetic volume of the entire yoke layer can be increased and, thereby, the recording magnetic field can easily be induced to the main magnetic pole layer.

DESCRIPTION OF THE PREFERRED EMBODIMENTS

Figure 1:
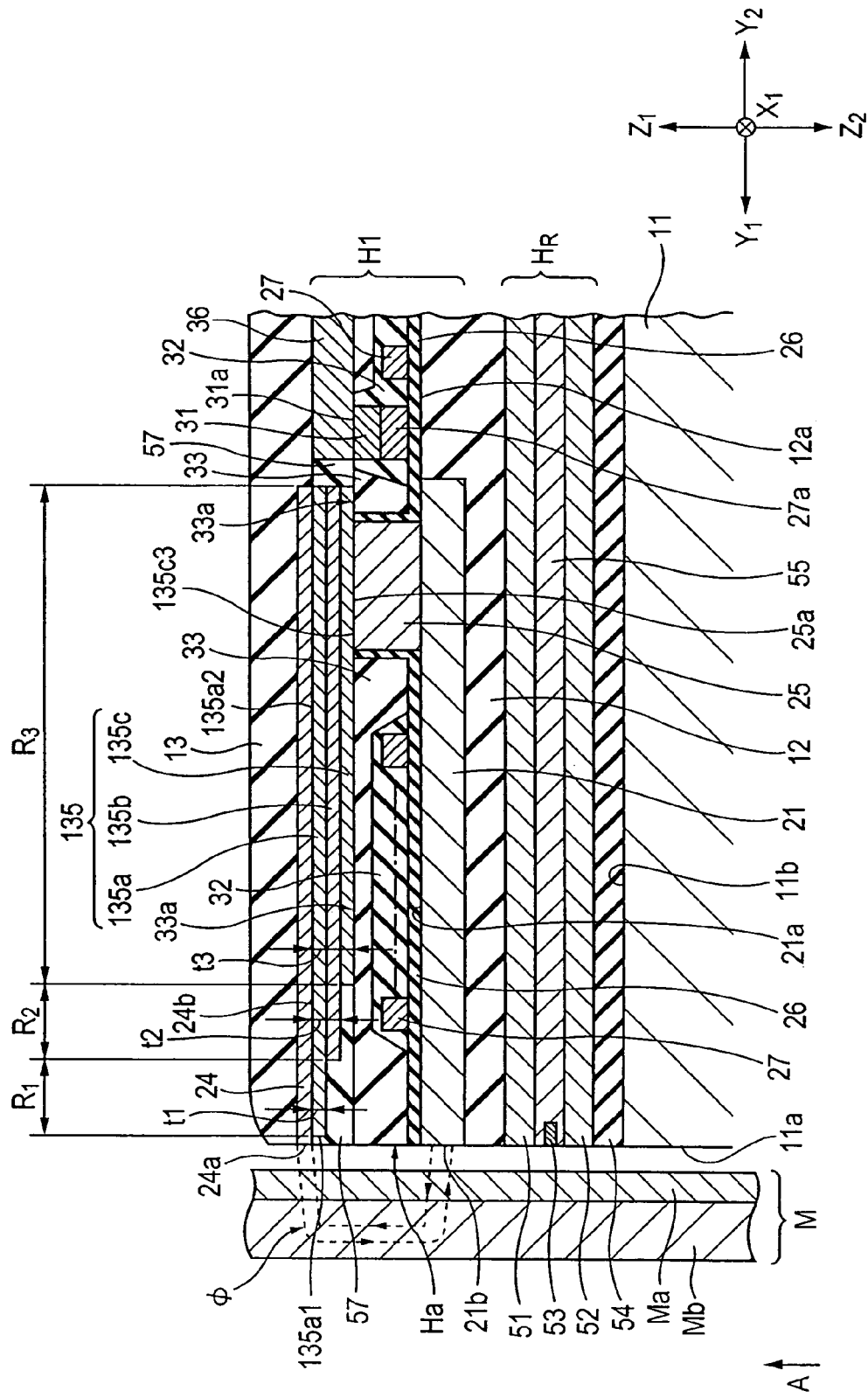
FIG. 1 is a vertical sectional view showing a structure of a perpendicular magnetic recording head according to a first embodiment of the present invention.

FIG. 1 is a vertical sectional view showing a structure of a perpendicular magnetic recording head according to the first embodiment of the present invention.

A perpendicular magnetic recording head H1 shown in FIG. 1 applies a perpendicular magnetic field to a recording medium M, and magnetizes a hard surface Ma of the recording medium M in a perpendicular direction.

The above-described recording medium M is in the shape of a disk, includes the hard surface Ma, which exhibits high residual magnetization, on the surface and a soft surface Mb, which exhibits a high magnetic permeability, in the inside, and is rotated about the disk center serving as a rotation axis center.

A slider 11 of the above-described perpendicular magnetic recording head H1 is formed from a ceramic material, e.g., $Al_2O_3$.TiC. A facing-surface 11a of the slider 11 is opposed to the above-described recording medium M, and when the recording medium M is rotated, the slider 11 floats from the surface of the recording medium M due to an air stream on the surface, or the slider 11 slide over the recording medium M. In FIG. 1, the moving direction of the recording medium M relative to the slider 11 is a direction indicated by an arrow A shown in the drawing (Z1 direction shown in the drawing). The perpendicular magnetic recording head H is disposed on the trailing-side end surface of the slider 11.

A nonmagnetic insulating layer 54 made of an inorganic material, e.g., $Al_2O_3$ or $SiO_2$, is disposed on a side end surface 11b of the above-described slider 11. A reading portion $H_R$ is disposed on this nonmagnetic insulating layer 54.

The above-described reading portion $H_R$ is composed of a lower shield layer 52, a gap layer 55, a magnetoresistive sensor 53, and an upper shield layer 51 in that order from the bottom. The above-described magnetoresistive sensor 53 is an anisotropic magnetoresistive (AMR) sensor, a giant magnetoresistive (GMR) sensor, a tunnel type magnetoresistive (TMR) sensor, or the like.

A nonmagnetic insulating layer 12 made of an inorganic material, e.g., $Al_2O_3$ or $SiO_2$, is disposed on the above-described upper shield layer 51. The perpendicular magnetic recording head H1 for recording of the present invention is disposed on the above-described nonmagnetic insulating layer 12. The perpendicular magnetic recording head H1 is covered with a protective layer 13 formed from inorganic nonmagnetic insulating material or the like. A facing-surface Ha of the above-described perpendicular magnetic recording head H1 is substantially flush with the facing-surface 11a of the above-described slider 11, the facing-surfaces opposed to the recording medium.

In the above-described perpendicular magnetic recording head H1, an auxiliary magnetic pole layer 21, which is a first magnetic portion, is disposed through plating of Ni—Fe, Fe—Ni (Fe-rich), Fe—Co—Rh, Fe—Co, Fe—Co—Ni, or the like.

The above-described nonmagnetic insulating layer 12 is disposed under the above-described auxiliary magnetic pole gayer 21 (in between the auxiliary magnetic pole layer 21 and the side end surface 11b of the slider 11) and around the above-described auxiliary magnetic pole layer 21. As shown in FIG. 1, a surface (upper surface) 21a of the auxiliary magnetic pole layer 21 and a surface (upper surface) 12a of the above-described nonmagnetic insulating layer 12 are positioned on the same plane.

As shown in FIG. 1, a connection layer 25 made of Ni—Fe or the like is disposed on the surface 21a of the above-described auxiliary magnetic pole layer 21 on the side behind the above-described facing-surface Ha in the height direction (Y2 direction in the drawing).

A nonmagnetic insulating layer 26 made of $Al_2O_3$ or the like is disposed on the surface 21a of the above-described auxiliary magnetic pole layer 21 and the surface 12a of the above-described nonmagnetic insulating layer 12 around the above-described connection layer 25. A coil layer 27 made of an electrically conductive material, e.g., Cu, is disposed on this nonmagnetic insulating layer 26. This coil layer 27 is formed by a frame plating or the like, and is formed into the shape of a spiral pattern with the predetermined number of windings around the above-described connection layer 25. A raised layer 31 also made of an electrically conductive material, e.g., Cu, is disposed on the connection end 27a on the winding center side of the coil layer 27.

The above-described coil layer 27 and the raised layer 31 are covered with an insulating layer 32 made of an organic material, e.g., a resist material, and are further covered with another insulating layer 33.

Preferably, the above-described insulating layer 33 is formed from an inorganic insulating material. At least one selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON can be used as the above-described inorganic insulating material.

A surface (upper surface) 25a of the above-described connection layer 25, a surface (upper surface) 31a of the raised layer 31, and a surface (upper surface) 33a of the insulating layer 33 are processed to become a flattened flush surface. Such a flattened flush surface is formed by using a chemical mechanical polishing (CMP) technique or the like.

In the perpendicular magnetic recording head of an embodiment shown in FIG. 1, a yoke layer 135 made of a high-magnetic permeability material, e.g., permalloy (Ni—Fe), is disposed on the above-described insulating layer 33. This yoke layer 135 is formed having a magnetic permeability higher than that of a main magnetic pole layer 24 described below. The base end portion of the yoke layer 135 is magnetically coupled to the surface 25a of the above-described connection layer 25.

As shown in FIG. 1, the surroundings of the above-described yoke layer 135 are filled in with an insulating layer 57, and the above-described insulating layer 57 appears on the facing-surface Ha opposed to the above-described recording medium. A portion denoted by reference numeral 135a 1 constituting the front end of the above-described yoke layer 135 is positioned behind the above-described facing-surface Ha in the height direction. In the present invention, an upper surface of the above-described insulating layer 57 and an upper surface of the above-described yoke layer 135 are made to be a flattened flush surface by using a CMP technique or the like.

Preferably, the above-described insulating layer 57 is formed from an inorganic insulating material. At least one selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON can be used as the above-described inorganic insulating material.

In the present invention, the main magnetic pole layer 24, which is a second magnetic layer, made of a high-saturation magnetic flux density material, e.g., Fe—Co—Rh, Fe—Co, and Fe—Co—Ni, is disposed over the above-described flattened insulating layer 57 and yoke layer 135. As shown in FIG. 1, the above-described main magnetic pole layer 24 is disposed at a position on the trailing side which is an upward side of the above-described auxiliary magnetic pole layer 21 (Z1 direction side in the drawing).

As shown in FIG. 1, a lead layer 36 is disposed on the surface 31a of the above-described raised layer 31, and a recording current can be supplied from the lead layer 36 to the above-described raised layer 31 and the coil layer 27. The above-described yoke layer 135 and the above-described lead layer 36 are covered with the above-described protective layer 13.

Figure 2:
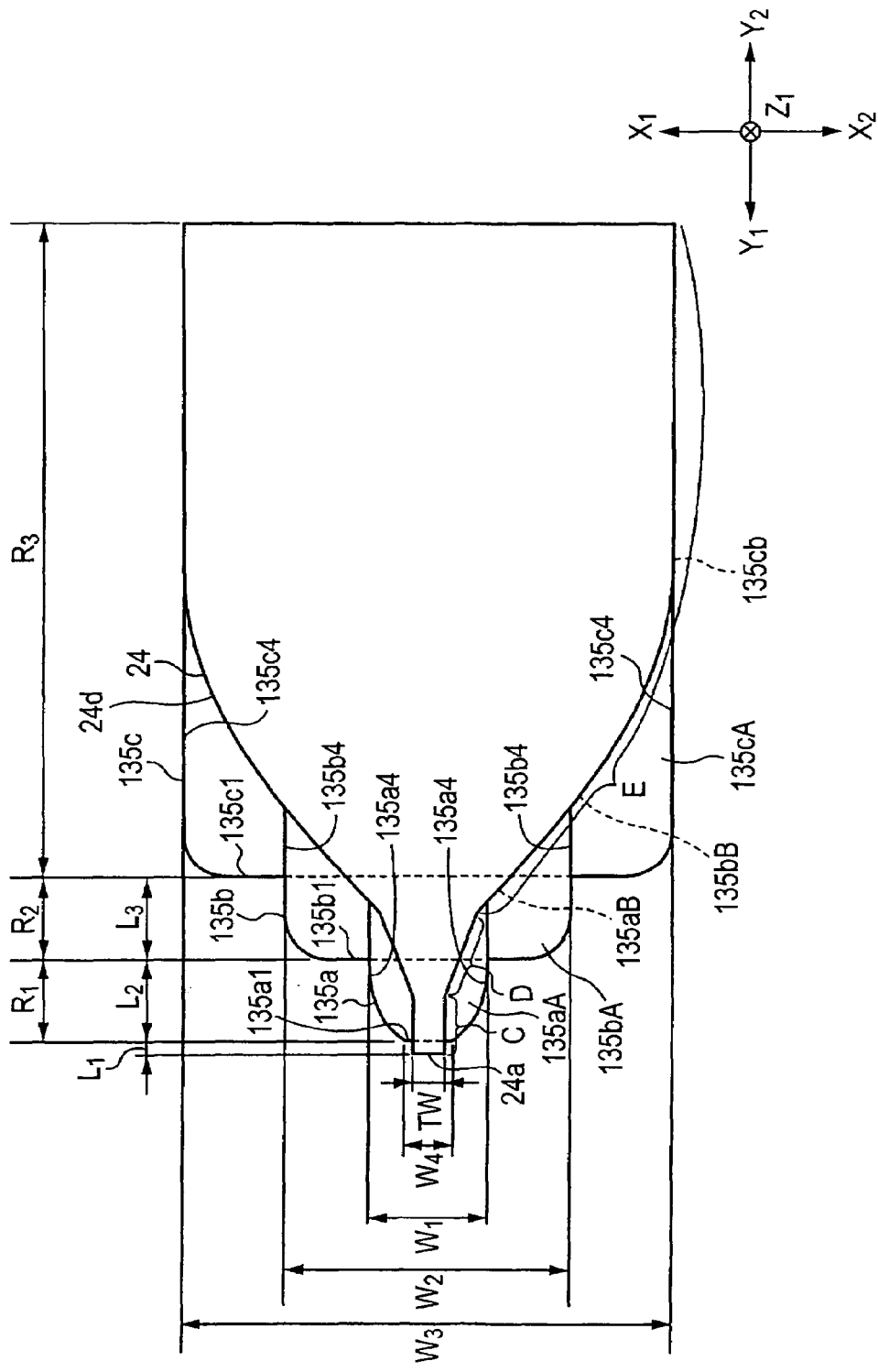
FIG. 2 is a plan view of the perpendicular magnetic recording head shown in FIG. 1, viewed from immediately above.
Figure 3:
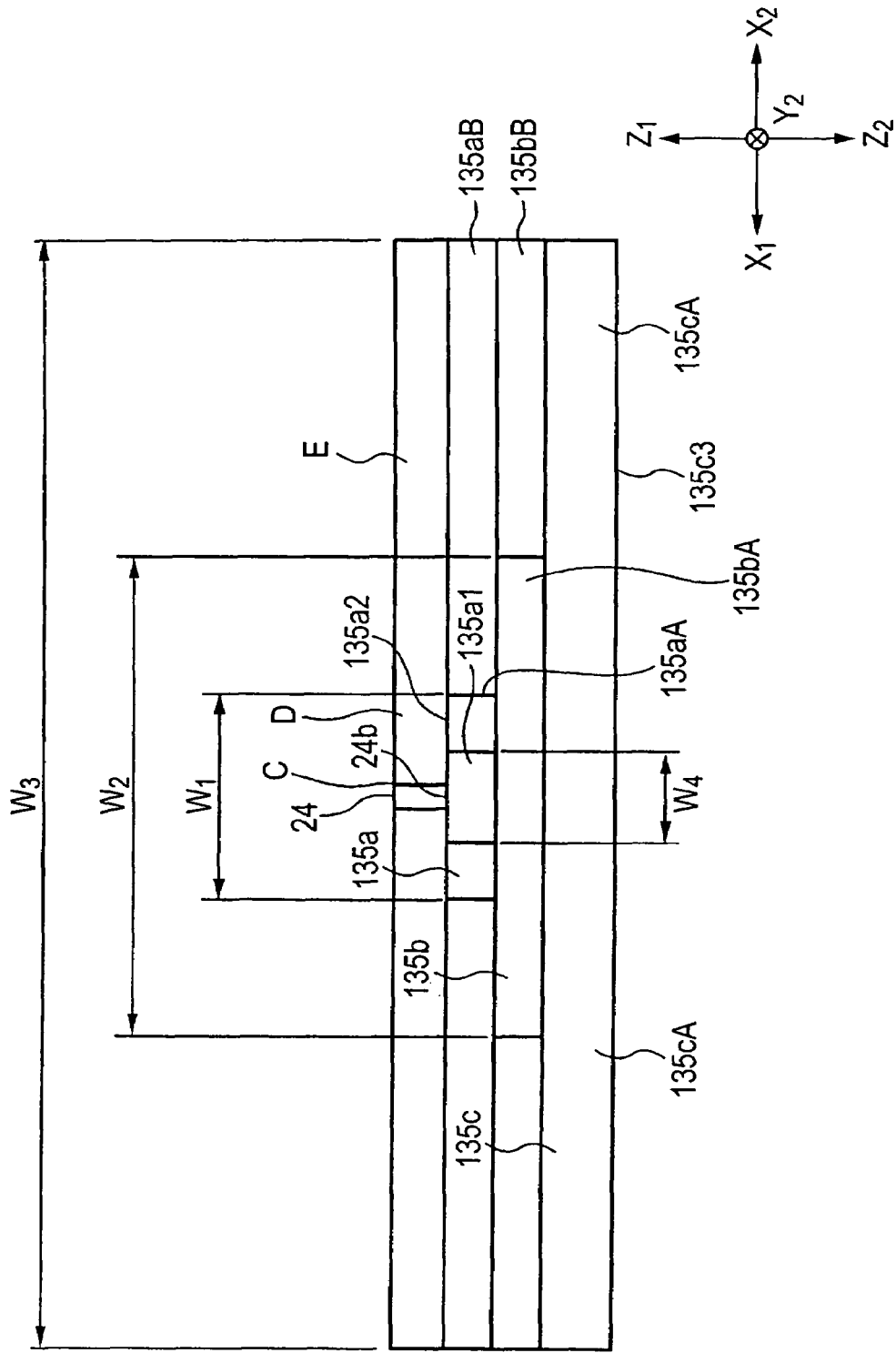
FIG. 3 is a partial front view of the above-described perpendicular magnetic recording head shown in FIG. 1, viewed from the side of a facing-surface opposed to a recording medium.

FIG. 2 is a plan view of the perpendicular magnetic recording head shown in FIG. 1, viewed from immediately above (Z1 direction shown in FIG. 1). FIG. 3 is a partial front view of the above-described main magnetic pole layer 24 and the above-described yoke layer 135 of the above-described perpendicular magnetic recording head H1 shown in FIG. 1, viewed from the side of the facing-surface Ha opposed to the recording medium (Y1 direction side shown in FIG. 1). As shown in FIG. 2 and FIG. 3, the above-described main magnetic pole layer 24 is composed of a front-end portion C having a constant width dimension (=track width Tw), a middle portion D having predetermined angles with respect to side surfaces of the above-described front-end portion C in such a way that the width dimension is gently divergent from the above-described front-end portion C toward the rear, and a rear-end portion E which has larger predetermined angles with respect to side surfaces of the above-described front-end portion C and which is disposed from the above-described middle portion D toward the rear.

The present invention will be described below.

As shown in FIG. 1 to FIG. 3, in the above-described perpendicular magnetic recording head H1, the above-described yoke layer 135 is constructed by laminating three layers of a first layer 135a, a second layer 135b, and a third layer 135c in that order from above. Therefore, in the above-described yoke layer 135, an upper surface 135a2 of the first layer 135a serves as an upper surface of the yoke layer 135, and a lower surface 135c3 of the third layer 135c serves as a lower surface of the yoke layer 135.

The front-end portion 135a1 of the above-described first layer 135a is configured to serve as a front end of the yoke layer 135.

As shown in FIG. 2, the above-described first layer 135a is configured to include a front portion 135aA having a predetermined maximum width dimension W1 and extending toward the rear in the height direction and a rear portion 135aB extending from this front portion 135aA toward the rear in the height direction.

The above-described second layer 135b is configured to include a front portion 135bA having a predetermined maximum width dimension W2 and extending toward the rear in the height direction and a rear portion 135bB extending from this front portion 135bA toward the rear in the height direction.

The above-described third layer 135c is configured to include a front portion 135cA having a predetermined maximum width dimension W3 and extending toward the rear in the height direction and a rear portion 135cB extending from this front portion 135cA toward the rear in the height direction.

As shown in FIG. 2, the above-described front portion 135aA of the above-described first layer 135a is extended from the above-described front-end surface 135a1 toward the rear in the height direction up to the position at which side-edge portions 135a4 of the above-described first layer 135a are opposed to the above-described main magnetic pole layer 24 in a film thickness direction (Z1 or Z2 direction shown in the drawing). The above-described rear portion 135aB is constructed from the position at which the side-edge portions 135a4 of the above-described first layer 135a are opposed to the main magnetic pole layer 24 in the film thickness direction toward the rear in the height direction. As shown in FIG. 2, the above-described rear portion 135aB is formed into the shape exhibiting a plan view in accordance with the shape formed by an outer edge 24d of the above-described main magnetic pole layer 24, when viewed from immediately above.

Likewise, the above-described front portion 135bA of the above-described second layer 135b is extended from the front-end surface 135b1 of the above-described second layer 135b toward the rear in the height direction up to the position at which side-edge portions 135b4 of the above-described second layer 135b are opposed to the above-described main magnetic pole layer 24 in the film thickness direction. The above-described rear portion 135bB is constructed from the position at which the side-edge portions 135b4 of the above-described second layer 135b are opposed to the main magnetic pole layer 24 in the film thickness direction toward the rear in the height direction. As shown in FIG. 2, the above-described rear portion 135bB is formed into the shape exhibiting a plan view in accordance with the shape formed by the outer edge 24d of the above-described main magnetic pole layer 24, when viewed from immediately above.

Likewise, the above-described front portion 135cA of the above-described third layer 135c is extended from the above-described front-end surface 135c1 of the above-described third layer 135c toward the rear in the height direction up to the position at which side-edge portions 135c4 of the above-described third layer 135c are opposed to the above-described main magnetic pole layer 24 in the film thickness direction. The above-described rear portion 135cB is constructed from the position at which the side-edge portions 135c4 of the above-described third layer 135c are opposed to the main magnetic pole layer 24 in the film thickness direction toward the rear in the height direction. As shown in FIG. 2, the above-described rear portion 135cB is formed into the shape exhibiting a plan view in accordance with the shape formed by an outer edge 24d of the above-described main magnetic pole layer 24, when viewed from immediately above.

Since the above-described rear portion 135aB of the above-described first layer 135a, the above-described rear portion 135bB of the above-described second layer 135b, and the above-described rear portion 135cB of the above-described third layer 135c exhibit the above-described plan views in accordance with the shape formed by the outer edge 24d of the above-described main magnetic pole layer 24, as described above, an entire magnetic volume of the above-described first layer 135a, the above-described second layer 135b, and the above-described third layer 135c can be increased, so that a recording magnetic field can easily be induced to the main magnetic pole.

As shown in FIG. 1 and FIG. 3, the upper surface 135a2 of the above-described first layer 135a is disposed in contact with the lower surface 24b of the above-described main magnetic pole layer 24. The above-described second layer 135b is disposed under the above-described first layer 135a while being in contact therewith. The front-end surface 135b1 of the above-described second layer 135b is disposed at a position a predetermined distance L2 from the front-end surface 135a1 of the above-described first layer 135a. The front-end surface 135c1 of the above-described third layer 135c is disposed at a position a predetermined distance L3 from the front-end surface 135b1 of the above-described second layer 135b. Therefore, as shown in FIG. 1 and FIG. 2, the front-end surface 135a1 of the above-described first layer 135a is constructed as the front-end surface of the above-described yoke layer 135. With respect to the rear side in the height direction (Y2 direction shown in the drawing) of the above-described yoke layer 135, a region R1 in which the above-described first layer 135a is disposed alone, a region R2 in which two layers of the above-described first layer 135a and the above-described second layer 135b are disposed, and a region R3 in which three layers of the above-described first layer 135a, the above-described second layer 135b, and the above-described third layer 135c are disposed are included. For example, the above-described distance L2 is 0.01 to 100 µm, and the above-described distance L3 is 0.01 to 100 µm.

As shown in FIG. 2, the front-end surface 135a1 of the above-described first layer 135a is disposed at a position a predetermined distance L1 behind the front-end surface 24a (facing-surface Ha opposed to the recording medium) of the above-described main magnetic pole layer 24 in the height direction (Y2 direction shown in FIG. 1). The above-described insulating layer 57 is filled in the side nearer to the facing-surface Ha opposed to the recording medium (Y1 direction shown in the drawing, that is, a side opposite to the rear in the height direction) than is the front-end surface 135a1 of the above-described first layer 135a. Therefore, the front-end surface 135a1 of the above-described first layer 135a does not appear on the facing-surface Ha opposed to the recording medium. In the above-described yoke layer 135, the above-described distance L1 from the front-end surface 24a (facing-surface Ha opposed to the recording medium) of the above-described main magnetic pole layer 24 to the front-end surface 135a1 of the above-described first layer 135a corresponds to a recess. For example, the above-described distance L1 is 0 to 10 µm.

As shown in FIG. 2 and FIG. 3, the maximum width dimension W1 of the above-described front portion 135aA of the above-described first layer 135a is formed to become smaller than the maximum width dimension. W2 of the above-described front portion 135bA of the above-described second layer 135b. The maximum width dimension W2 of the above-described front portion 135bA of the above-described second layer 135b is formed to become smaller than the maximum width dimension W3 of the above-described front portion 135cA of the above-described third layer 135c. Consequently, from the viewpoint of the above-described front portions 135aA, 135bA, and 135cA, the above-described yoke layer 135 is constructed in such a way that the width dimension is increased stepwise from W1 to W2 and from W2 to W3 toward the rear in the height direction (Y2 direction shown in the drawing). For example, the relationship among the above-described width dimension W1, the above-described width dimension W2, and the above-described width dimension W3 is represented by 0.01 µm≦W1≦W2≦W3≦100 µm.

As shown in FIG. 2, the width dimension W4 in a direction (X1 or X2 direction shown in the drawing) orthogonal to the height direction (Y1 or Y2 direction shown in the drawing) of the front-end surface 135a1, which is the front end of the above-described yoke layer 135, of the above-described first layer 135a is increased to the above-described width dimension W1, to the above-described width dimension W2, and to the above-described width dimension W3 toward the rear in the height direction (Y2 direction shown in the drawing).

As shown in FIG. 1, the above-described yoke layer 135 in the above-described region R1 is constructed having a film thickness dimension t1 equal to the film thickness dimension of the above-described first layer 135a. The yoke layer 135 in the above-described region R2 is constructed having a film thickness dimension t2 which is a total of the film thickness dimensions of the above-described first layer 135a and the above-described second layer 135b. The yoke layer 135 in the above-described region R3 is constructed having a film thickness dimension t3 which is a total of the film thickness dimensions of the above-described first layer 135a, the above-described second layer 135b, and the above-described third layer 135c. That is, the above-described yoke layer 135 is constructed in such a way that the film thickness dimension is increased stepwise from t1 to t2 and from t2 to t3 toward the rear in the height direction (Y2 direction shown in the drawing). For example, the above-described film thickness dimension t1, the above-described film thickness dimension t2, and the above-described film thickness dimension t3 are configured to increase stepwise within the range of 0.01 to 10 µm.

As shown in FIG. 3, from the viewpoint of the above-described front portions 135aA, 135bA, and 135cA, the above-described yoke layer 135 is constructed in such a way that the above-described width dimension W1 of the above-described front portion 135aA of the first layer 135a disposed as an uppermost layer (Z1 direction-side layer in the drawing) becomes the smallest, the maximum width dimension W2 of the above-described front portion 135bA of the second layer 135b disposed under the first layer 135a and disposed as a middle layer becomes larger than the maximum width dimension W1 of the above-described front portion 135aA of the above-described first layer 135a, and the maximum width dimension W3 of the third layer 135c disposed as a lowermost layer (Z2 direction shown in the drawing) becomes larger than the above-described width dimension W1 of the above-described front portion 135aA of the first layer 135a and the above-described width dimension W2 of the above-described front portion 135bA of the second layer 135b. That is, from the viewpoint of the above-described front portions 135aA, 135bA, and 135cA, the above-described yoke layer 135 is constructed in such a way that the above-described width dimension is increased stepwise from W1 to W2 and from W2 to W3 from the upper surface 135a2, which is the upper surface of the yoke layer 135, of the first layer 135a toward the lower surface 135c3, which is the lower surface of the yoke layer 135, of the third layer 135c (toward Z2 direction shown in the drawing, that is, in a downward direction).

In the perpendicular magnetic recording head H1 of the present invention, the above-described main magnetic pole layer 24 is formed from a material exhibiting a high saturation magnetic flux density. However, in general, since the material exhibiting a high saturation magnetic flux density has a low magnetic permeability, the recording magnetic field induced to the main magnetic pole layer 24 is difficult to induce to the front-end surface 24a of the above-described main magnetic pole layer. Consequently, the above-described yoke layer 135 made of a material having a large magnetic permeability is disposed in contact with the above-described main magnetic pole layer 24 and, thereby, the recording magnetic field can easily be induced to the front-end surface 24a of the main magnetic pole layer 24.

Here, in order to effectively induce the recording magnetic field to the front-end surface 24a of the main magnetic pole layer 24, it is effective to bring the above-described yoke layer 135 close to the facing-surface Ha opposed to the recording medium. However, if the above-described yoke layer 135 is excessively brought close to the facing-surface Ha opposed to the recording medium, the recording magnetic field becomes easy to also flow from this yoke layer 135 to the recording medium M and, thereby, a so-called side fringing problem occurs.

In the perpendicular magnetic recording head H1 of the present invention, both the above-described width dimension and the thickness dimension of the front-end surface 135a1, which serves as the front end of the above-described yoke layer 135, of the above-described first layer 135a are configured to increase (become divergent) stepwise toward the rear in the height direction (Y2 direction shown in the drawing). That is, the above-described yoke layer 135 is constructed in such a way that both the width dimension and the thickness dimension are decreased toward the facing-surface Ha opposed to the recording medium and, therefore, the magnetic volume of the above-described yoke layer 135 can be reduced stepwise toward the facing-surface Ha opposed to the recording medium. Consequently, even when the above-described yoke layer 135 is brought close to the facing-surface Ha opposed to the above-described recording medium in order to effectively induce the recording magnetic field to the above-described main magnetic pole layer 24, the recording magnetic field is resistant to flowing from the above-described yoke layer 135 to the above-described recording medium M, so that an occurrence of side fringing can be suppressed.

Since both the width dimension and the thickness dimension of the above-described yoke layer 135 are configured to increase toward the rear in the height direction (Y2 direction shown in the drawing), the magnetic volume is increased in a direction farther from the facing-surface Ha opposed to the recording medium. Consequently, the magnetic volume of the above-described yoke layer 135 as a whole can be increased, so that the recording magnetic field can easily be induced to the above-described main magnetic pole layer 24.

Furthermore, the above-described yoke layer 135 is constructed in such a way that the width dimension W4 is increased from the upper surface 135a2, which constitutes the upper surface of the yoke layer 135, of the first layer 135a toward the lower surface 135c3, which constitutes the lower surface of the yoke layer 135, of the third layer 135c, that is, the width dimension W4 is increased in a direction farther from the above-described main magnetic pole layer 24. Consequently, the magnetic volume of the above-described yoke layer 135 as a whole can be further increased, so that the recording magnetic field can easily be induced to the above-described main magnetic pole layer 24 effectively.

As described above, in the perpendicular magnetic recording head H1 of the present invention, even when the above-described yoke layer 135 is brought close to the facing-surface Ha opposed to the recording medium in order to effectively induce the recording magnetic field to the main magnetic pole layer 24, an occurrence of side fringing can be suppressed since the magnetic volume of the above-described yoke layer 135 is decreased toward facing-surface Ha opposed to the magnetic recording medium. In addition, since the magnetic volume of the yoke layer 135 is configured to increase as a whole, the recording magnetic field can easily be induced to the above-described main magnetic pole layer 24 effectively.

Figure 4:
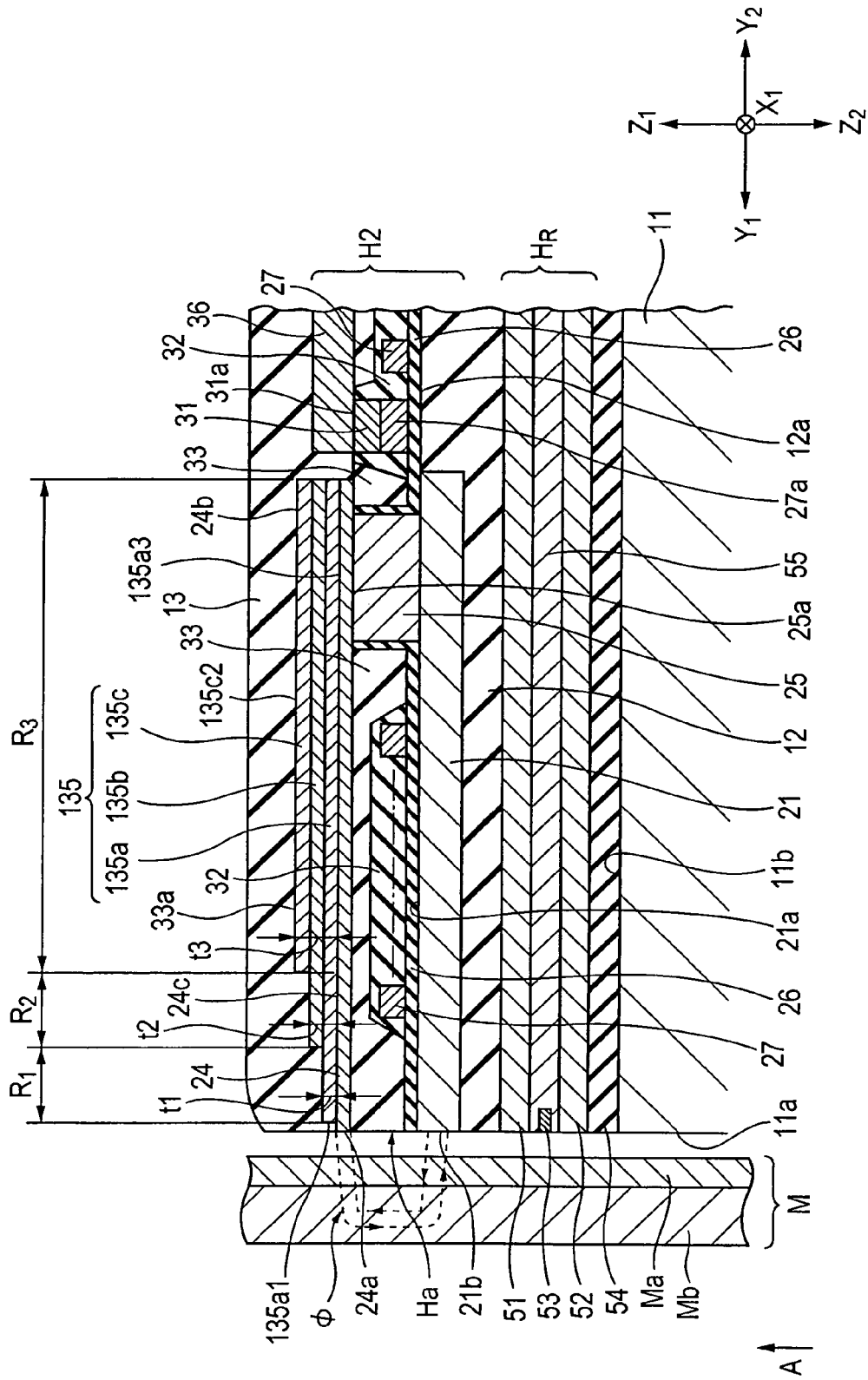
FIG. 4 is a vertical sectional view showing a structure of a perpendicular magnetic recording head according to a second embodiment of the present invention.
Figure 5:
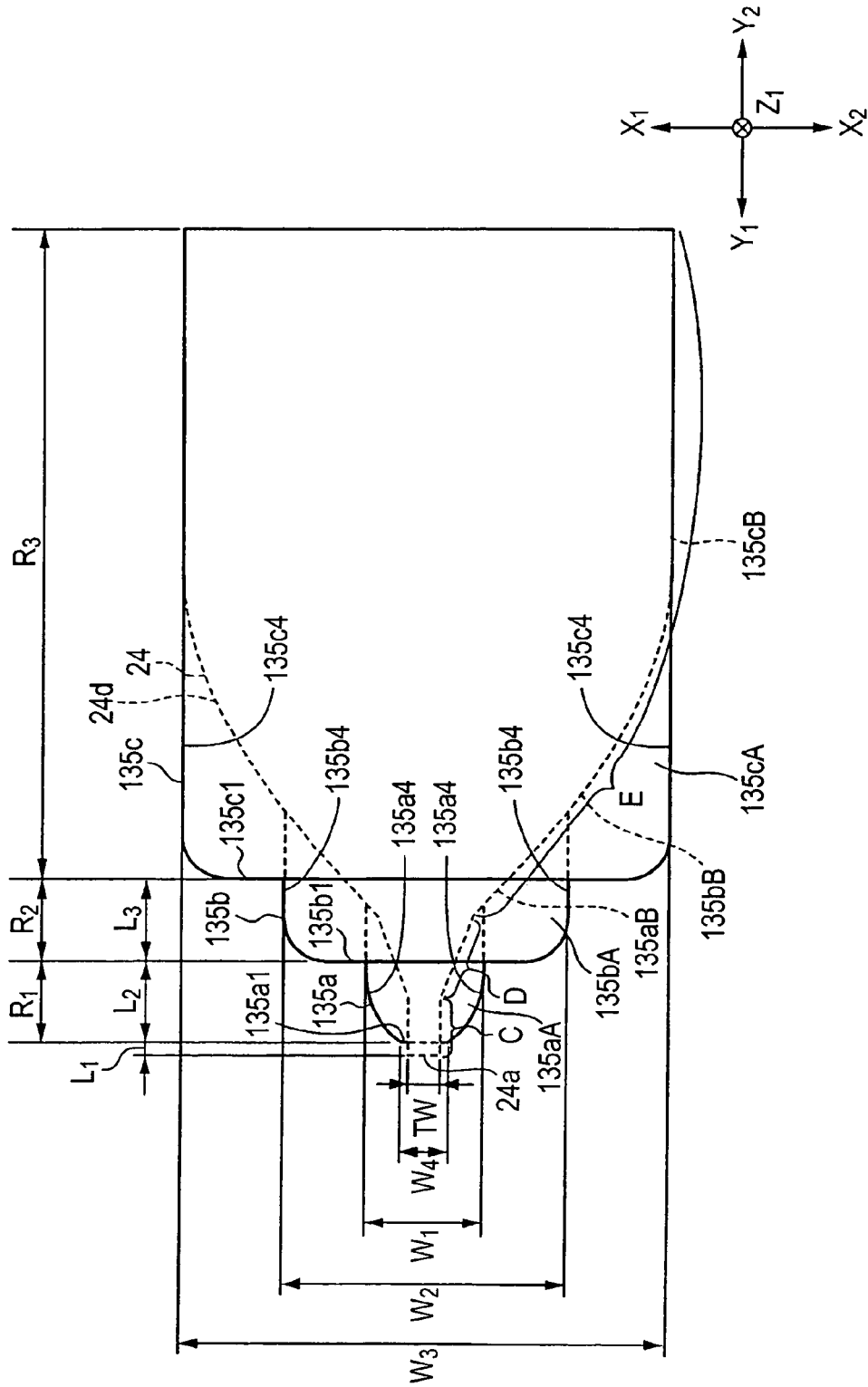
FIG. 5 is a plan view of the perpendicular magnetic recording head shown in FIG. 4, viewed from immediately above.
Figure 6:
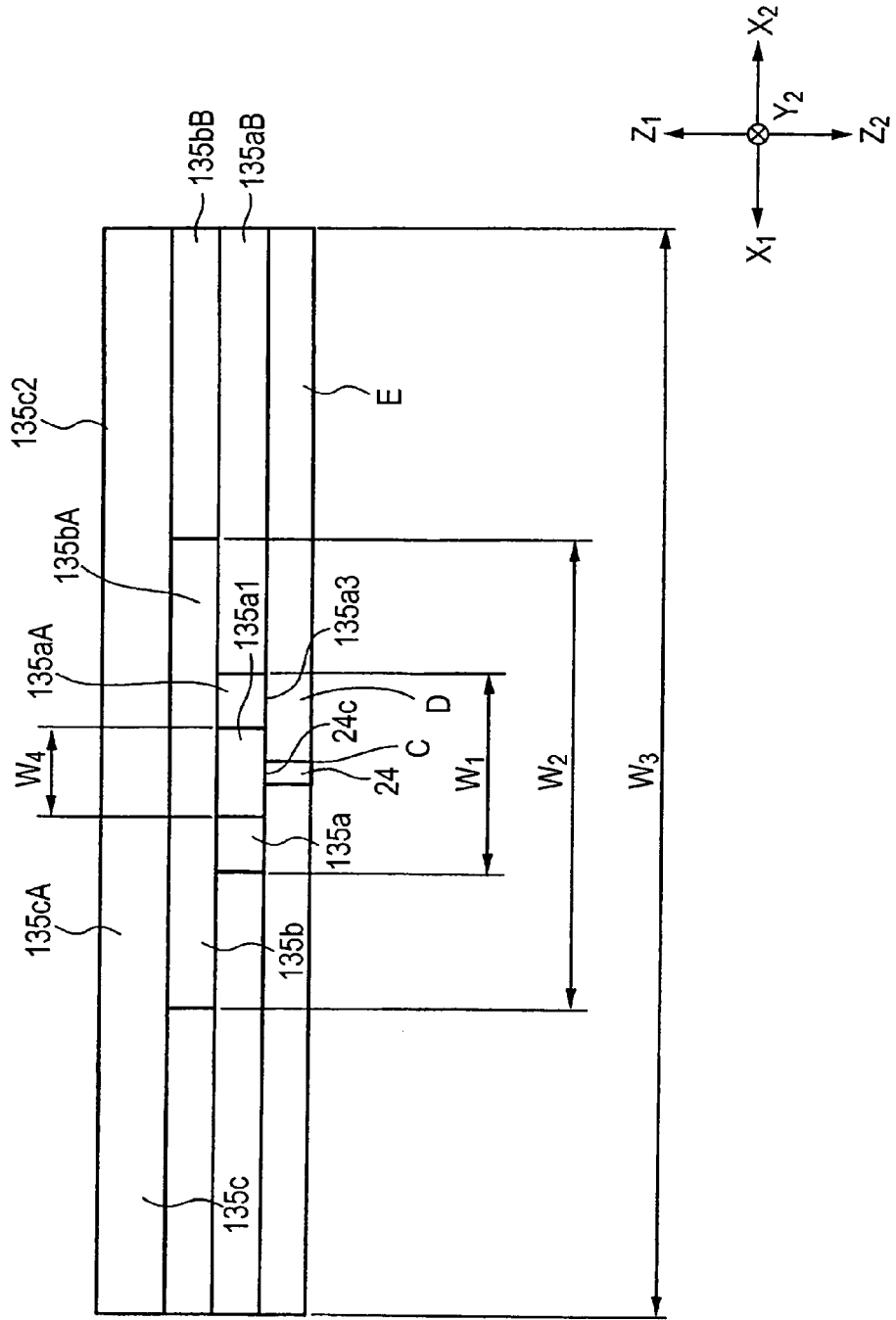
FIG. 6 is a partial front view of the above-described perpendicular magnetic recording head shown in FIG. 4, viewed from the side of a facing-surface opposed to a recording medium.

FIG. 4 is a vertical sectional view showing a structure of a perpendicular magnetic recording head according to the second embodiment of the present invention. FIG. 5 is a plan view of the perpendicular magnetic recording head shown in FIG. 4, viewed from immediately above (Z1 direction shown in FIG. 1). FIG. 6 is a partial front view of the above-described main magnetic pole layer 24 and the above-described yoke layer 135 of the above-described perpendicular magnetic recording head H2 shown in FIG. 4, viewed from the side of the facing-surface Ha opposed to the recording medium (Y1 direction side shown in the drawing).

A perpendicular magnetic recording head H2 shown in FIG. 4 to FIG. 6 is constructed including the same constituents as in the perpendicular magnetic recording head H1 shown in FIG. 1 to FIG. 3. Therefore, in the above-described perpendicular magnetic recording head H2, the same constituents as in the above-described perpendicular magnetic recording head H1 are indicated by the same reference numerals as those set forth above and detailed explanations thereof will not be provided.

The above-described perpendicular magnetic recording head H2 shown in FIG. 4 to FIG. 6 is different from the perpendicular magnetic recording head H1 shown in FIG. 1 to FIG. 3 in the position at which the yoke layer 135 is disposed. As shown in FIG. 4 and FIG. 6, the above-described yoke layer 135 is disposed at a position on the main magnetic pole layer 24. Furthermore, in the above-described perpendicular magnetic recording head H2, the above-described yoke layer 135 is constructed by laminating three layers of a first layer 135a, a second layer 135b, and a third layer 135c in that order from the bottom. Therefore, in the above-described perpendicular magnetic recording head H2, an upper surface 135c2 of the third layer 135c becomes an upper surface of the yoke layer 135, and a lower surface 135a3 of the first layer 135a becomes a lower surface of the yoke layer 135.

As shown in FIG. 4 and FIG. 6, the lower surface 135a3 of the first layer 135a constituting the above-described yoke layer 135 is disposed in contact with the upper surface 24c of the above-described main magnetic pole layer 24. The above-described second layer 135b is disposed on the above-described first layer 135a while being in contact therewith. The front-end surface 135b1 of the above-described second layer 135b is disposed at a position a predetermined distance L2 from the front-end surface 135a1 of the above-described first layer 135a. The front-end surface 135c1 of the above-described third layer 135c is disposed at a position a predetermined distance L3 from the front-end surface 135b1 of the above-described second layer 135b. Therefore, as shown in FIG. 4 and FIG. 5, the front-end surface 135a1 of the above-described first layer 135a is constructed as the front-end surface of the above-described yoke layer 135. With respect to the rear side in the height direction (Y2 direction shown in the drawing) of the above-described yoke layer 135, a region R1 in which the above-described first layer 135a is disposed alone, a region R2 in which two layers of the above-described first layer 135a and the above-described second layer 135b are disposed, and a region R3 in which three layers of the above-described first layer 135a, the above-described second layer 135b, and the above-described third layer 135c are disposed are included. For example, the above-described distance L2 is 0.1 to 10 μm, and the above-described distance L3 is 0.1 to 10 μm.

As shown in FIG. 4, the front-end surface 135a1 of the above-described first layer 135a is disposed at a position a predetermined distance L1 behind the front-end surface 24a of the above-described main magnetic pole layer 24 in the height direction (Y2 direction shown in FIG. 4). The above-described insulating layer 57 is filled in the side nearer to the facing-surface Ha opposed to the recording medium (Y1 direction shown in the drawing, that is, a side opposite to the rear) than is the front-end surface 135a1 of the above-described first layer 135a. Therefore, the front-end surface 135a1, which constitutes the front end of the above-described yoke layer 135, of the above-described first layer 135a does not appear on the facing-surface Ha opposed to the recording medium. In the above-described yoke layer 135, the above-described distance L1 from the front-end surface 24a (facing-surface Ha opposed to the recording medium) of the above-described main magnetic pole layer 24 to the front-end surface 135a1 of the above-described first layer 135a corresponds to a recess. For example, the above-described distance L1 is 0 to 10 μm.

As shown in FIG. 5 and FIG. 6, the maximum width dimension W1 of the front portion 135aA of the above-described first layer 135a is formed to become smaller than the maximum width dimension W2 of the front portion 135bA of the above-described second layer 135b. The maximum width dimension W2 of the above-described front portion 135bA of the above-described second layer 135b is formed to become smaller than the maximum width dimension W3 of the front portion 135cA of the above-described third layer 135c. Consequently, from the viewpoint of the above-described front portions 135aA, 135bA, and 135cA, the above-described yoke layer 135 is constructed in such a way that the above-described width dimension is increased stepwise from W1 to W2 and from W2 to W3 toward the rear in the height direction (Y2 direction shown in the drawing). For example, the relationship among the above-described width dimension W1, the above-described width dimension W2, and the above-described width dimension W3 is represented by 0.01 µm≦W1≦W2≦W3—100 µm.

As shown in FIG. 5, the width dimension W4 in a direction (X1 or X2 direction shown in the drawing) orthogonal to the height direction (Y1 or Y2 direction shown in the drawing) of the front-end surface 135a1, which is the front end of the above-described yoke layer 135, of the above-described first layer 135a is increased to the above-described width dimension W1, to the above-described width dimension W2, and to the above-described width dimension W3 toward the rear in the height direction (Y2 direction shown in the drawing).

As shown in FIG. 4, the above-described yoke layer 135 in the above-described region R1 is constructed having a film thickness dimension t1 equal to the film thickness dimension of the above-described first layer 135a. The yoke layer 135 in the above-described region R2 is constructed having a film thickness dimension t2 which is a total of the film thickness dimensions of the above-described first layer 135a and the above-described second layer 135b. The yoke layer 135 in the above-described region R3 is constructed having a film thickness dimension t3 which is a total of the film thickness dimensions of the above-described first layer 135a, the above-described second layer 135b, and the above-described third layer 135c. That is, the above-described yoke layer 135 is constructed in such a way that the film thickness dimension is increased stepwise from t1 to t2 and from t2 to t3 toward the rear in the height direction (Y2 direction shown in the drawing). For example, the above-described film thickness dimension t1, the above-described film thickness dimension t2, and the above-described film thickness dimension t3 are configured to increase stepwise within the range of 0.01 to 10 µm.

As shown in FIG. 6, from the viewpoint of the above-described front portions 135aA, 135bA, and 135cA, the above-described yoke layer 135 is constructed in such a way that the maximum width dimension W1 of the above-described front portion 135aA of the first layer 135a disposed as a lowermost layer (Z2 direction-side layer in the drawing) becomes the smallest, the maximum width dimension W2 of the above-described front portion 135bA of the second layer 135b disposed on the first layer 135a and disposed as a middle layer becomes larger than the maximum width dimension W1 of the above-described front portion 135aA of the above-described first layer 135a, and the maximum width dimension W3 of the above-described front portion 135cA of the third layer 135c disposed as an uppermost layer (Z1 direction shown in the drawing) becomes larger than the above-described maximum width dimension W1 of the above-described front portion 135aA of the first layer 135a and the above-described maximum width dimension W2 of the above-described front portion 135bA of the second layer 135b. That is, from the viewpoint of the above-described front portions 135aA, 135bA, and 135cA, the above-described yoke layer 135 is constructed in such a way that the above-described width dimension is increased stepwise from W1 to W2 and from W2 to W3 from the lower surface 135a3, which is the lower surface of the yoke layer 135, of the first layer 135a toward the upper surface 135c2, which is the upper surface of the yoke layer 135, of the third layer 135c (in the upward direction, that is, in Z1 direction shown in the drawing).

In the above-described perpendicular magnetic recording head H2 shown in FIG. 4 to FIG. 6 as well, both the above-described width dimension W4 and the thickness dimension of the front-end surface 135a1, which serves as the front end of the above-described yoke layer 135, of the above-described first layer 135a are configured to increase (become divergent) stepwise toward the rear in the height direction (Y2 direction shown in the drawing). That is, the above-described yoke layer 135 is constructed in such a way that both the width dimension and the thickness dimension are decreased toward the facing-surface Ha opposed to the recording medium and, therefore, the magnetic volume of the above-described yoke layer 135 can be reduced stepwise toward the facing-surface Ha opposed to the recording medium. Consequently, even when the above-described yoke layer 135 is brought close to the facing-surface Ha opposed to the above-described recording medium in order to effectively induce the recording magnetic field to the above-described main magnetic pole layer 24, the recording magnetic field is resistant to flowing from the above-described yoke layer 135 to the facing-surface Ha opposed to the above-described recording medium M, so that an occurrence of side fringing can be suppressed.

Since both the width dimension and the thickness dimension of the above-described yoke layer 135 are configured to increase toward the rear in the height direction (Y2 direction shown in the drawing), the magnetic volume is increased in a direction farther from the facing-surface Ha opposed to the recording medium. Consequently, the magnetic volume of the above-described yoke layer 135 as a whole can be increased, so that the recording magnetic field can easily be induced to the above-described main magnetic pole layer 24.

Furthermore, the above-described yoke layer 135 is constructed in such a way that the width dimension W4 is increased from the lower surface 135a3, which constitutes the lower surface of the yoke layer 135, of the first layer 135a toward the upper surface 135c2, which constitutes the upper surface of the yoke layer 135, of the third layer 135c that is, the width dimension W4 is increased in a direction farther from the main magnetic pole layer 24. Consequently, the magnetic volume of the above-described yoke layer 135 as a whole can be further increased, so that the recording magnetic field can easily be induced to the above-described main magnetic pole layer 24 effectively.

As described above, in the perpendicular magnetic recording head H2 of the present invention as well, even when the above-described yoke layer 135 is brought close to the facing-surface Ha opposed to the recording medium in order to effectively induce the recording magnetic field to the main magnetic pole layer 24, an occurrence of side fringing can be suppressed since the magnetic volume of the above-described yoke layer 135 is decreased toward facing-surface Ha opposed to the magnetic recording medium. In addition, since the magnetic volume of the yoke layer 135 is configured to increase as a whole, the recording magnetic field can easily be induced to the above-described main magnetic pole layer 24 effectively.

In the above description, the perpendicular magnetic recording head H1 shown in FIG. 1 to FIG. 3 and the perpendicular magnetic recording head H2 shown in FIG. 4 to FIG.

6 are explained wherein the embodiments in which the above-described yoke layer 135 is composed of three layers of the first layer 135a, the second layer 135b, and the third layer 135c are taken as examples. However, in the above-described perpendicular magnetic recording head H1 and the above-described perpendicular magnetic recording head H2, the above-described yoke layer 135 is not limited to those composed of three layers. For example, the above-described yoke layer 135 may be composed of two layers or at least four layers.

Preferably, the above-described yoke layer 135 is configured to have a larger saturation magnetic flux density with increasing proximity to the above-described main magnetic pole layer 24. For example, the yoke layer 135 can be configured to have a larger saturation magnetic flux density with increasing proximity to the above-described main magnetic pole layer 24 by differentiating the materials for the above-described first layer 135a, the above-described second layer 135b, and the above-described third layer 135c from each other. Since a magnetic flux can easily be concentrated on the front end of the above-described main magnetic pole layer 24 by such a configuration, the recording density can be improved.

Figure 7:
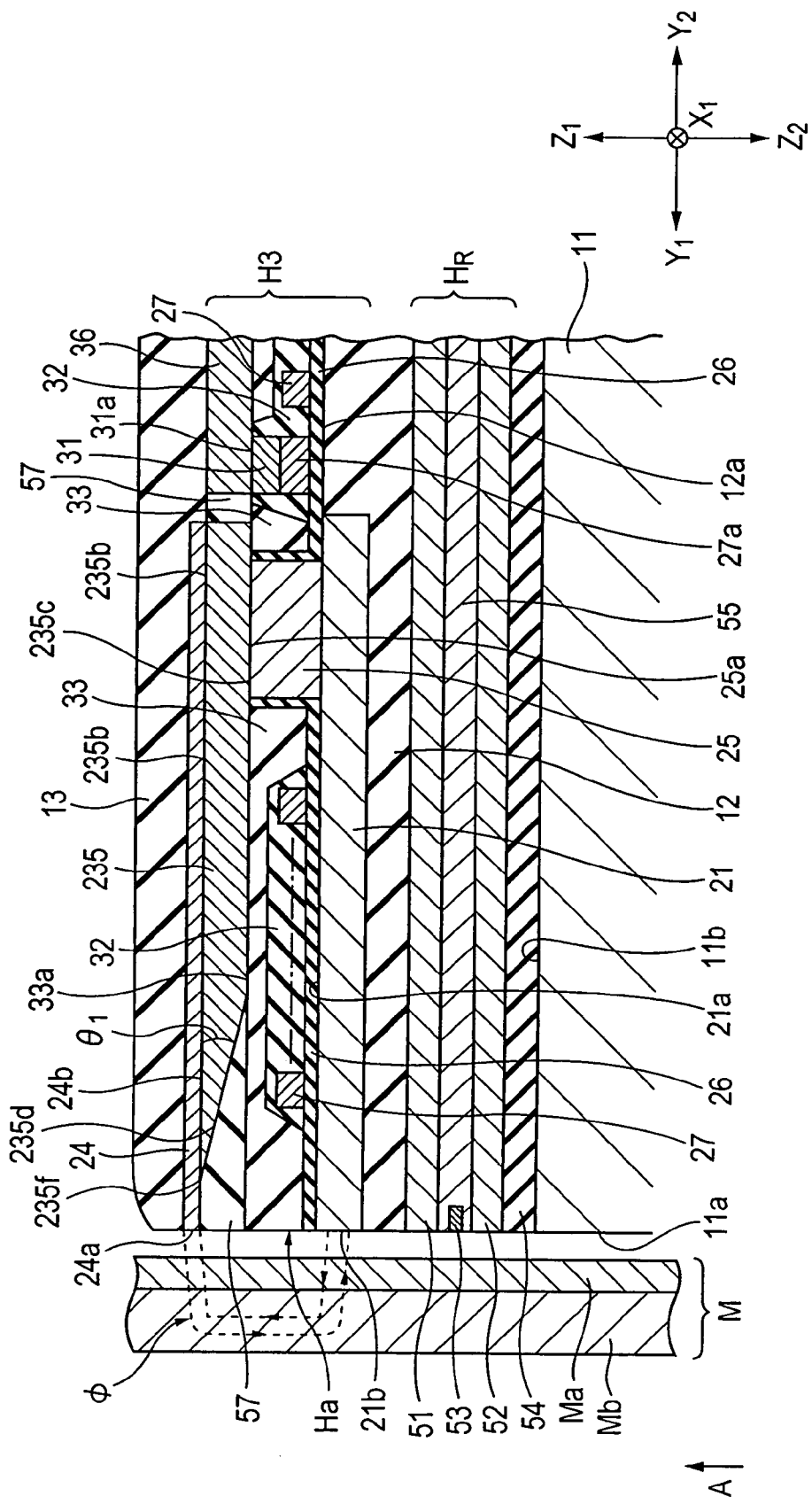
FIG. 7 is a vertical sectional view showing a perpendicular magnetic recording head according to a third embodiment of the present invention.
Figure 8:
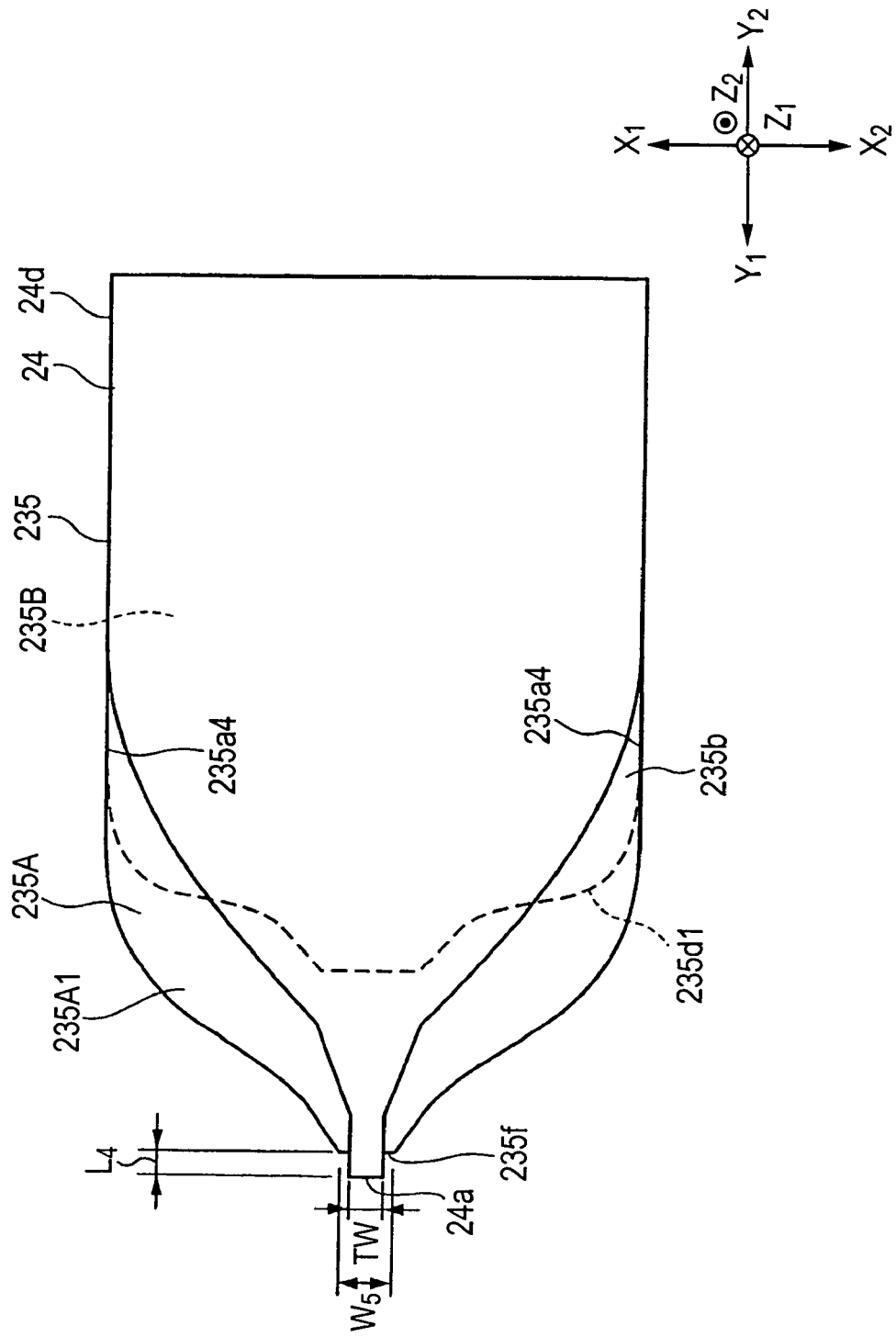
FIG. 8 is a plan view of the perpendicular magnetic recording head shown in FIG. 7, viewed from immediately above.
Figure 9:
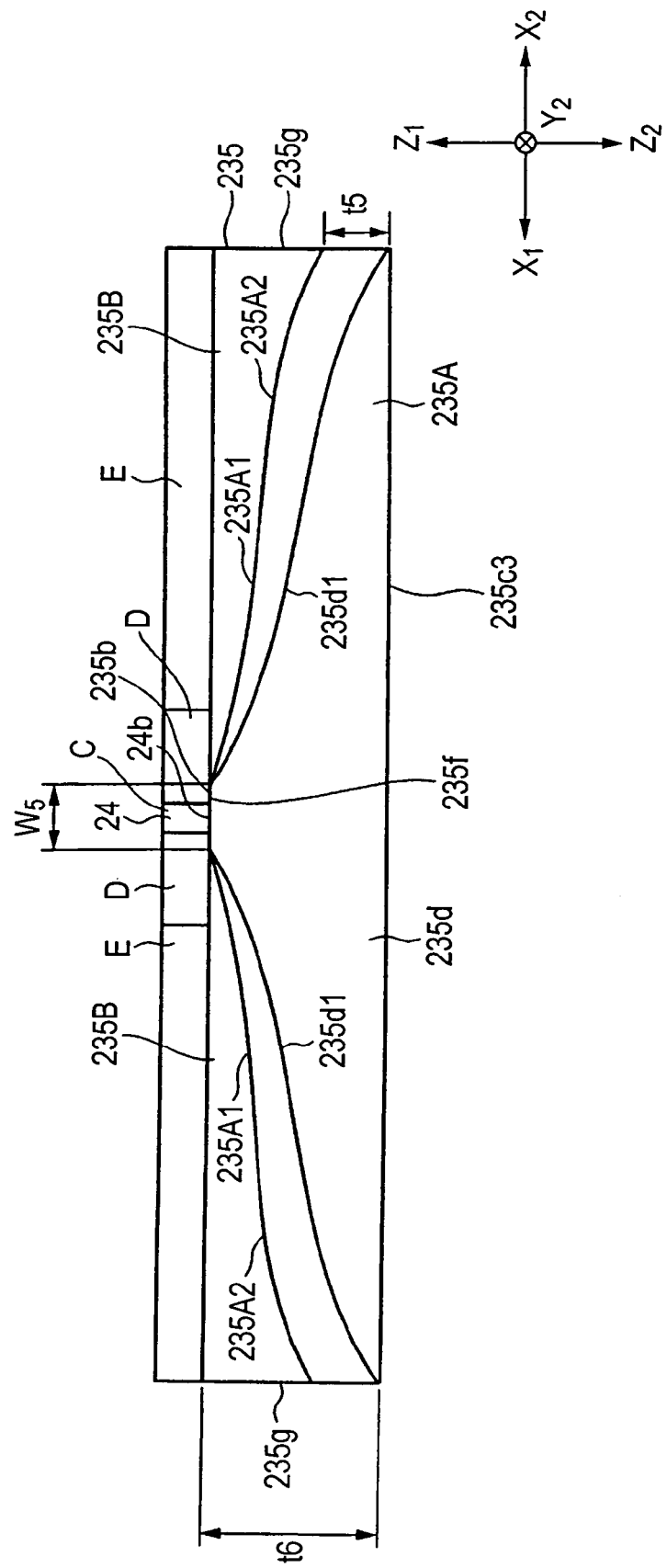
FIG. 9 is a partial front view of the above-described perpendicular magnetic recording head shown in FIG. 7, viewed from the side of a facing-surface opposed to a recording medium.

The above-described yoke layer 135 of the above-described perpendicular magnetic recording head H1 shown in FIG. 1 to FIG. 3 may be an integral-type yoke layer 235 as in the third embodiment shown in FIG. 7 to FIG. 9.

As shown in FIG. 7 and FIG. 8, the yoke layer 235 is surrounded by the insulating layer 57. The above-described insulating layer 57 appears on the facing-surface Ha opposed to the above-described recording medium. The front end 235f of the above-described yoke layer 235 is positioned behind the above-described facing-surface Ha in the height direction.

As shown in FIG. 8, the front end 235f of the above-described yoke layer 235 is disposed at a position a predetermined distance L4 behind the front-end surface 24a (facing-surface Ha opposed to the recording medium) of the main magnetic pole layer 24 in the height direction (Y2 direction shown in the drawing). The above-described distance L4 from the front-end surface 24a (facing-surface Ha opposed to the recording medium) of the above-described main magnetic pole layer 24 to the above-described front end 235f of the above-described yoke layer 235 corresponds to a recess. For example, the above-described distance L4 is more than 0 µm and 10 µm or less.

As described above, in a perpendicular magnetic recording head H3, the front-end 235f of the above-described yoke layer 235 is disposed at a position the predetermined distance L4 behind the above-described front-end surface 24a of the above-described main magnetic pole layer 24 in the height direction (Y2 direction shown in the drawing). Therefore, the leakage magnetic field from the above-described yoke layer 235 is allowed to become resistant to flowing to the recording medium M, so that an occurrence of side fringing can be suppressed effectively.

As shown in FIG. 8, the above-described yoke layer 235 is configured to include a front portion 235A having a width dimension divergent gradually and extending from the front end 235f toward the rear in the height direction and a rear portion 235B extending from this front portion 235A toward the rear in the height direction.

The above-described front portion 235A of the above-described yoke layer 235 is extended from the above-described front end 235f toward the rear in the height direction up to the position at which side-edge portions 235a4 of the above-described yoke layer 235 are opposed to the above-described main magnetic pole layer 24 in a film thickness direction (Z1 or Z2 direction shown in the drawing). The above-described rear portion 235B is constructed from the position at which the side-edge portions 235a4 of the above-described yoke layer 235 are opposed to the main magnetic pole layer 24 in the film thickness direction toward the rear in the height direction. As shown in FIG. 8, the above-described rear portion 235B is formed into the shape exhibiting a plan view in accordance with the shape formed by an outer edge 24d of the above-described main magnetic pole layer 24, when viewed from immediately above.

As shown in FIG. 8, this yoke layer 235 is constructed in such a way that the width dimension W5 in a direction orthogonal to the height direction of the front end 235f of the above-described yoke layer 235 is divergent continuously toward the rear in the height direction (Y2 direction shown in the drawing).

As shown in FIG. 9, in the above-described front portion 235A of the above-described yoke layer 235, upper sloped surfaces 235A2 which descend in the downward direction (Z2 direction shown in the drawing) with increasing proximity to both side-edge surfaces 235g and 235g of the above-described yoke layer 235 are disposed on an upper surface 235A1 of the above-described front portion 235A. Furthermore, lower sloped surfaces 235d1 which descend in the downward direction with increasing proximity to both side-edge surfaces 235g and 235g of the above-described yoke layer 235 are disposed on the front-end surface 235d of the above-described front portion 235A. The above-described film thickness dimension is configured to gradually increase from both side-edge portions of the front end 235f of the above-described yoke layer 235 up to a film thickness dimension t5 at both the above-described side-edge surfaces 235g and 235g.

Therefore, the width dimension W5 in a direction orthogonal to the height direction of the front end 235f of the above-described yoke layer 235 is configured to increase continuously from the upper surface 235b toward the lower surface 235c (toward Z2 direction shown in the drawing, that is, in a downward direction), in such a way that the above-described width dimension is increased continuously in a direction farther from the above-described main magnetic pole layer 24.

On the other hand, the above-described rear portion 235B is formed having a constant film thickness dimension. Preferably, the film thickness dimension t6 of the above-described rear portion 235B is made larger than the above-described front end 235f of the above-described front portion 235A. When the film thickness of the above-described rear portion 235B is configured as described above, the magnetic volume of the above-described yoke layer 235 as a whole can be increased, so that the recording magnetic field can easily be induced to the main magnetic pole layer 24.

As shown in FIG. 7, the front-end surface 235d of the above-described yoke layer 235 is formed from a sloped surface that approaches the above-described facing-surface Ha with increasing proximity to the upper surface 235b from the lower surface 235c. Therefore, in the above-described front-end surface 235d disposed as the sloped surface, the film thickness is configured to increase continuously toward the rear in the height direction (Y2 direction shown in the drawing). Preferably, the interior angle θ1 between the lower surface 24b of the main magnetic pole layer 24 disposed on the above-described yoke layer 235 and the front-end surface 235d of the above-described yoke layer 235 is within the range of 0° to 150°. When the above-described front-end surface 235d is disposed as the sloped surface and the above-described interior angle θ1 is specified to be within the above-described range, flowing of the recording magnetic field from the above-described yoke layer 235 to the recording medium M can easily be suppressed and, thereby, an occurrence of side fringing can be suppressed.

The above-described front-end surface 235d may be disposed as a curved surface protruded toward the side of the facing-surface Ha opposed to the recording medium (Y1 direction side shown in FIG. 7), or a curved surface dented toward the rear side in the height direction (Y2 direction side shown in FIG. 7).

Figure 10:
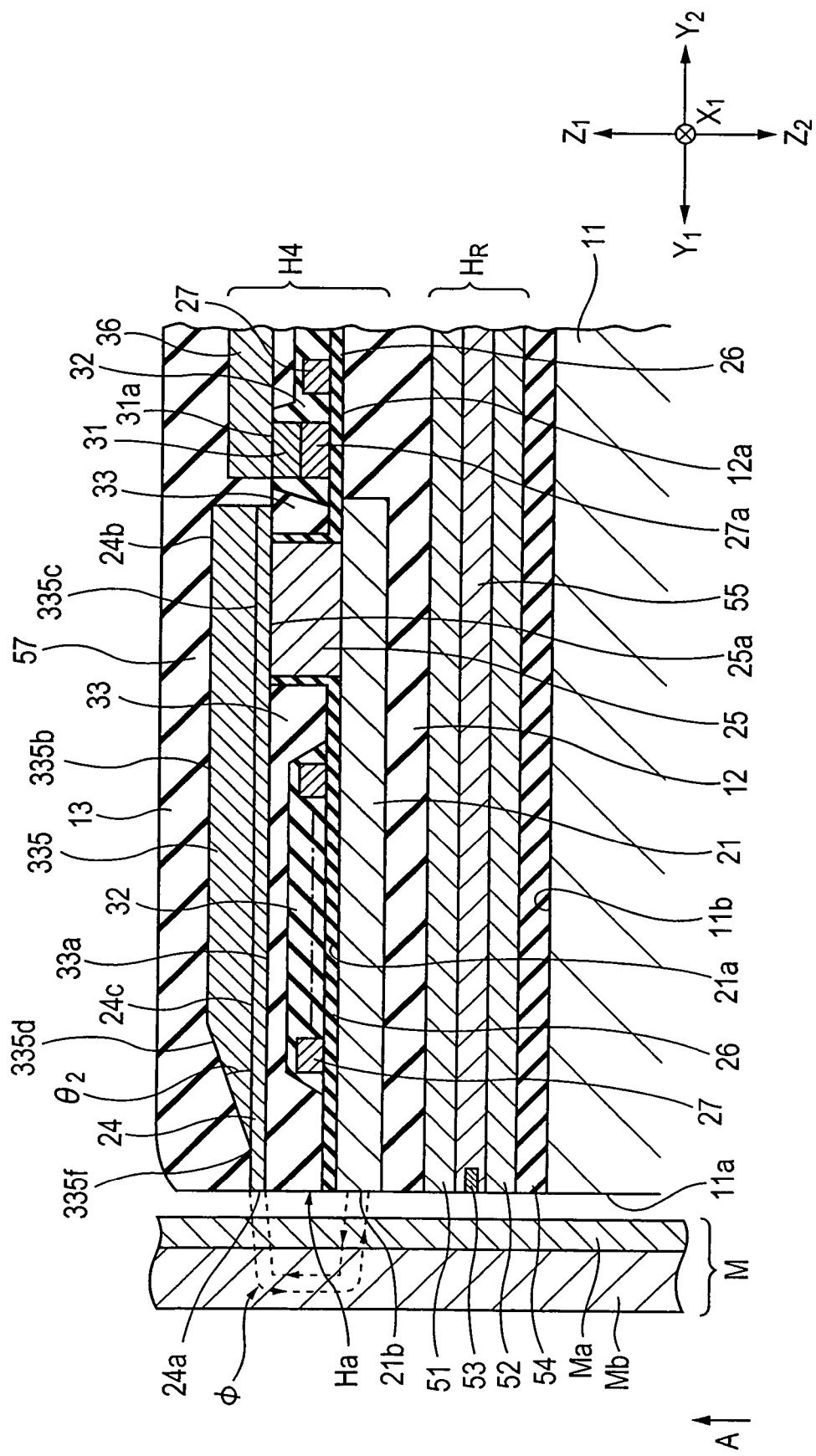
FIG. 10 is a vertical sectional view showing a perpendicular magnetic recording head according to a fourth embodiment of the present invention.
Figure 11:
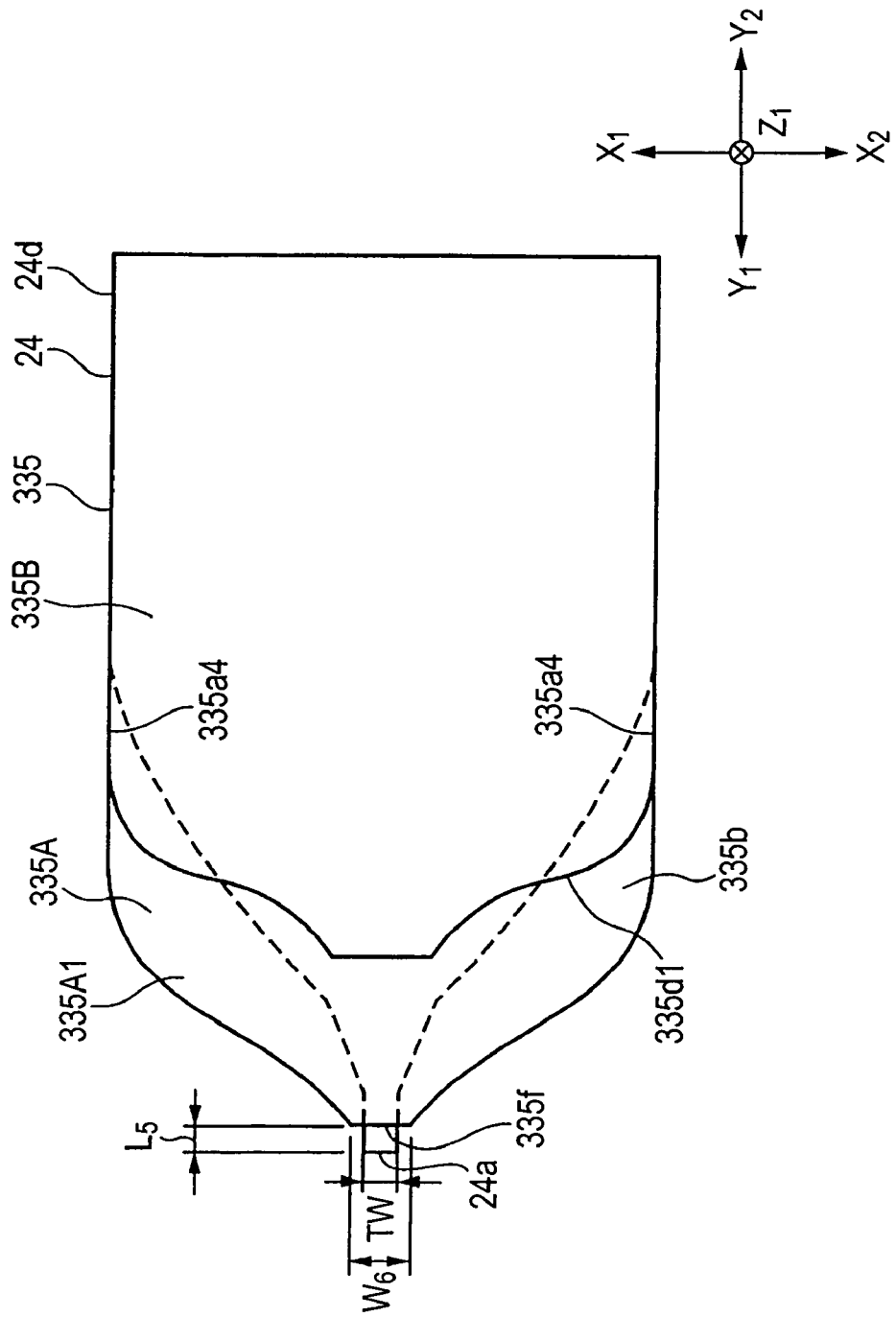
FIG. 11 is a plan view of the perpendicular magnetic recording head shown in FIG. 10, viewed from immediately above.
Figure 12:
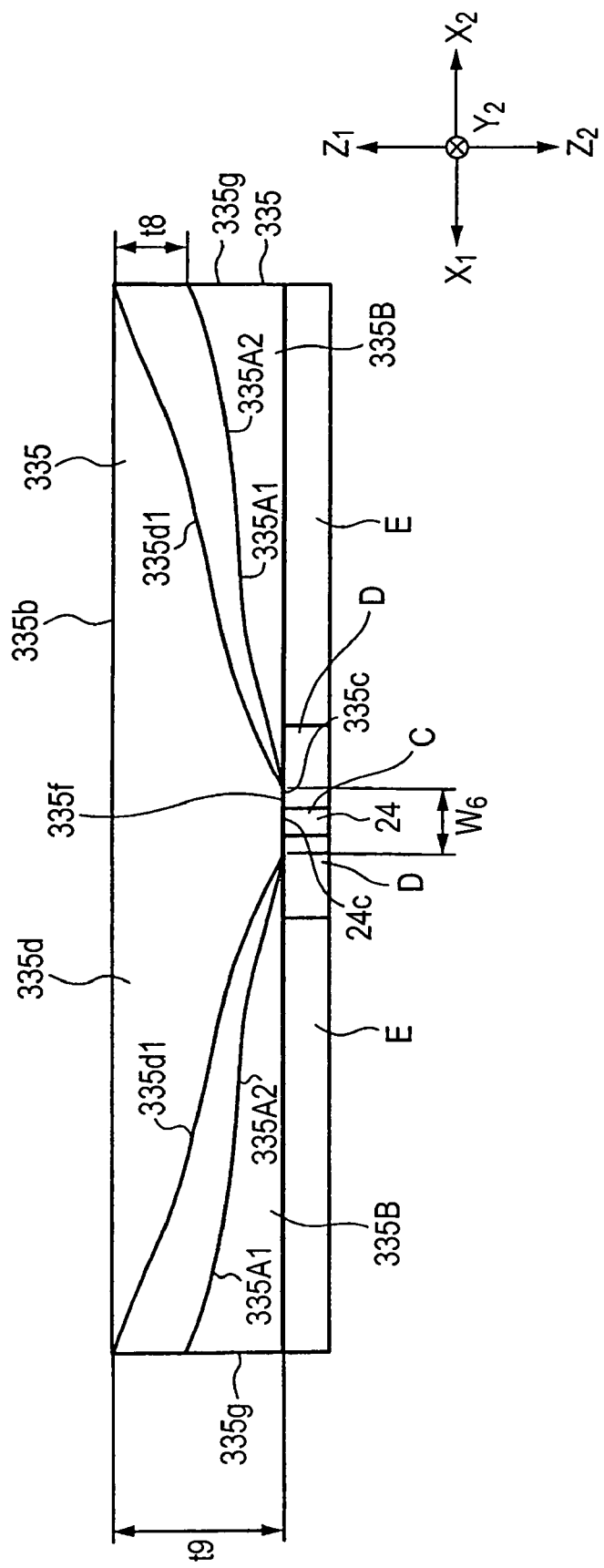
FIG. 12 is a partial front view of the above-described perpendicular magnetic recording head shown in FIG. 10, viewed from the side of a facing-surface opposed to a recording medium.

The above-described yoke layer 135 of the above-described perpendicular magnetic recording head H2 shown in FIG. 4 to FIG. 6 may be an integral-type yoke layer 335 as in a perpendicular magnetic recording head H4 of the fourth embodiment shown in FIG. 10 to FIG. 12.

As shown in FIG. 10 and FIG. 11, in the above-described perpendicular magnetic recording head H4, the yoke layer 335 is surrounded by the insulating layer 57. The above-described insulating layer 57 appears on the facing-surface Ha opposed to the above-described recording medium. The front end 335f of the above-described yoke layer 335 is positioned behind the above-described facing-surface Ha in the height direction.

As shown in FIG. 11, the front end 335f of the above-described yoke layer 335 is disposed at a position a predetermined distance L5 behind the front-end surface 24a (facing-surface Ha opposed to the recording medium) of the main magnetic pole layer 24 in the height direction (Y2 direction side shown in the drawing). The above-described distance L5 from the front-end surface 24a (facing-surface Ha opposed to the recording medium) of the above-described main magnetic pole layer 24 to the front end 335f of the above-described yoke layer 335 corresponds to a recess. For example, the above-described distance L5 is more than 0 μm and 10 μm or less.

As shown in FIG. 11, the above-described yoke layer 335 is configured to include a front portion 335A having a width dimension divergent gradually and extending from the front end 335f toward the rear in the height direction and a rear portion 335B extending from this front portion 335A toward the rear in the height direction.

The above-described front portion 335A of the above-described yoke layer 335 is extended from the above-described front end 335f toward the rear in the height direction up to the position at which side-edge portions 335a4 of the above-described yoke layer 335 are opposed to the above-described main magnetic pole layer 24 in a film thickness direction (Z1 or Z2 direction shown in the drawing). The above-described rear portion 335B is constructed from the position at which the side-edge portions 335a4 of the above-described yoke layer 335 are opposed to the main magnetic pole layer 24 in the film thickness direction toward the rear in the height direction. As shown in FIG. 11, the above-described rear portion 335B is formed into the shape exhibiting a plan view in accordance with the shape formed by an outer edge 24d of the above-described main magnetic pole layer 24, when viewed from immediately above.

As shown in FIG. 11, this yoke layer 335 is constructed in such a way that the width dimension W6 in a direction orthogonal to the height direction of the front end 335f of the above-described yoke layer 335 is divergent continuously toward the rear in the height direction (Y2 direction shown in the drawing).

As shown in FIG. 12, in the above-described front portion 335A of the above-described yoke layer 335, lower sloped surfaces 335A2 which ascend in the upward direction (Z1 direction side shown in the drawing) with increasing proximity to both side-edge surfaces 335g and 335g of the above-described yoke layer 335 are disposed on a lower surface 335A1 of the above-described front portion 335A. Furthermore, upper sloped surfaces 335d1 which ascend in the upward direction with increasing proximity to both side-edge surfaces 335g and 335g of the above-described yoke layer 335 are disposed on the front-end surface 335d of the above-described front portion 335A. The above-described film thickness dimension is configured to gradually increase from both side-edge portions of the front end 335f of the above-described yoke layer 335 up to a film thickness dimension t8 at both the above-described side-edge surfaces 335g and 335g.

Therefore, the width dimension W6 in a direction orthogonal to the height direction of the front end 335f of the above-described yoke layer 335 is configured to increase continuously from the lower surface 335c toward the upper surface 335b (toward Z1 direction shown in the drawing, that is, in an upward direction) in such a way that the above-described width dimension H6 is increased continuously in a direction farther from the above-described main magnetic pole layer 24.

On the other hand, the above-described rear portion 335B is formed having a constant film thickness dimension. Preferably, the film thickness dimension t9 of the above-described rear portion 335B is made larger than the above-described front end 335f of the above-described front portion 335A. When the film thickness of the above-described rear portion 335B is configured as described above, the magnetic volume of the above-described yoke layer 335 as a whole can be increased, so that the recording magnetic field can easily be induced to the main magnetic pole layer 24.

As shown in FIG. 10, the front-end surface 335d of the above-described yoke layer 335 is formed from a sloped surface that approaches the above-described facing-surface Ha with increasing proximity to the lower surface 335c from the upper surface 335b. Therefore, in the above-described front-end surface 335d disposed as the sloped surface, the film thickness is configured to increase continuously toward the rear in the height direction (Y2 direction shown in the drawing). Preferably, the interior angle θ2 between the upper surface 24c of the main magnetic pole layer 24 disposed under the above-described yoke layer 335 and the front-end surface 335d of the above-described yoke layer 335 is within the range of 0° to 150°. When the above-described front-end surface 335d is disposed as the sloped surface and the above-described interior angle θ2 is specified to be within the above-described range, flowing of the recording magnetic field from the above-described yoke layer 335 to the recording medium M can easily be suppressed and, thereby, an occurrence of side fringing can be suppressed.

The above-described front-end surface 335d may be disposed as a curved surface protruded toward the side of the facing-surface Ha opposed to the recording medium (Y1 direction side shown in FIG. 10), or a curved surface dented toward the rear side in the height direction (Y2 direction side shown in FIG. 10).

In the above-described perpendicular magnetic recording head H3 shown in FIG. 7 to FIG. 9 and the above-described perpendicular magnetic recording head H4 shown in FIG. 10 to FIG. 12 as well, preferably, the above-described yoke layers 235 and 335 are configured to have larger saturation magnetic flux densities with increasing proximity to the above-described main magnetic pole layer 24 in order to improve the recording density.

Figure 17:
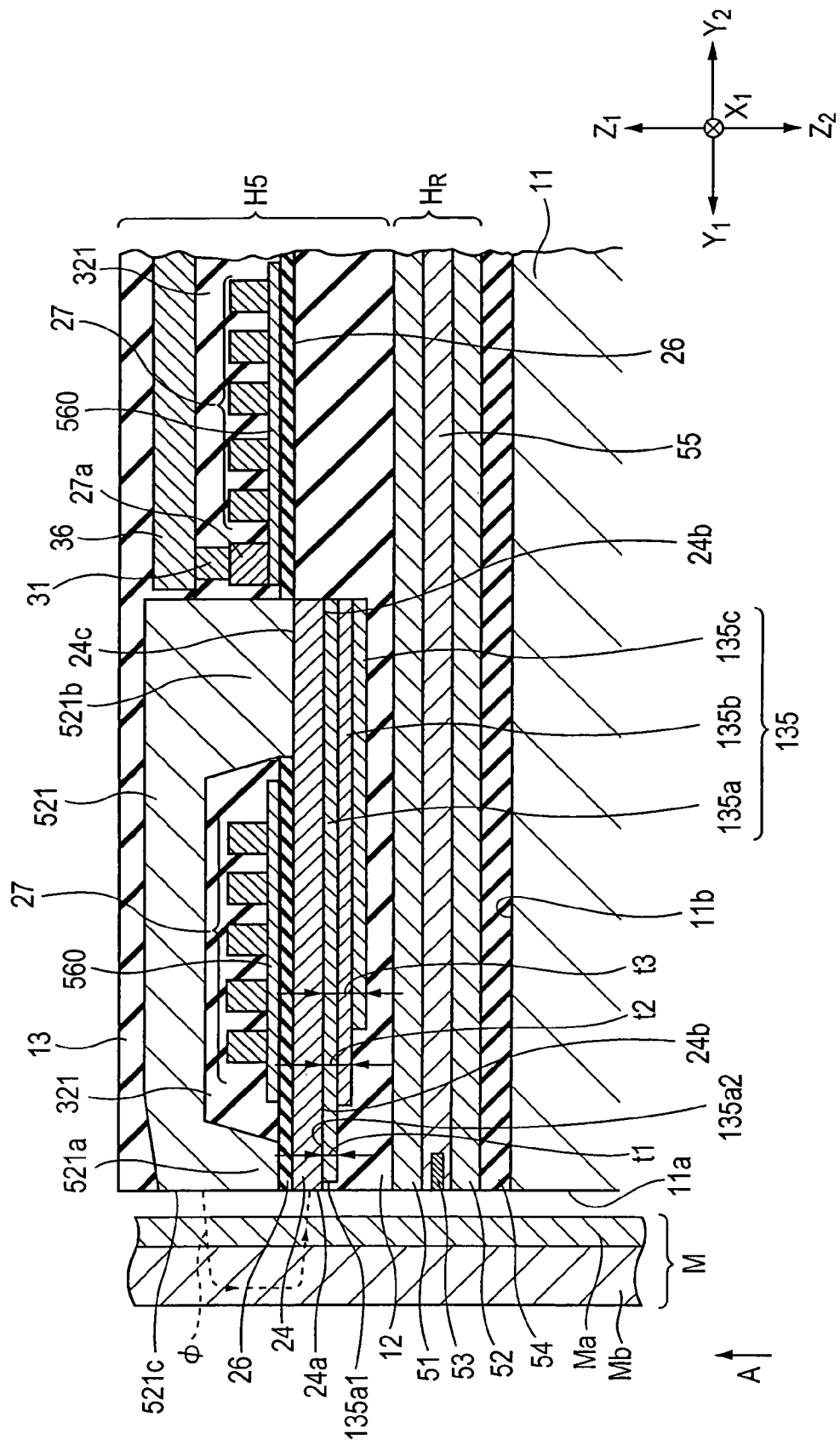
FIG. 17 is a vertical sectional view showing a perpendicular magnetic recording head according to a fifth embodiment of the present invention.

FIG. 17 is a vertical sectional view showing a structure of a perpendicular magnetic recording head H5 according to the fifth embodiment of the present invention.

The perpendicular magnetic recording head H5 shown in FIG. 17 also applies a perpendicular magnetic field to a recording medium M, and magnetize a hard surface Ma of the recording medium M in a perpendicular direction.

The above-described recording medium M is in the shape of a disk, includes the hard surface Ma exhibiting high residual magnetization on the surface and a soft surface Mb exhibiting a high magnetic permeability in the inside, and is rotated about the disk center serving as a rotation axis center.

A slider 11 of the above-described perpendicular magnetic recording head H5 is formed from a ceramic material, e.g., $Al_2O_3$.TiC. A facing-surface 11a of the slider 11 is opposed to the above-described recording medium M, and when the recording medium is rotated, the slider 11 floats from the surface of the recording medium M due to an air stream on the surface, or the slider 11 slides over the recording medium M. In FIG. 17, the moving direction of the recording medium M relative to the slider 11 is a direction indicated by an arrow A shown in the drawing (Z1 direction shown in the drawing). The perpendicular magnetic recording head H is disposed on the trailing-side end surface of the slider 11.

A nonmagnetic insulating layer 54 made of an inorganic material, e.g., $Al_2O_3$ or $SiO_2$, is disposed on a side end surface 11b of the above-described slider 11. A reading portion $H_R$ is disposed on this nonmagnetic insulating layer 54.

The above-described reading portion $H_R$ is composed of a lower shield layer 52, a gap layer 55, a magnetoresistive sensor 53, and an upper shield layer 51 in that order from the bottom. The above-described magnetoresistive sensor 53 is an anisotropic magnetoresistive (AMR) sensor, a giant magnetoresistive (GMR) sensor, a tunnel type magnetoresistive (TMR) sensor, or the like.

A nonmagnetic insulating layer 12 made of an inorganic material, e.g., $Al_2O_3$ or $SiO_2$, is disposed on the above-described upper shield layer 51. The perpendicular magnetic recording head H5 for recording of the present invention is disposed on the above-described nonmagnetic insulating layer 12. The perpendicular magnetic recording head H5 is covered with a protective layer 13 formed from an inorganic nonmagnetic insulating material or the like. A facing-surface Ha of the above-described perpendicular magnetic recording head H5 opposed to the recording medium is substantially flush with the facing-surface 11a of the above-described slider 11.

In the perpendicular magnetic recording head of the embodiment shown in FIG. 17, a yoke layer 135 made of a high-magnetic permeability material, e.g., permalloy (Ni—Fe), is disposed on the above-described nonmagnetic insulating layer 12. This yoke layer 135 is formed having a magnetic permeability higher than that of a main magnetic pole layer 24 described below.

As shown in FIG. 17, a portion under the above-described yoke layer 135 (in between the above-described yoke layer 135 and the above-described upper shield layer 51) and the surroundings of the above-described yoke layer 135 are filled in with a nonmagnetic insulating layer 12. The above-described nonmagnetic insulating layer 12 appears on the facing-surface Ha opposed to the above-described recording medium. A portion denoted by reference numeral 135a1 constitutes the front end of the above-described yoke layer 135 and is positioned behind the above-described facing-surface Ha in the height direction. In the present invention, an upper surface of the above-described yoke layer 135 is made to be a uniform flattened surface by using a CMP technique or the like.

Preferably, the above-described nonmagnetic insulating layer 12 is formed from an inorganic insulating material. At least one selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON can be used as the above-described inorganic insulating material.

In the present invention, the main magnetic pole layer 24, which is a second magnetic layer made of a high-saturation magnetic flux density material, e.g., Fe—Co—Rh, Fe—Co, and Fe—Co—Ni, is disposed over the above-described flattened yoke layer 135. As shown in FIG. 17, the above-described main magnetic pole layer 24 is disposed at a position on the trailing side, that is, an upward side of the above-described auxiliary magnetic pole layer 21 (Z1 direction side in the drawing).

An upper surface 24c of the above-described main magnetic pole layer 24 and an upper surface of the above-described nonmagnetic insulating layer 12 are made to be a flattened flush surface by using a CMP technique or the like.

In the above-described perpendicular magnetic recording head H5, an auxiliary magnetic pole layer 521, which is a first magnetic portion, is disposed through plating of Ni—Fe, Fe—Ni (Fe-rich), Fe—Co—Rh, Fe—Co, Fe—Co—Ni, or the like.

As shown in FIG. 17, on the side behind the above-described facing-surface Ha in the height direction (Y2 direction in the drawing), a connection portion 521b of the auxiliary magnetic pole layer 521 is disposed on the upper surface 24c of the above-described main magnetic pole layer 24 while being in contact and magnetically coupled therewith.

A nonmagnetic insulating layer 26 made of $Al_2O_3$ or the like is disposed on the upper surface 24c of the above-described main magnetic pole layer 24 and the surface 12a of the above-described nonmagnetic insulating layer 12 around the above-described connection portion 521b. A coil layer 27 made of an electrically conductive material, e.g., Cu, is disposed on this nonmagnetic insulating layer 26. This coil layer 27 is formed by a frame plating or the like, and is formed into the shape of a spiral pattern with the predetermined number of windings around the above-described connection portion 521b. A raised layer 31 also made of an electrically conductive material, e.g., Cu, is disposed on the connection end 27a on the winding center side of the coil layer 27.

The above-described coil layer 27 and the raised layer 31 are covered with an insulating layer 321 made of an organic material, e.g., a resist material.

As shown in FIG. 17, a lead layer 36 is disposed on a surface 31a of the above-described raised layer 31, and a recording current can be supplied from the lead layer 36 to the above-described raised layer 31 and the coil layer 27. The above-described yoke layer 135 and the above-described lead layer 36 are covered with the above-described protective layer 13.

Figure 18:
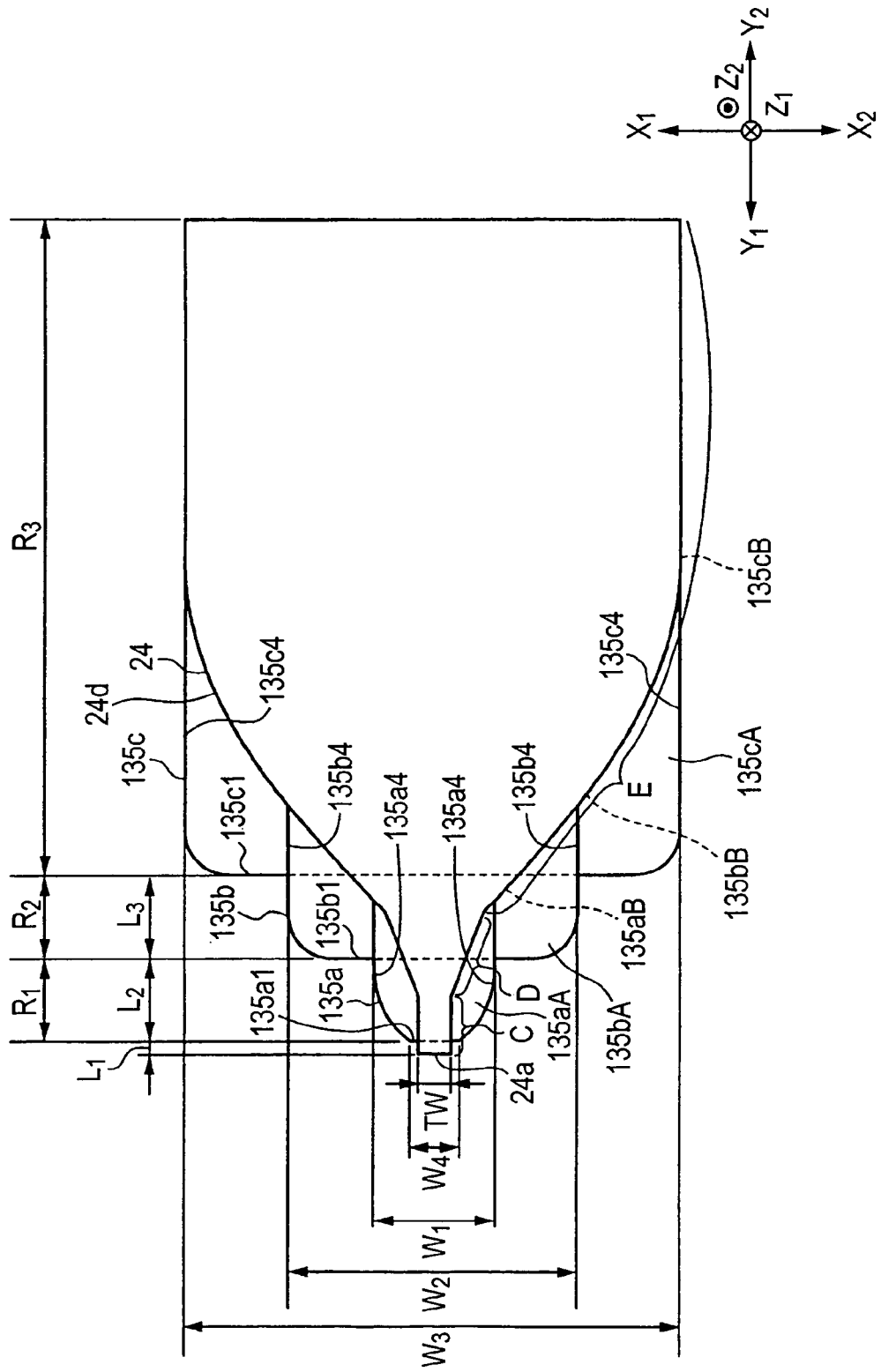
FIG. 18 is a plan view of the perpendicular magnetic recording head shown in FIG. 17, viewed from immediately above.
Figure 19:
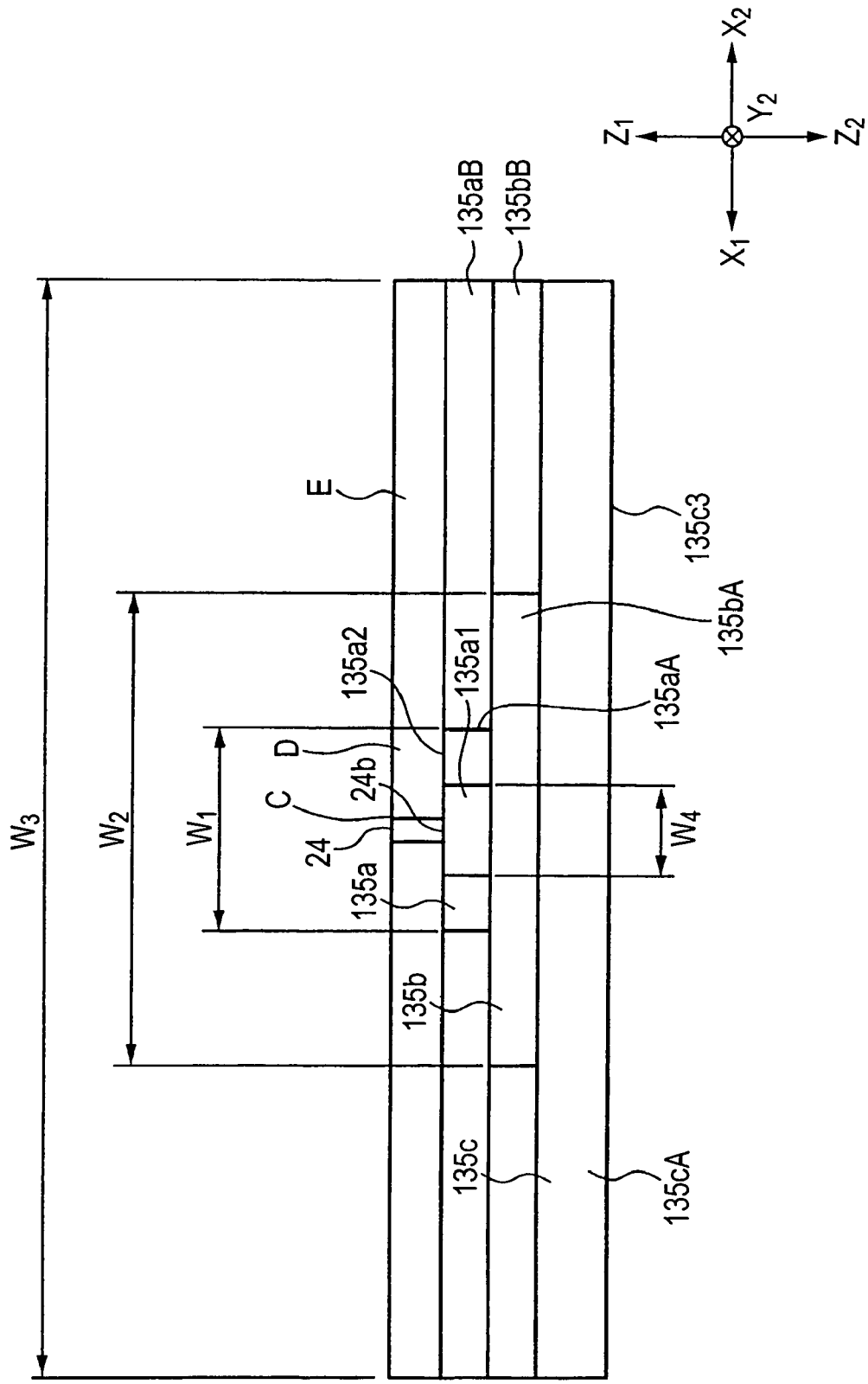
FIG. 19 is a partial front view of the above-described perpendicular magnetic recording head shown in FIG. 17, viewed from the side of a facing-surface opposed to a recording medium.

FIG. 18 is a plan view of the perpendicular magnetic recording head shown in FIG. 17, viewed from immediately above (Z1 direction shown in FIG. 17). FIG. 19 is a partial front view of the main magnetic pole layer 24 and the yoke layer 135 of the above-described perpendicular magnetic recording head H5 shown in FIG. 17, viewed from the side of the facing-surface Ha opposed to the recording medium (Y1 direction side shown in FIG. 1). As shown in FIG. 18 and FIG. 19, the above-described main magnetic pole layer 24 is composed of a front-end portion C having a constant width dimension (=track width Tw), a middle portion D having predetermined angles with respect to side surfaces of the above-described front-end portion C in such a way that the width dimension is gently divergent from the above-described front-end portion C toward the rear, and a rear-end portion E which has larger predetermined angles with respect to side surfaces of the above-described front-end portion C and which is disposed from the above-described middle portion D toward the rear.

In the perpendicular magnetic recording head H5 shown in FIG. 17, the nonmagnetic insulating layer 12 and the yoke layer 135 are disposed on the above-described upper shield layer 51, and the above-described main magnetic pole layer 24 is disposed on the nonmagnetic insulating layer 12 and the yoke layer 135.

As shown in FIG. 17, the above-described yoke layer 135 is constructed by laminating three layers of a first layer 135a, a second layer 135b, and a third layer 135c. An upper surface 135a2, which constitutes the upper surface of the above-described yoke layer 24, of the above-described first layer 135a is disposed in contact with the lower surface 24b of the above-described main magnetic pole layer 24, and the above-described yoke layer 135 is disposed at a position on the downward direction (Z2 direction shown in the drawing) side of the above-described main magnetic pole layer 24, that is, the leading side.

As shown in FIG. 18, the above-described first layer 135a is configured to include a front portion 135aA having a predetermined maximum width dimension W1 and extending toward the rear in the height direction and a rear portion 135aB extending from this front portion 135aA toward the rear in the height direction.

The above-described second layer 135b is configured to include a front portion 135bA having a predetermined maximum width dimension W2 and extending toward the rear in the height direction and a rear portion 135bB extending from this front portion 135bA toward the rear in the height direction.

The above-described third layer 135c is configured to include a front portion 135cA having a predetermined maximum width dimension W3 and extending toward the rear in the height direction and a rear portion 135cB extending from this front portion 135cA toward the rear in the height direction.

As shown in FIG. 18, the above-described front portion 135aA of the above-described first layer 135a is extended from the above-described front-end surface 135a1 toward the rear in the height direction up to the position at which side-edge portions 135a4 of the above-described first layer 135a are opposed to the above-described main magnetic pole layer 24 in a film thickness direction (Z1 or Z2 direction shown in the drawing). The above-described rear portion 135aB is constructed from the position at which the side-edge portions 135a4 of the above-described first layer 135a are opposed to the main magnetic pole layer 24 in the film thickness direction toward the rear in the height direction. As shown in FIG. 18, the above-described rear portion 135aB is formed into the shape exhibiting a plan view in accordance with the shape formed by an outer edge 24d of the above-described main magnetic pole layer 24, when viewed from immediately above.

Likewise, the above-described front portion 135bA of the above-described second layer 135b is extended from the front-end surface 135b1 of the above-described second layer 135b toward the rear in the height direction up to the position at which side-edge portions 135b4 of the above-described second layer 135b are opposed to the above-described main magnetic pole layer 24 in the film thickness direction. The above-described rear portion 135bB is constructed from the position at which the side-edge portions 135b4 of the above-described second layer 135b are opposed to the main magnetic pole layer 24 in the film thickness direction toward the rear in the height direction. As shown in FIG. 18, the above-described rear portion 135bB is formed into the shape exhibiting a plan view in accordance with the shape formed by the outer edge 24d of the above-described main magnetic pole layer 24, when viewed from immediately above.

Likewise, the above-described front portion 135cA of the above-described third layer 135c is extended from the above-described front-end surface 135c1 of the above-described third layer 135c toward the rear in the height direction up to the position at which side-edge portions 135c4 of the above-described third layer 135c are opposed to the above-described main magnetic pole layer 24 in the film thickness direction. The above-described rear portion 135cB is constructed from the position at which the side-edge portions 135c4 of the above-described third layer 135c are opposed to the main magnetic pole layer 24 in the film thickness direction toward the rear in the height direction. As shown in FIG. 18, the above-described rear portion 135cB is formed into the shape exhibiting a plan view in accordance with the shape formed by the outer edge 24d of the above-described main magnetic pole layer 24, when viewed from immediately above.

Since the above-described rear portion 135aB of the above-described first layer 135a, the above-described rear portion 135bB of the above-described second layer 135b, and the above-described rear portion 135cB of the above-described third layer 135c are formed exhibiting the plan views in accordance with the shape formed by the outer edge 24d of the above-described main magnetic pole layer 24, as described above, an entire magnetic volume of the above-described first layer 135a, the above-described second layer 135b, and the above-described third layer 135c can be increased, so that a recording magnetic field can easily be induced to the main magnetic pole.

As shown in FIG. 18 and FIG. 19, the upper surface 135a2 of the above-described first layer 135a is disposed in contact with the lower surface 24b of the above-described main magnetic pole layer 24. The above-described second layer 135b is disposed under the above-described first layer 135a while being in contact therewith. The front-end surface 135b1 of the above-described second layer 135b is disposed at a position a predetermined distance L2 from the front-end surface 135a1 of the above-described first layer 135a. The front-end surface 135c1 of the above-described third layer 135c is disposed at a position a predetermined distance L3 from the front-end surface 135b1 of the above-described second layer 135b. Therefore, as shown in FIG. 17 and FIG. 18, the front-end surface 135a1 of the above-described first layer 135a is constructed as the front-end surface of the above-described yoke layer 135. With respect to the rear side in the height direction (Y2 direction shown in the drawing) of the above-described yoke layer 135, a region R1 in which the above-described first layer 135a is disposed alone, a region R2 in which two layers of the above-described first layer 135a and the above-described second layer 135b are disposed, and a region R3 in which three layers of the above-described first layer 135a, the above-described second layer 135b, and the above-described third layer 135c are disposed are included. For example, the above-described distance L2 is 0.01 to 100 μm, and the above-described distance L3 is 0.01 to 100 μm.

As shown in FIG. 18, the front-end surface 135a1 of the above-described first layer 135a is disposed at a position a predetermined distance L1 behind the front-end surface 24a (facing-surface Ha opposed to the recording medium) of the above-described main magnetic pole layer 24 in the height direction (Y2 direction shown in FIG. 18). The above-described insulating layer 12 is filled in the side nearer to the facing-surface Ha opposed to the recording medium (Y1 direction shown in the drawing, that is, the side opposite to the rear in the height direction) than is the front-end surface 135a1 of the above-described first layer 135a. Therefore, the front-end surface 135a1 of the above-described first layer 135a does not appear on the facing-surface Ha opposed to the recording medium. In the above-described yoke layer 135, the above-described distance L1 from the front-end surface 24a (facing-surface Ha opposed to the recording medium) of the above-described main magnetic pole layer 24 to the front-end surface 135a1 of the above-described first layer 135a corresponds to a recess. For example, the above-described distance L1 is 0 to 10 μm.

As shown in FIG. 18 and FIG. 19, the maximum width dimension W1 of the above-described front portion 135aA of the above-described first layer 135a is formed to become smaller than the maximum width dimension W2 of the above-described front portion 135bA of the above-described second layer 135b. The maximum width dimension W2 of the above-described front portion 135bA of the above-described second layer 135b is formed to become smaller than the maximum width dimension W3 of the above-described front portion 135cA of the above-described third layer 135c. Consequently, from the viewpoint of the above-described front portions 135aA, 135bA, and 135cA, the above-described yoke layer 135 is constructed in such a way that the width dimension is increased stepwise from W1 to W2 and from W2 to W3 toward the rear in the height direction (Y2 direction shown in the drawing). For example, the relationship among the above-described width dimension W1, the above-described width dimension W2, and the above-described width dimension W3 is represented by 0.01 μm≦W1≦W2≦W3—100 μm.

As shown in FIG. 18, the width dimension W4 in a direction (X1 or X2 direction shown in the drawing) orthogonal to the height direction (Y1 or Y2 direction shown in the drawing) of the front-end surface 135a1, which is the front end of the above-described yoke layer 135, is increased to the above-described width dimension W1, of the above-described first layer 135a to the above-described width dimension W2, and to the above-described width dimension W3 toward the rear in the height direction (Y2 direction shown in the drawing).

As shown in FIG. 17 and FIG. 18, the above-described yoke layer 135 in the above-described region R1 is constructed having a film thickness dimension t1 equal to the film thickness dimension of the above-described first layer 135a. The yoke layer 135 in the above-described region R2 is constructed having a film thickness dimension t2 which is a total of the film thickness dimensions of the above-described first layer 135a and the above-described second layer 135b. The yoke layer 135 in the above-described region R3 is constructed having a film thickness dimension t3 which is a total of the film thickness dimensions of the above-described first layer 135a, the above-described second layer 135b, and the above-described third layer 135c. That is, the above-described yoke layer 135 is constructed in such a way that the film thickness dimension is increased stepwise from t1 to t2 and from t2 to t3 toward the rear in the height direction (Y2 direction shown in the drawing). For example, the above-described film thickness dimension t1, the above-described film thickness dimension t2, and the above-described film thickness dimension t3 are configured to increase stepwise within the range of 0.01 to 10 μm.

As shown in FIG. 19, from the viewpoint of the above-described front portions 135aA, 135bA, and 135cA, the above-described yoke layer 135 is constructed in such a way that the above-described width dimension W1 of the above-described front portion 135aA of the first layer 135a disposed as an uppermost layer (Z1 direction-side layer in the drawing) becomes the smallest, the above-described width dimension W2 of the above-described front portion 135bA of the second layer 135b disposed under the first layer 135a and disposed as a middle layer becomes larger than the above-described width dimension W1 of the above-described front portion 135aA of the above-described first layer 135a, and the width dimension of the third layer 135c disposed as a lowermost layer (Z2 direction shown in the drawing) becomes larger than the above-described width dimension W1 of the above-described front portion 135aA of the first layer 135a and the above-described width dimension W2 of the above-described front portion 135bA of the second layer 135b. That is, from the viewpoint of the above-described front portions 135aA, 135bA, and 135cA, the above-described yoke layer 135 is constructed in such a way that the above-described width dimension is increased stepwise from W1 to W2 and from W2 to W3 from the upper surface 135a2, which is the upper surface of the yoke layer 135, of the first layer 135a toward the lower surface 135c3, which is the lower surface of the yoke layer 135, of the third layer 135c (toward Z2 direction shown in the drawing, that is, in a downward direction).

In the perpendicular magnetic recording head H5 of the present invention, the above-described main magnetic pole layer 24 is formed from a material exhibiting a high saturation magnetic flux density. However, in general, since the material exhibiting a high saturation magnetic flux density has a low magnetic permeability, the recording magnetic field induced to the main magnetic pole layer 24 is difficult to induce to the front-end surface 24a of the above-described main magnetic pole layer. Consequently, the above-described yoke layer 135 made of a material having a large magnetic permeability is disposed in contact with the above-described main magnetic pole layer 24 and, thereby, the recording magnetic field can easily be induced to the front-end surface 24a of the main magnetic pole layer 24.

Here, in order to effectively induce the recording magnetic field to the front-end surface 24a of the main magnetic pole layer 24, it is effective to bring the above-described yoke layer 135 close to the facing-surface Ha opposed to the recording medium. However, if the above-described yoke layer 135 is excessively brought close to the facing-surface Ha opposed to the recording medium, the recording magnetic field becomes easy to also flow from this yoke layer 135 to the recording medium M and, thereby, a so-called side fringing problem occurs.

In the perpendicular magnetic recording head H5 of the present invention, both the above-described width dimension and the thickness dimension of the front-end surface 135a1, which serves as the front end of the above-described yoke layer 135, of the above-described first layer 135a are configured to increase (become divergent) stepwise toward the rear in the height direction (Y2 direction shown in the drawing). That is, the above-described yoke layer 135 is constructed in such a way that both the width dimension and the thickness dimension are decreased toward the facing-surface Ha opposed to the recording medium and, therefore, the magnetic volume of the above-described yoke layer 135 can be reduced stepwise toward the facing-surface Ha opposed to the recording medium. Consequently, even when the above-described yoke layer 135 is brought close to the facing-surface Ha opposed to the above-described recording medium in order to effectively induce the recording magnetic field to the above-described main magnetic pole layer 24, the recording magnetic field is resistant to flowing from the above-described yoke layer 135 to the above-described recording medium M, so that an occurrence of side fringing can be suppressed.

Since both the width dimension and the thickness dimension of the above-described yoke layer 135 are configured to increase toward the rear in the height direction (Y2 direction shown in the drawing), the magnetic volume is increased in a direction farther from the facing-surface Ha opposed to the recording medium. Consequently, the magnetic volume of the above-described yoke layer 135 as a whole can be increased, so that the recording magnetic field can easily be induced to the above-described main magnetic pole layer 24.

Furthermore, the above-described yoke layer 135 is constructed in such a way that the width dimension W4 is increased from the upper surface 135a2, which constitutes the upper surface of the yoke layer 135, of the first layer 135a toward the lower surface 135c3, which constitutes the lower surface of the yoke layer 135, of the third layer 135c, that is, the width dimension W4 is divergent in a direction farther from the above-described main magnetic pole layer 24. Consequently, the magnetic volume of the above-described yoke layer 135 as a whole can be further increased, so that the recording magnetic field can easily be induced to the above-described main magnetic pole layer 24 effectively.

As described above, in the perpendicular magnetic recording head H5 of the present invention, even when the above-described yoke layer 135 is brought close to the facing-surface Ha opposed to the recording medium in order to effectively induce the recording magnetic field to the main magnetic pole layer 24, an occurrence of side fringing can be suppressed since the magnetic volume of the above-described yoke layer 135 is decreased toward facing-surface Ha opposed to the magnetic recording medium. In addition, since the magnetic volume of the yoke layer 135 is configured to increase as a whole, the recording magnetic field can easily be induced to the above-described main magnetic pole layer 24 effectively.

The auxiliary magnetic pole layer 521 is disposed on the above-described main magnetic pole layer 24 with the nonmagnetic insulating layer 26 serving as a magnetic gap layer therebetween through plating of Fe—Co—Rh, Fe—Co, Fe—Co—Ni, or the like.

The front-end surface 521c of the above-described auxiliary magnetic pole layer 521 is exposed at the facing-surface Ha opposed to the recording medium. The connection portion 521b disposed in the above-described auxiliary magnetic pole layer 521 is connected to the above-described main magnetic pole layer 24 at the rear side as compared with the facing-surface Ha. In this manner, a magnetic path connecting between the above-described auxiliary magnetic pole layer 521 and the main magnetic pole layer 24 is formed.

As shown in FIG. 17, a coil insulation substrate layer 560 is disposed around the connection portion 521b disposed on the above-described auxiliary magnetic pole layer 521. A coil layer 27 made of an electrically conductive material, e.g., Cu, is disposed on this coil insulation substrate layer 560. This coil layer 27 is formed by a frame plating or the like, and is formed into the shape of a spiral pattern with the predetermined number of windings around the above-described connection portion 521b. A raised layer 31 also made of an electrically conductive material, e.g., Cu, is disposed on the connection end 27a on the winding center side of the above-described coil layer 27.

The above-described coil layer 27 and the raised layer 31 are covered with an insulating layer 321 made of an organic material, e.g., a resist material.

The upper surface of the above-described raised layer 31 is exposed at the surface of the above-described insulating layer 321, and is connected to the lead layer 36. A recording current can be supplied from the lead layer 36 to the above-described raised layer 31 and the coil layer 27.

The above-described auxiliary magnetic pole layer 521 and the above-described lead layer 36 are covered with the above-described protective layer 13 formed from an inorganic nonmagnetic insulating material or the like.

Here, the above-described perpendicular magnetic recording head H5 shown in FIG. 17 is different from the perpendicular magnetic recording head H1 shown in FIG. 1 to FIG. 3 in the relative position between the above-described main magnetic pole layer 24 and the auxiliary magnetic pole layer 521 and the form of the auxiliary magnetic pole layer.

That is, in the above-described perpendicular magnetic recording head H5 shown in FIG. 17, the auxiliary magnetic pole layer 521 is disposed on the above-described main magnetic pole layer 24 with the nonmagnetic insulating layer 26 serving as a magnetic gap layer therebetween. The above-described perpendicular magnetic recording head H5 shown in FIG. 17 is constructed in such a way that the above-described auxiliary magnetic pole layer 521 is positioned on the trailing side (Z1 direction side shown in the drawing) and the above-described main magnetic pole layer 24 is positioned on the leading side (Z2 direction side shown in the drawing). From this point of view, the configuration is different from that in the above-described perpendicular magnetic recording head H1 shown in FIG. 1 to FIG. 3. Furthermore, the configuration is different from the configuration of the above-described perpendicular magnetic recording head H1 shown in FIG. 1 to FIG. 3 in the point that the front-end portion 521a extending toward the above-described main magnetic pole layer 24 is disposed at the front end of the above-described auxiliary magnetic pole layer 521.

The above-described perpendicular magnetic recording head H5 configured to have such a structure is a perpendicular magnetic recording head having a so-called shielded pole type structure.

As shown in FIG. 17, in the above-described perpendicular magnetic recording head H5, the above-described yoke layer 135 having the same structure as that in the above-described perpendicular magnetic recording head H1 shown in FIG. 1 to FIG. 3 is disposed.

As is described in the explanation of the above-described perpendicular magnetic recording head H1 shown in FIG. 1 to FIG. 3, in the above-described yoke layer 135, both the above-described width dimension W4 and the thickness dimension of the front-end surface 135a1, which serves as the front end of the above-described yoke layer 135, of the above-described first layer 135a are configured to increase (become divergent) stepwise toward the rear in the height direction (Y2 direction shown in the drawing). That is, the above-described yoke layer 135 is constructed in such a way that both the width dimension W4 and the thickness dimension are decreased toward the facing-surface Ha opposed to the recording medium and, therefore, the magnetic volume of the above-described yoke layer 135 can be reduced stepwise toward the facing-surface Ha opposed to the recording medium.

Consequently, in the perpendicular magnetic recording head H5 shown in FIG. 17 as well, the recording magnetic field is resistant to flowing from the above-described yoke layer 135 to the above-described recording medium M, so that an occurrence of side fringing can be suppressed.

Since both the width dimension W4 and the thickness dimension of the above-described yoke layer 135 are configured to increase (become divergent) toward the rear in the height direction (Y2 direction shown in the drawing), the magnetic volume is increased in a direction farther from the facing-surface Ha opposed to the recording medium. Consequently, the magnetic volume of the above-described yoke layer 135 as a whole can be increased, so that the recording magnetic field can easily be induced to the above-described main magnetic pole layer 24.

Furthermore, the above-described yoke layer 135 is constructed in such a way that the width dimension W4 is increased from the upper surface 135a2, which constitutes the upper surface of the yoke layer 135, of the first layer 135a toward the lower surface 135c3, which constitutes the lower surface of the yoke layer 135, of the third layer 135c, that is, the width dimension W4 is divergent in a direction farther from the above-described main magnetic pole layer 24. Consequently, the magnetic volume of the above-described yoke layer 135 as a whole can be further increased, so that the recording magnetic field can easily be induced to the above-described main magnetic pole layer 24 effectively.

As described above, in the perpendicular magnetic recording head H5 of the present invention, an occurrence of side fringing can be suppressed since the magnetic volume of the above-described yoke layer 135 is decreased toward the facing-surface Ha opposed to the magnetic recording medium. In addition, since the magnetic volume of the yoke layer 135 is configured to increase as a whole, the recording magnetic field can easily be induced to the above-described main magnetic pole layer 24 effectively.

The perpendicular magnetic recording head H5 shown in FIG. 17 is constructed in such a way that the above-described main magnetic pole layer 24 is positioned on the leading side (Z2 direction side shown in the drawing) relative to the above-described auxiliary magnetic pole layer 521. Therefore, in the perpendicular magnetic recording head H5 shown in FIG. 17, the above-described auxiliary magnetic pole layer 521 can be positioned on the trailing side of the main magnetic pole layer 24, so that the recording magnetic field from the main magnetic pole layer 24 can be concentrated on the trailing side.

Figure 20:
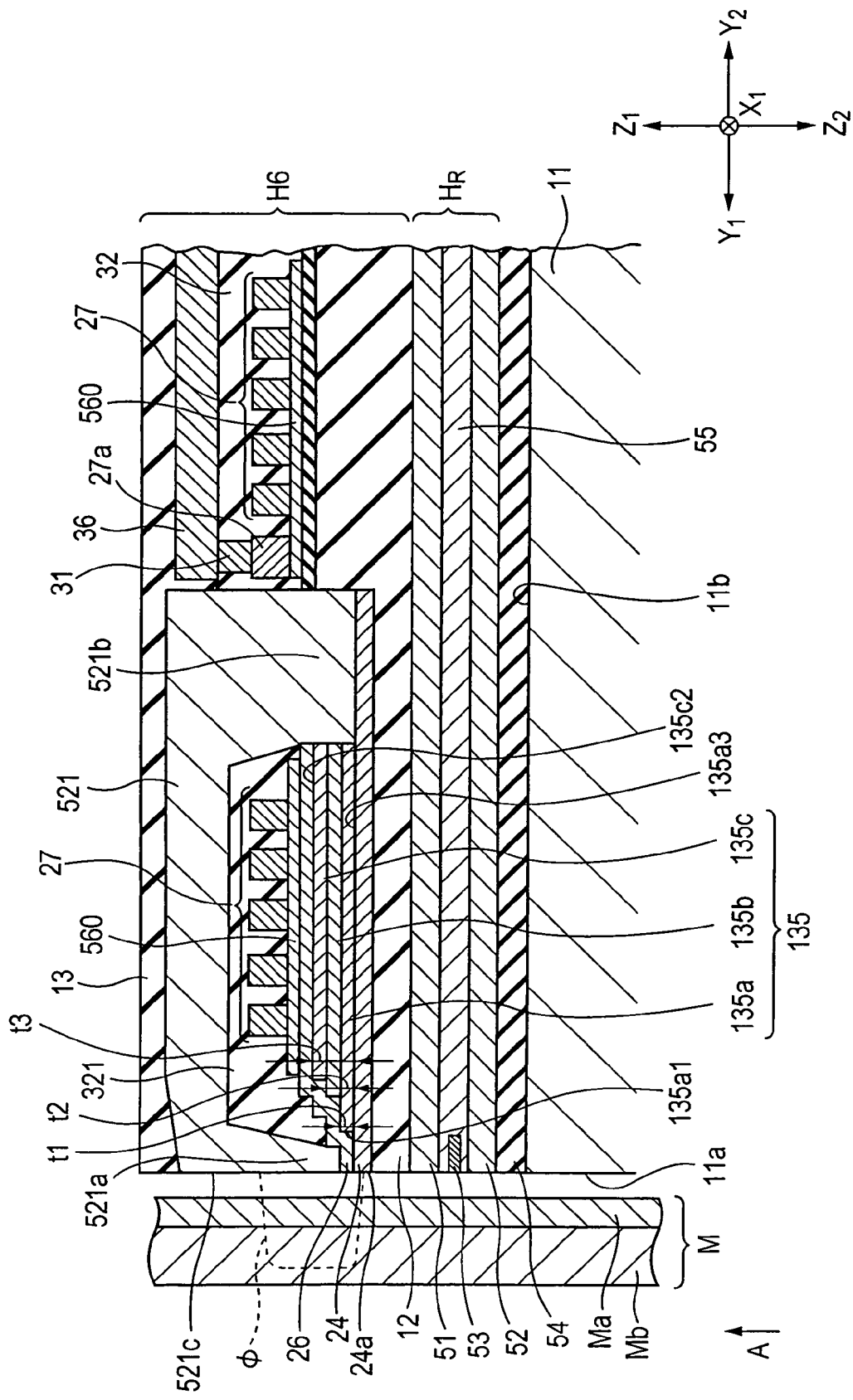
FIG. 20 is a vertical sectional view showing a perpendicular magnetic recording head according to a sixth embodiment of the present invention.
Figure 21:
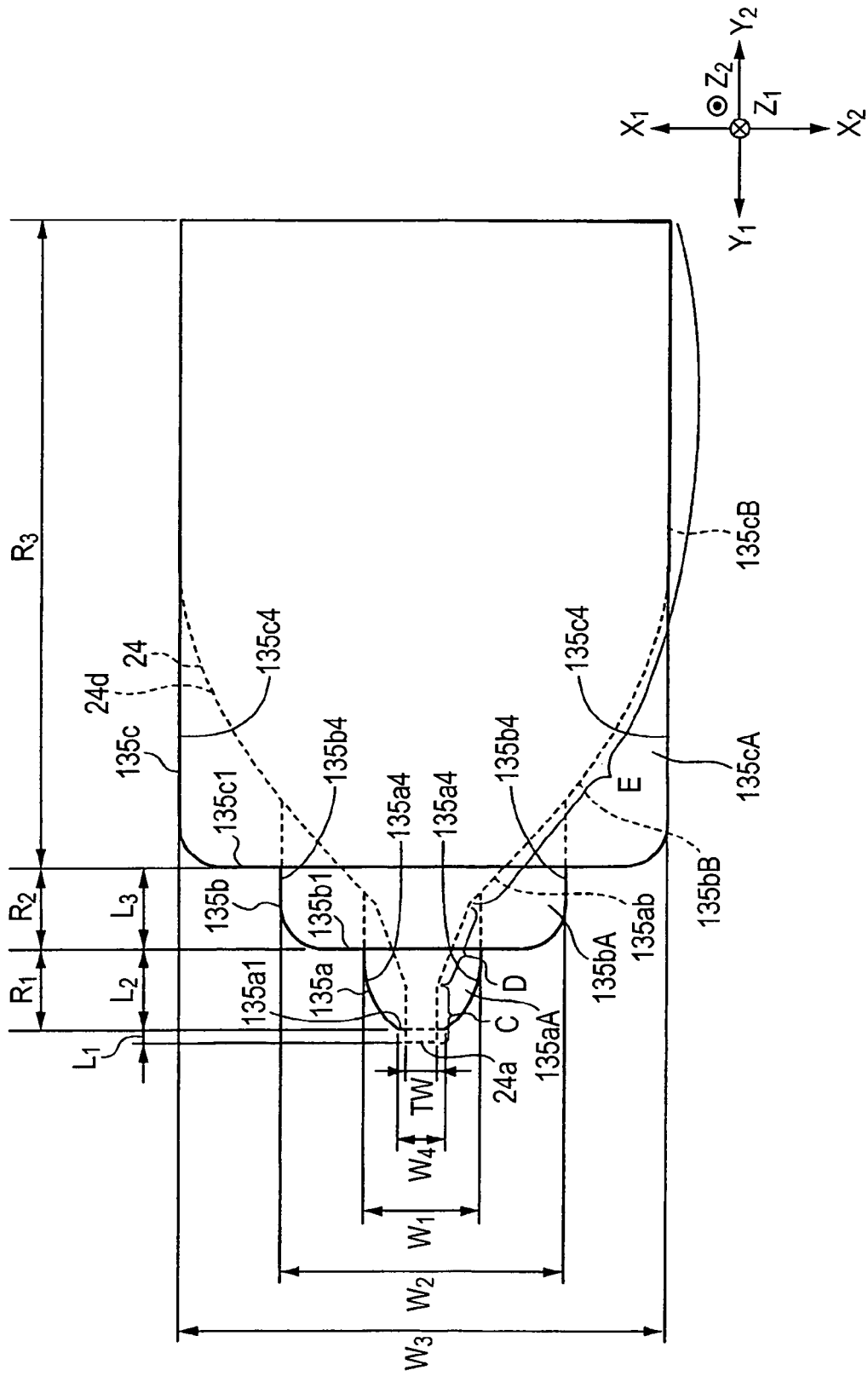
FIG. 21 is a plan view of the perpendicular magnetic recording head shown in FIG. 20, viewed from immediately above.
Figure 22:
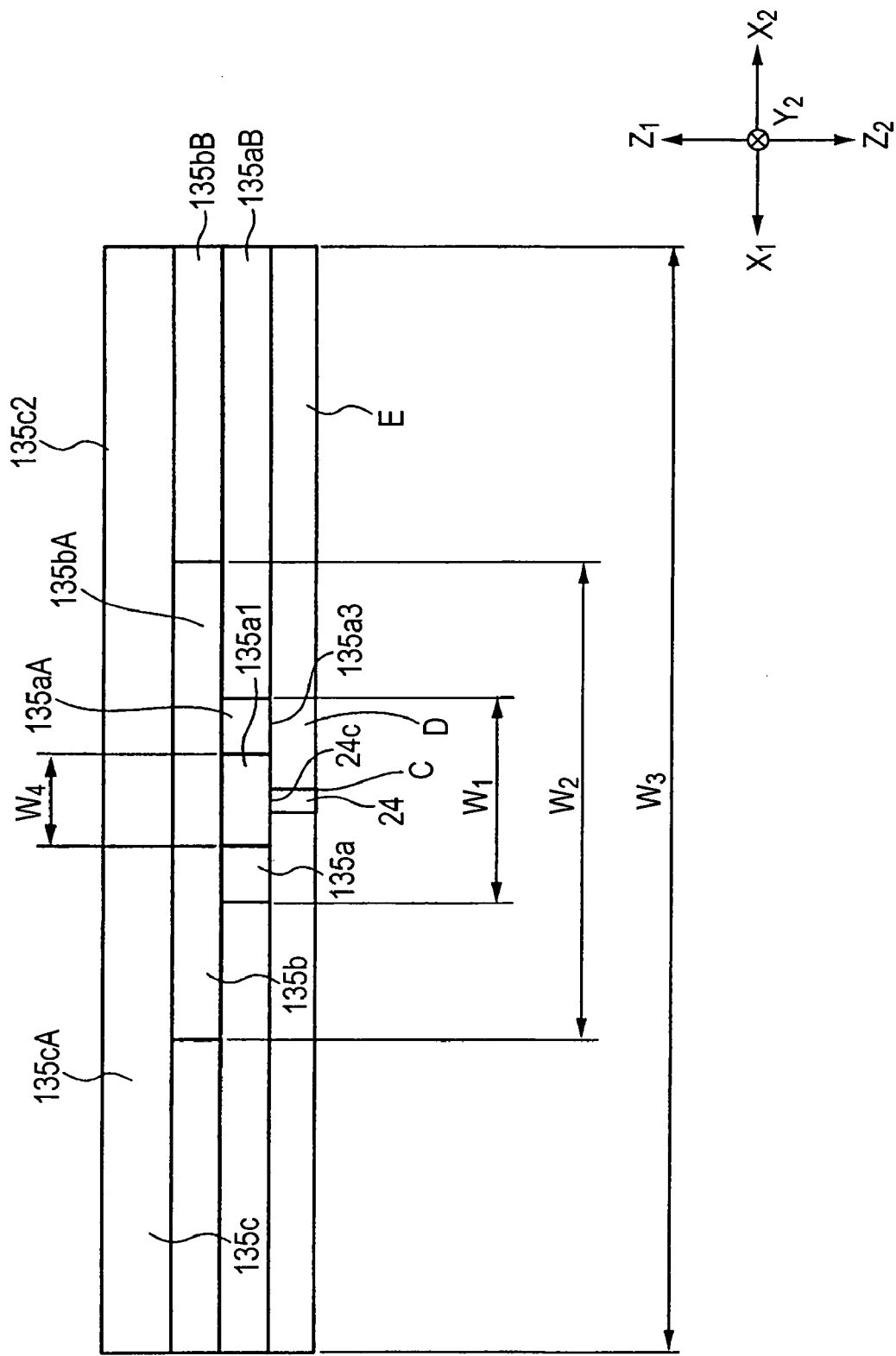
FIG. 22 is a partial front view of the above-described perpendicular magnetic recording head shown in FIG. 20, viewed from the side of a facing-surface opposed to a recording medium.

FIG. 20 is a vertical sectional view showing a structure of a perpendicular magnetic recording head H6 according to the sixth embodiment of the present invention. FIG. 21 is a plan view of the perpendicular magnetic recording head H6 shown in FIG. 20, viewed from immediately above (Z1 direction shown in FIG. 20). FIG. 22 is a partial front view of a main magnetic pole layer 24 and a yoke layer 135 of the above-described perpendicular magnetic recording head H6 shown in FIG. 20, viewed from the side of the facing-surface Ha opposed to the recording medium (Y1 direction side shown in FIG. 20).

The perpendicular magnetic recording head H6 shown in FIG. 20 to FIG. 22 is constructed including the same constituents as in the perpendicular magnetic recording head H5 shown in FIG. 17 to FIG. 19. Therefore, in the above-described perpendicular magnetic recording head H6, the same constituents as in the above-described perpendicular magnetic recording head H5 are indicated by the same reference numerals as those set forth above and detailed explanations thereof will not be provided.

The above-described perpendicular magnetic recording head H6 shown in FIG. 20 to FIG. 22 is different from the perpendicular magnetic recording head H5 shown in FIG. 17 to FIG. 19 in the position at which the yoke layer 135 is disposed. As shown in FIG. 20 and FIG. 22, the above-described yoke layer 135 is disposed at a position on the main magnetic pole layer 24 (trailing side). Furthermore, in the above-described perpendicular magnetic recording head H6, the above-described yoke layer 135 is constructed by laminating three layers of a first layer 135a, a second layer 135b, and a third layer 135c in that order from the bottom. Therefore, in the above-described perpendicular magnetic recording head H6, an upper surface 135c2 of the third layer 135c becomes an upper surface of the yoke layer 135, and a lower surface 135a3 of the first layer 135a becomes a lower surface of the yoke layer 135.

As shown in FIG. 21 and FIG. 22, the lower surface 135a3 of the first layer 135a constituting the above-described yoke layer 135 is disposed in contact with the upper surface 24c of the above-described main magnetic pole layer 24. The above-described second layer 135b is disposed on the above-described first layer 135a while being in contact therewith. The front-end surface 135b1 of the above-described second layer 135b is disposed at a position a predetermined distance L2 from the front-end surface 135a1 of the above-described first layer 135a. The front-end surface 135c1 of the above-described third layer 135c is disposed at a position a predetermined distance L3 from the front-end surface 135b1 of the above-described second layer 135b. Therefore, as shown in FIG. 21 and FIG. 22, the front-end surface 135a1 of the above-described first layer 135a is constructed as the front-end surface of the above-described yoke layer 135. With respect to the rear side in the height direction (Y2 direction shown in the drawing) of the above-described yoke layer 135, a region R1 in which the above-described first layer 135a is disposed alone, a region R2 in which two layers of the above-described first layer 135a and the above-described second layer 135b are disposed, and a region R3 in which three layers of the above-described first layer 135a, the above-described second layer 135b, and the above-described third layer 135c are disposed are included. For example, the above-described distance L2 is 0.1 to 10 μm, and the above-described distance L3 is 0.1 to 10 μm.

As shown in FIG. 21, the front-end surface 135a1 of the above-described first layer 135a is disposed at a position a predetermined distance L1 behind the front-end surface 24a of the above-described main magnetic pole layer 24 in the height direction (Y2 direction shown in FIG. 4). The above-described insulating layer 321 is filled in the side nearer to the facing-surface Ha opposed to the recording medium (Y1 direction shown in the drawing, that is, a side opposite to the rear) than is the front-end surface 135a1 of the above-described first layer 135a. Therefore, the front-end surface 135a1, which constitutes the front end of the above-described yoke layer 135, of the above-described first layer 135a does not appear on the facing-surface Ha opposed to the recording medium. In the above-described yoke layer 135, the above-described distance L1 from the front-end surface 24a of the above-described main magnetic pole layer 24 (facing-surface Ha opposed to the recording medium) to the front-end surface 135a1 of the above-described first layer 135a corresponds to a recess. For example, the above-described distance L1 is 0 to 10 μM.

As shown in FIG. 21 and FIG. 22, the maximum width dimension W1 of the front portion 135aA of the above-described first layer 135a is formed to become smaller than the maximum width dimension W2 of the front portion 135bA of the above-described second layer 135b. The maximum width dimension W2 of the above-described front portion 135bA of the above-described second layer 135b is formed to become smaller than the maximum width dimension W3 of the front portion 135cA of the above-described third layer 135c. Consequently, from the viewpoint of the above-described front portions 135aA, 135bA, and 135cA, the above-described yoke layer 135 is constructed in such a way that the above-described width dimension is increased stepwise from W1 to W2 and from W2 to W3 toward the rear in the height direction (Y2 direction shown in the drawing). For example, the relationship among the above-described width dimension W1, the above-described width dimension W2, and the above-described width dimension W3 is represented by 0.01 µm≦W1≦W2≦W3≦100 µm.

As shown in FIG. 21, the width dimension W4 in a direction (X1 or X2 direction shown in the drawing) orthogonal to the height direction (Y1 or Y2 direction shown in the drawing) of the front-end surface 135a1, which is the front end of the above-described yoke layer 135, of the above-described first layer 135a is increased to the above-described width dimension W1, to the above-described width dimension W2, and to the above-described width dimension W3 toward the rear in the height direction (Y2 direction shown in the drawing).

As shown in FIG. 20 and FIG. 21, the above-described yoke layer 135 in the above-described region R1 is constructed having a film thickness dimension t1 equal to the film thickness dimension of the above-described first layer 135a. The yoke layer 135 in the above-described region R2 is constructed having a film thickness dimension t2 which is a total of the film thickness dimensions of the above-described first layer 135a and the above-described second layer 135b. The yoke layer 135 in the above-described region R3 is constructed having a film thickness dimension t3 which is a total of the film thickness dimensions of the above-described first layer 135a, the above-described second layer 135b, and the above-described third layer 135c. That is, the above-described yoke layer 135 is constructed in such a way that the film thickness dimension is increased stepwise from t1 to t2 and from t2 to t3 toward the rear in the height direction (Y2 direction shown in the drawing). For example, the above-described film thickness dimension t1, the above-described film thickness dimension t2, and the above-described film thickness dimension t3 are configured to increase stepwise within the range of 0.01 to 10 µm.

As shown in FIG. 22, from the viewpoint of the above-described front portions 135aA, 135bA, and 135cA, the above-described yoke layer 135 is constructed in such a way that the maximum width dimension W1 of the above-described front portion 135aA of the first layer 135a disposed as a lowermost layer (Z2 direction-side layer in the drawing) becomes the smallest, the maximum width dimension W2 of the above-described front portion 135bA of the second layer 135b disposed on the first layer 135a and disposed as a middle layer becomes larger than the maximum width dimension W1 of the above-described front portion 135aA of the above-described first layer 135a, and the maximum width dimension W3 of the above-described front portion 135cA of the third layer 135c disposed as an uppermost layer (Z1 direction shown in the drawing) becomes larger than the above-described maximum width dimension W1 of the above-described front portion 135aA of the first layer 135a and the above-described maximum width dimension W2 of the above-described front portion 135bA of the second layer 135b. That is, from the viewpoint of the above-described front portions 135aA, 135bA, and 135cA, the above-described yoke layer 135 is constructed in such a way that the above-described width dimension is increased stepwise from W1 to W2 and from W2 to W3 from the lower surface 135a3, which is the lower surface of the yoke layer 135, of the first layer 135a toward the upper surface 135c2, which is the upper surface of the yoke layer 135, of the third layer 135c (toward Z1 direction shown in the drawing, that is, in an upward direction).

In the above-described perpendicular magnetic recording head H6 shown in FIG. 20 to FIG. 22 as well, both the above-described width dimension W4 and the thickness dimension of the front-end surface 135a1, which serves as the front end of the above-described yoke layer 135, of the above-described first layer 135a are configured to increase (become divergent) stepwise toward the rear in the height direction (Y2 direction shown in the drawing). That is, the above-described yoke layer 135 is constructed in such a way that both the width dimension and the thickness dimension are decreased toward the facing-surface Ha opposed to the recording medium and, therefore, the magnetic volume of the above-described yoke layer 135 can be reduced stepwise toward the facing-surface Ha opposed to the recording medium. Consequently, even when the above-described yoke layer 135 is brought close to the facing-surface Ha opposed to the above-described recording medium in order to effectively induce the recording magnetic field to the above-described main magnetic pole layer 24, the recording magnetic field is resistant to flowing from the above-described yoke layer 135 to the facing-surface Ha opposed to the above-described recording medium M, so that an occurrence of side fringing can be suppressed.

Since both the width dimension and the thickness dimension of the above-described yoke layer 135 are configured to increase toward the rear in the height direction (Y2 direction shown in the drawing), the magnetic volume is increased in a direction farther from the facing-surface Ha opposed to the recording medium. Consequently, the magnetic volume of the above-described yoke layer 135 as a whole can be increased, so that the recording magnetic field can easily be induced to the above-described main magnetic pole layer 24.

Furthermore, the above-described yoke layer 135 is constructed in such a way that the width dimension W4 is increased from the lower surface 135a3, which constitutes the lower surface of the yoke layer 135, of the first layer 135a toward the upper surface 135c2, which constitutes the upper surface of the yoke layer 135, of the third layer 135c, that is, the width dimension W4 is divergent in a direction farther from the main magnetic pole layer 24. Consequently, the magnetic volume of the above-described yoke layer 135 as a whole can be further increased, so that the recording magnetic field can easily be induced to the above-described main magnetic pole layer 24 effectively.

As described above, in the perpendicular magnetic recording head H6 of the present invention as well, even when the above-described yoke layer 135 is brought close to the facing-surface Ha opposed to the recording medium in order to effectively induce the recording magnetic field to the main magnetic pole layer 24, an occurrence of side fringing can be suppressed since the magnetic volume of the above-described yoke layer 135 is decreased toward facing-surface Ha opposed to the magnetic recording medium. In addition, since the magnetic volume of the yoke layer 135 is configured to increase as a whole, the recording magnetic field can easily be induced to the above-described main magnetic pole layer 24 effectively.

As shown in FIG. 20, similarly to the above-described perpendicular magnetic recording head H5, the above-described perpendicular magnetic recording head H6 is of a so-called shielded pole type, and is configured to have a form in which the above-described main magnetic pole layer 24 is disposed at a position on the leading side (Z2 direction side shown in the drawing) relative to the above-described auxiliary magnetic pole layer 521 and the front-end portion 521a of the above-described auxiliary magnetic pole layer 521 approaches toward the above-described main magnetic pole layer 24.

Therefore, similarly to the above-described perpendicular magnetic recording head H5, the perpendicular magnetic recording head H6 shown in FIG. 20 is constructed in such a way that the above-described main magnetic pole layer 24 is positioned on the leading side (Z2 direction side shown in the drawing) relative to the above-described auxiliary magnetic pole layer 521. Therefore, in the perpendicular magnetic recording head H6 shown in FIG. 20, the above-described auxiliary magnetic pole layer 521 can be positioned on the trailing side of the main magnetic pole layer 24, so that the recording magnetic field from the main magnetic pole layer 24 can be concentrated on the trailing side.

In the above description, the perpendicular magnetic recording head H5 shown in FIG. 17 to FIG. 19 and the perpendicular magnetic recording head H6 shown in FIG. 20 to FIG. 22 are explained, wherein the embodiments in which the above-described yoke layer 135 is composed of three layers of the first layer 135a, the second layer 135b, and the third layer 135c are taken as examples. However, in the above-described perpendicular magnetic recording head H5 and the above-described perpendicular magnetic recording head H6, the above-described yoke layer 135 is not limited to those composed of three layers. For example, the above-described yoke layer 135 may be composed of two layers or at least four layers.

Preferably, the above-described yoke layer 135 is configured to have a larger saturation magnetic flux density with increasing proximity to the above-described main magnetic pole layer 24. For example, the yoke layer 135 can be configured to have a larger saturation magnetic flux density with increasing proximity to the above-described main magnetic pole layer 24 by differentiating the materials for the above-described first layer 135a, the above-described second layer 135b, and the above-described third layer 135c from each other. Since a magnetic flux can easily be concentrated on the front end of the above-described main magnetic pole layer 24 by such a configuration, the recording density can be improved.

Figure 23:
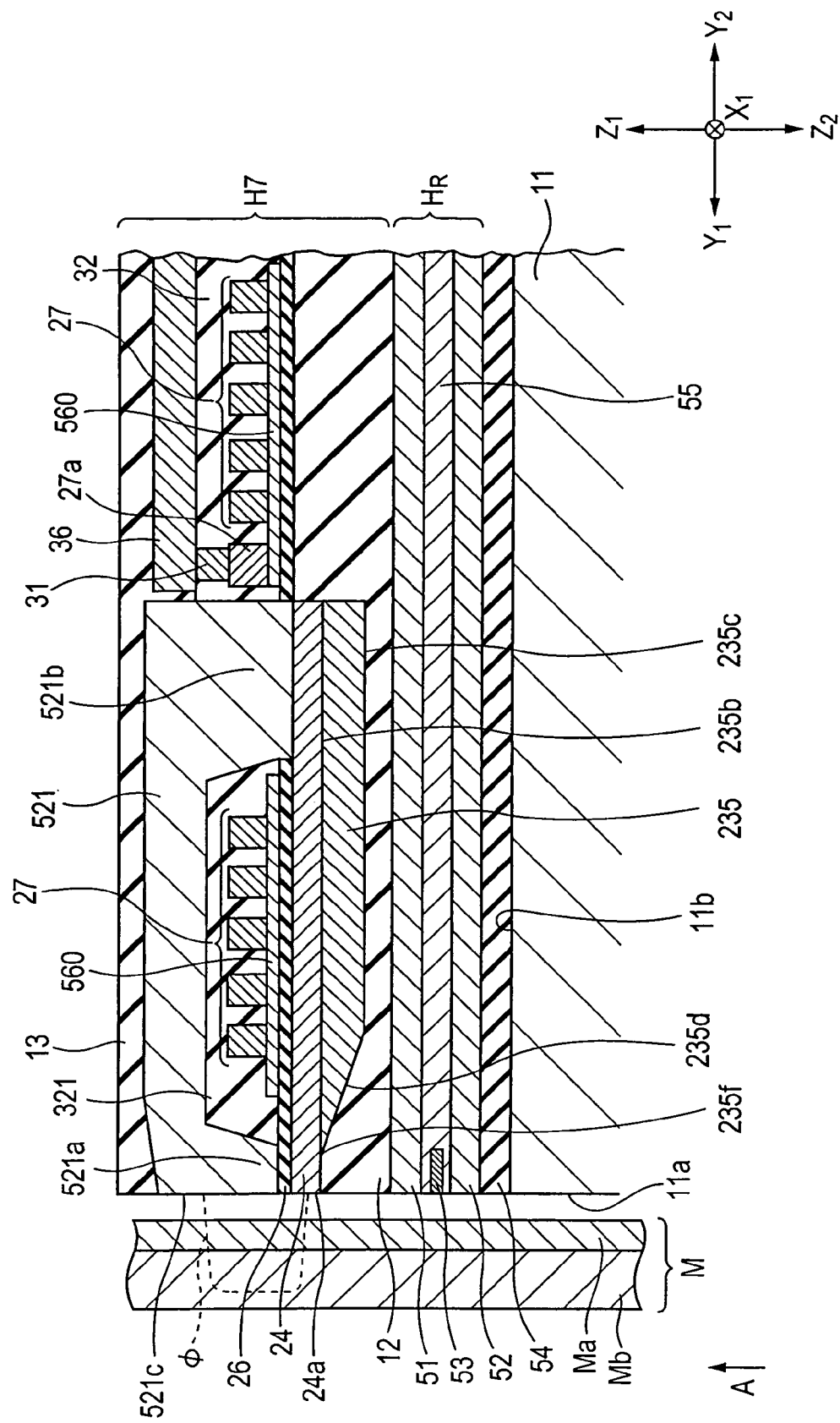
FIG. 23 is a vertical sectional view showing a perpendicular magnetic recording head according to a seventh embodiment of the present invention.
Figure 24:
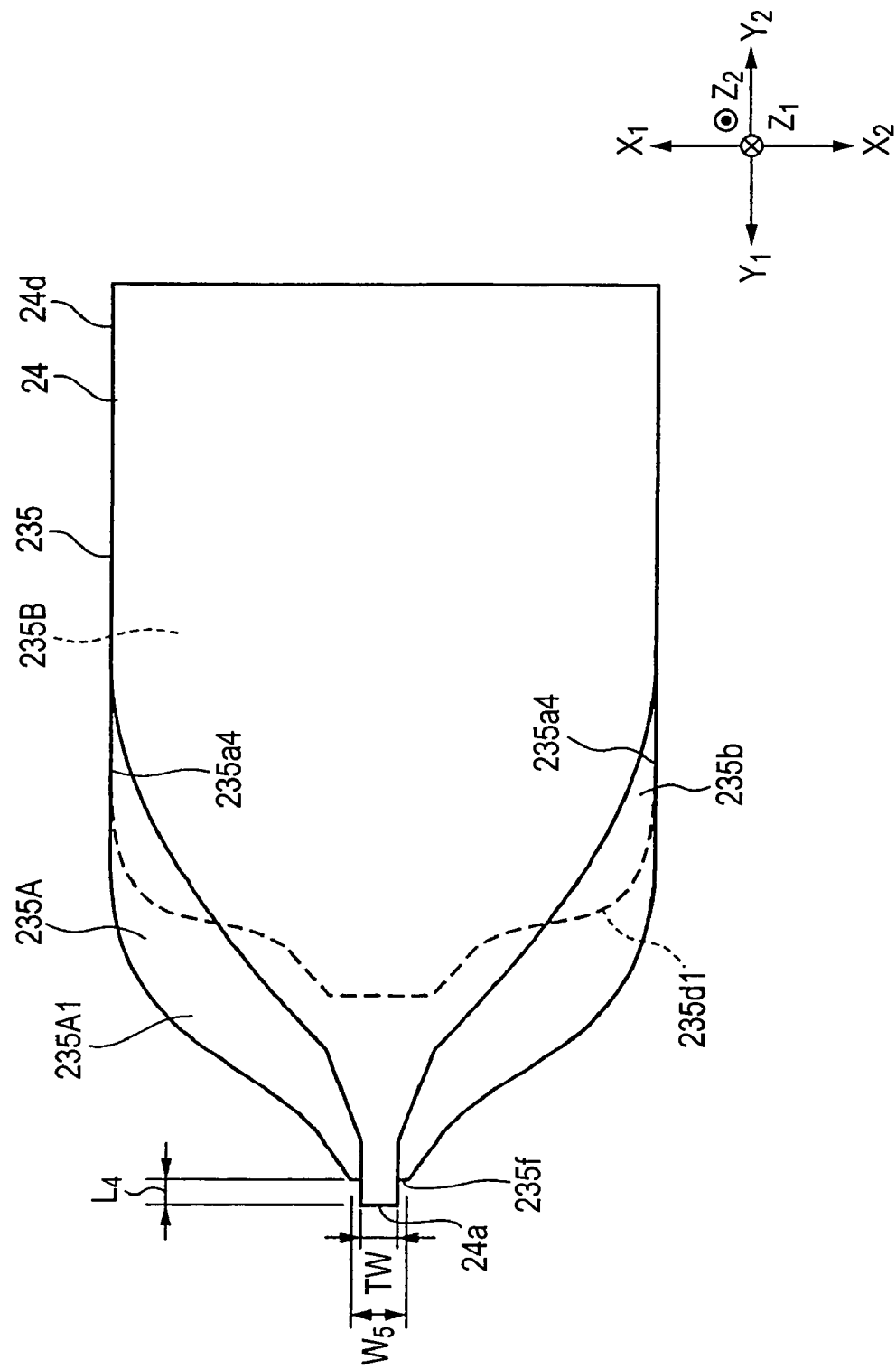
FIG. 24 is a plan view of the perpendicular magnetic recording head shown in FIG. 23, viewed from immediately above.
Figure 25:
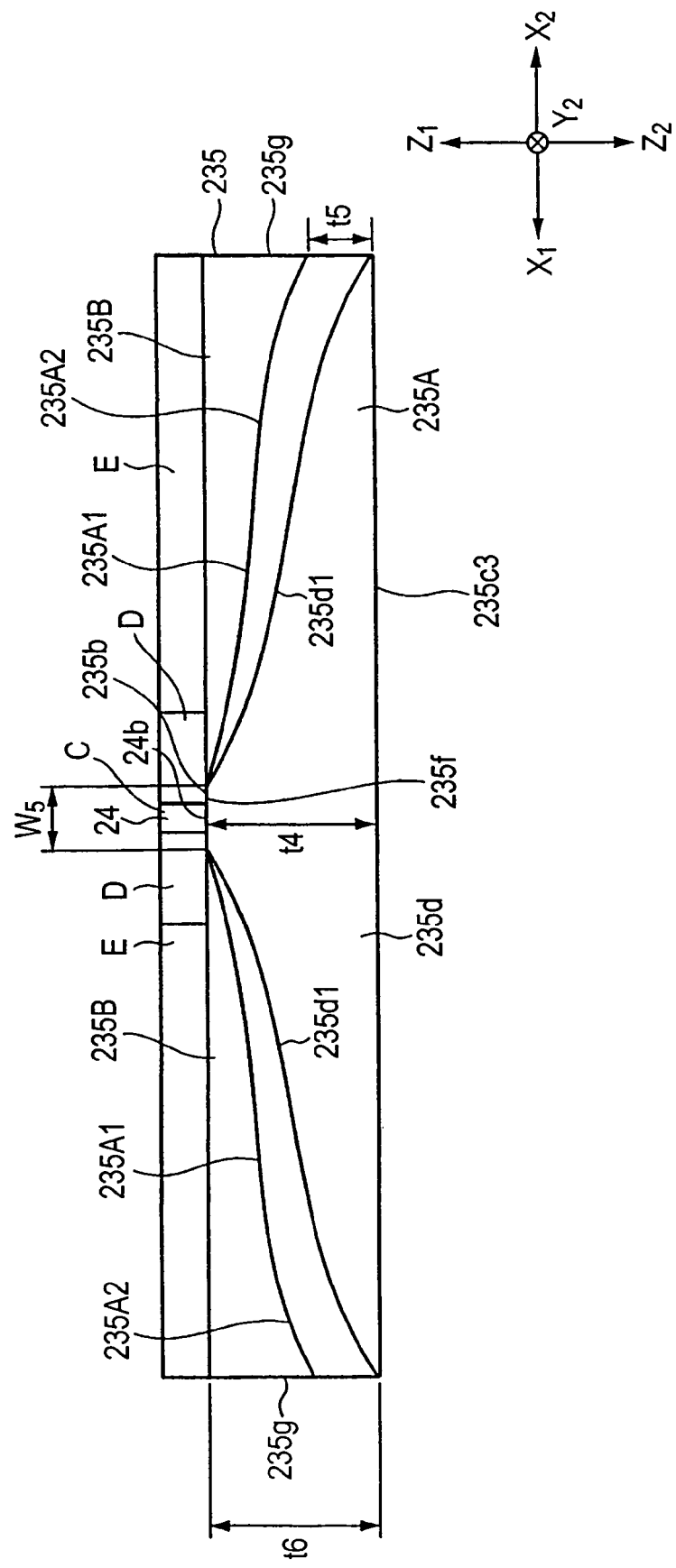
FIG. 25 is a partial front view of the above-described perpendicular magnetic recording head shown in FIG. 23, viewed from the side of a facing-surface opposed to a recording medium.

FIG. 23 is a vertical sectional view showing a structure of a perpendicular magnetic recording head H7 according to the seventh embodiment of the present invention. FIG. 24 is a plan view of the perpendicular magnetic recording head shown in FIG. 23, viewed from immediately above (Z1 direction shown in FIG. 23). FIG. 25 is a partial front view of a main magnetic pole layer 24 and a yoke layer 235 of the above-described perpendicular magnetic recording head H7 shown in FIG. 23, viewed from the side of the facing-surface Ha opposed to the recording medium (Y1 direction shown in FIG. 23).

The perpendicular magnetic recording head H7 shown in FIG. 23 to FIG. 25 is constructed including the same constituents as in the above-described perpendicular magnetic recording head H3 shown in FIG. 7 to FIG. 9 and the above-described perpendicular magnetic recording head H5 shown in FIG. 17 to FIG. 19. Therefore, in the above-described perpendicular magnetic recording head H7, the same constituents as in the above-described perpendicular magnetic recording heads H3 and H5 are indicated by the same reference numerals as those set forth above and detailed explanations thereof will not be provided.

As shown in FIG. 23 to FIG. 25, the above-described perpendicular magnetic recording head H7 is configured to have a structure in which an integral-type yoke layer 235 shown in FIG. 7 to FIG. 9 is disposed in place of the above-described yoke layer 135 of the above-described perpendicular magnetic recording head H5 shown in FIG. 17 to FIG. 19.

As shown in FIG. 23 and FIG. 24, the above-described yoke layer 235 is surrounded by the insulating layer 12. The above-described insulating layer 12 appears on the facing-surface Ha opposed to the above-described recording medium. The front end 235f of the above-described yoke layer 235 is positioned behind the above-described facing-surface Ha in the height direction.

As shown in FIG. 24, the front end 235f of the above-described yoke layer 235 is disposed at a position a predetermined distance L4 behind the front-end surface 24a (facing-surface Ha opposed to the recording medium) of the main magnetic pole layer 24 in the height direction (Y2 direction side shown in the drawing). The above-described distance L4 from the front-end surface 24a (facing-surface Ha opposed to the recording medium) of the above-described main magnetic pole layer 24 to the above-described front end 235f of the above-described yoke layer 235 corresponds to a recess. For example, the above-described distance L4 is more than 0 μm and 10 μm or less.

As shown in FIG. 24, the above-described yoke layer 235 is configured to include a front portion 235A having a width dimension divergent gradually and extending from the above-described front end 235f toward the rear in the height direction and a rear portion 235B extending from this front portion 235A toward the rear in the height direction.

The above-described front portion 235A of the above-described yoke layer 235 is extended from the above-described front end 235f toward the rear in the height direction up to the position at which side-edge portions 235a4 of the above-described yoke layer 235 are opposed to the above-described main magnetic pole layer 24 in a film thickness direction (Z1 or Z2 direction shown in the drawing). The above-described rear portion 235B is constructed from the position at which the side-edge portions 235a4 of the above-described yoke layer 235 are opposed to the main magnetic pole layer 24 in the film thickness direction toward the rear in the height direction. As shown in FIG. 23, the above-described rear portion 235B is formed into the shape exhibiting a plan view in accordance with the shape formed by an outer edge 24d of the above-described main magnetic pole layer 24, when viewed from immediately above.

As shown in FIG. 24, this yoke layer 235 is constructed in such a way that the width dimension W5 in a direction orthogonal to the height direction of the front end 235f of the above-described yoke layer 235 is divergent continuously toward the rear in the height direction (Y2 direction shown in the drawing).

As shown in FIG. 25, in the above-described front portion 235A of the above-described yoke layer 235, upper sloped surfaces 235A2 which descend in the downward direction (Z2 direction shown in the drawing) with increasing proximity to both side-edge surfaces 235g and 235g of the above-described yoke layer 235 are disposed on an upper surface 235A1 of the above-described front portion 235A. Furthermore, lower sloped surfaces 235d1 which descend in the downward direction with increasing proximity to both side-edge surfaces 235g and 235g of the above-described yoke layer 235 are disposed on the front-end surface 235d of the above-described front portion 235A. The above-described film thickness dimension is configured to gradually increase from both side-edge portions of the front end 235f of the above-described yoke layer 235 up to a film thickness dimension t5 at both the above-described side-edge surfaces 235g and 235g. Therefore, the width dimension W5 in a direction orthogonal to the height direction of the front end 235f of the above-described yoke layer 235 is configured to increase continuously from the upper surface 235b toward the lower surface 235c (toward Z2 direction shown in the drawing, that is, in a downward direction), in such a way that the above-described width dimension is increased continuously in a direction farther from the above-described main magnetic pole layer 24.

On the other hand, the above-described rear portion 235B is formed having a constant film thickness dimension. Preferably, the film thickness dimension t6 of the above-described rear portion 235B is made larger than or equal to the above-described film thickness dimension t4 of the above-described front portion 235A. When the film thickness of the above-described rear portion 235B is configured as described above, the magnetic volume of the above-described yoke layer 235 as a whole can be increased, so that the recording magnetic field can easily be induced to the main magnetic pole layer 24.

As shown in FIG. 23, the front-end surface 235d of the above-described yoke layer 235 is formed from a sloped surface that approaches the above-described facing-surface Ha with increasing proximity to the upper surface 235b from the lower surface 235c. Therefore, in the above-described front-end surface 235d disposed as the sloped surface, the film thickness is configured to increase continuously toward the rear in the height direction (Y2 direction shown in the drawing). Preferably, the interior angle θ1 between the lower surface 24b of the main magnetic pole layer 24 disposed on the above-described yoke layer 235 and the front-end surface 235d of the above-described yoke layer 235 is within the range of 0° to 150°. When the above-described front-end surface 235d is disposed as the sloped surface and the above-described interior angle θ1 is specified to be within the above-described range, flowing of the recording magnetic field from the above-described yoke layer 235 to the recording medium M can easily be suppressed and, thereby, an occurrence of side fringing can be suppressed.

As shown in FIG. 23, similarly to the above-described perpendicular magnetic recording head H5., the above-described perpendicular magnetic recording head H7 is of a so-called shielded pole type, and is configured to have a form in which the above-described main magnetic pole layer 24 is disposed at a position on the leading side relative to the above-described auxiliary magnetic pole layer 521 and the front-end portion 521a of the above-described auxiliary magnetic pole layer 521 approaches toward the above-described main magnetic pole layer 24.

Furthermore, the above-described perpendicular magnetic recording head H7 shown in FIG. 23 also has the so-called shielded pole type structure and, therefore, is constructed in such a way that the above-described main magnetic pole layer 24 is positioned on the leading side (Z2 direction side shown in the drawing) relative to the above-described auxiliary magnetic pole layer 521. Consequently, in the perpendicular magnetic recording head H7 shown in FIG. 23 as well, the above-described auxiliary magnetic pole layer 521 can be positioned on the trailing side of the main magnetic pole layer 24, so that the recording magnetic field from the main magnetic pole layer 24 can be concentrated on the trailing side.

The above-described front-end surface 235d may be disposed as a curved surface protruded toward the side of the facing-surface Ha opposed to the recording medium (Y1 direction side shown in FIG. 23), or a curved surface dented toward the rear side in the height direction (Y2 direction side shown in FIG. 23).

Figure 26:
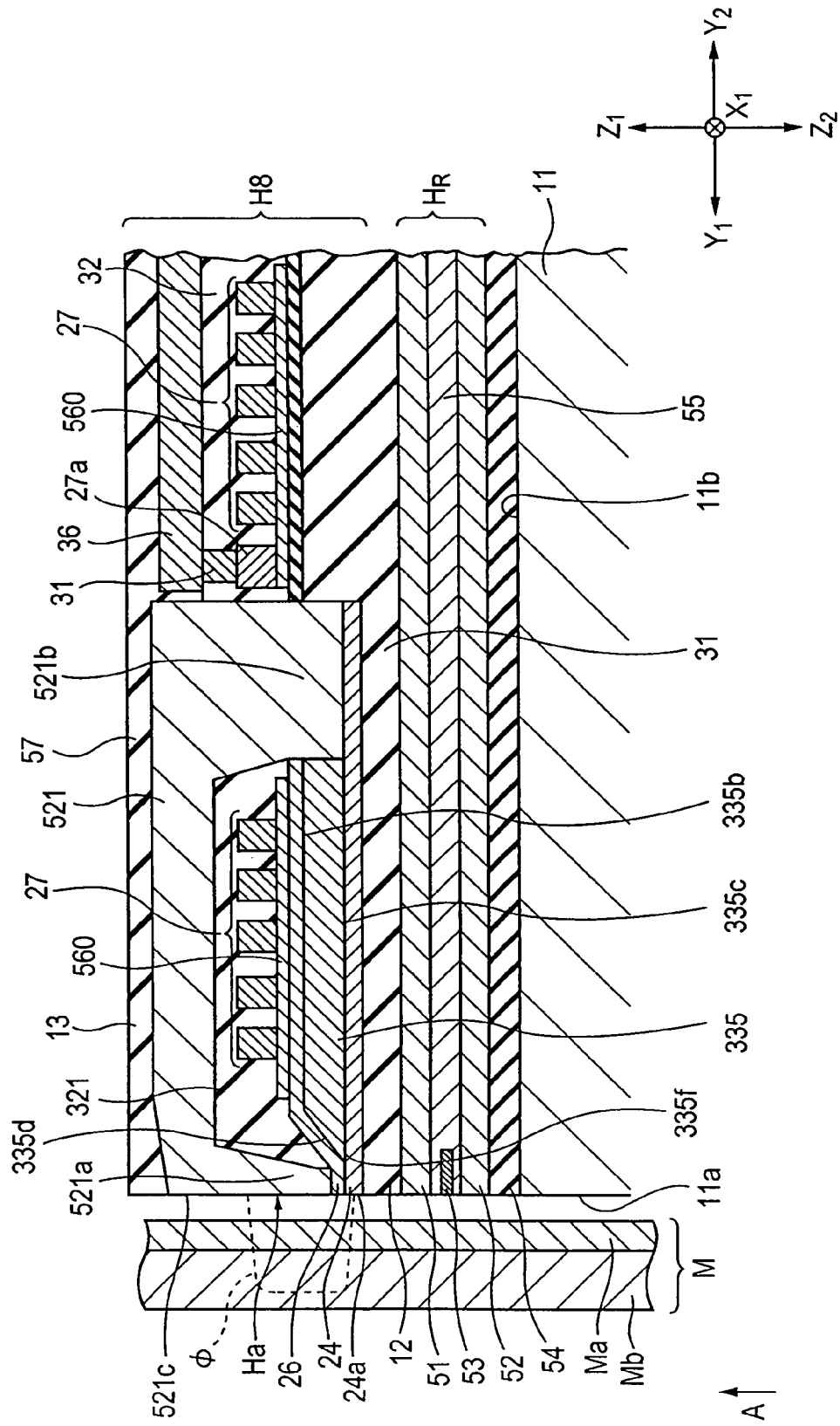
FIG. 26 is a vertical sectional view showing a perpendicular magnetic recording head according to an eighth embodiment of the present invention.
Figure 27:
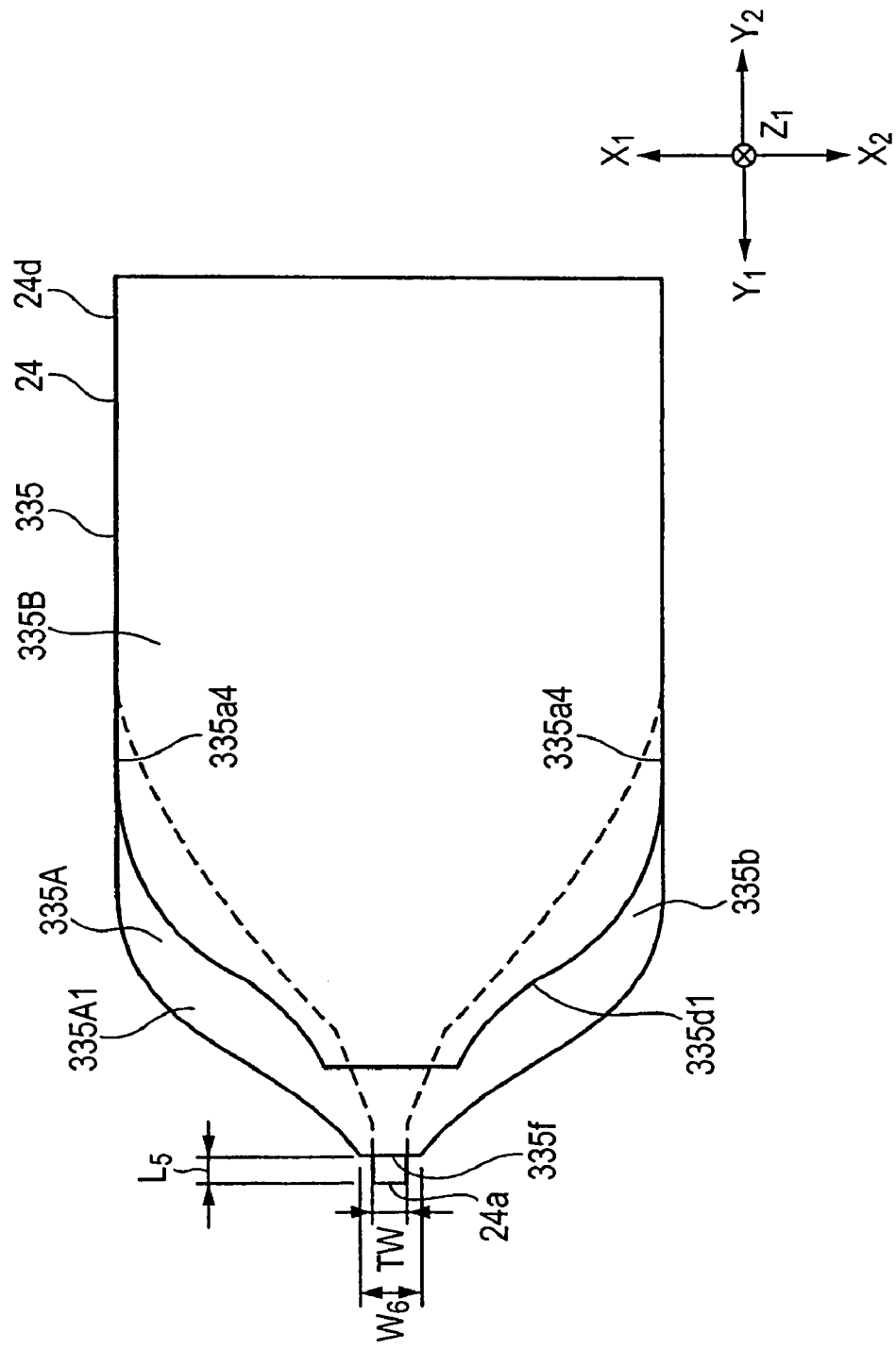
FIG. 27 is a plan view of the perpendicular magnetic recording head shown in FIG. 26, viewed from immediately above.
Figure 28:
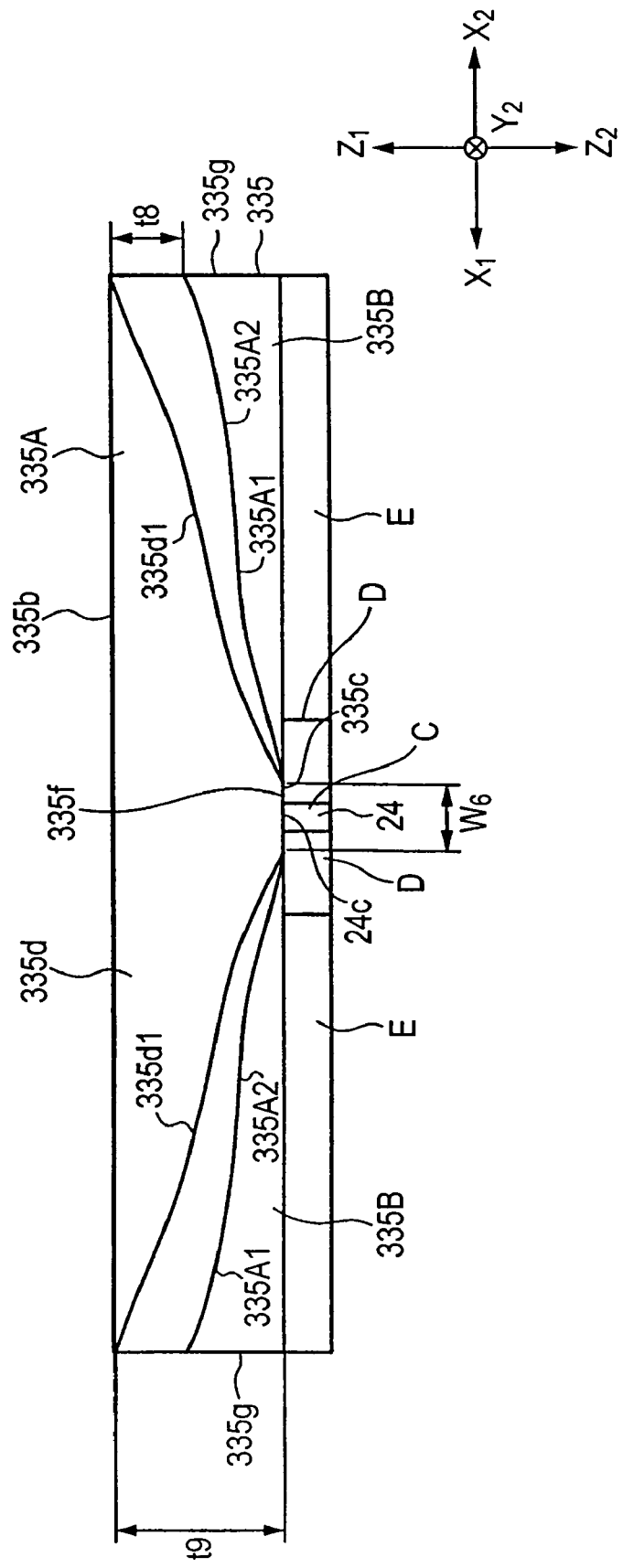
FIG. 28 is a partial front view of the above-described perpendicular magnetic recording head shown in FIG. 26, viewed from the side of a facing-surface opposed to a recording medium.

FIG. 26 is a vertical sectional view showing a structure of a perpendicular magnetic recording head H8 according to the eighth embodiment of the present invention. FIG. 27 is a plan view of the perpendicular magnetic recording head shown in FIG. 26, viewed from immediately above (Z1 direction shown in FIG. 26). FIG. 28 is a partial front view of a main magnetic pole layer 24 and a yoke layer 335 of the above-described perpendicular magnetic recording head H8 shown in FIG. 26, viewed from the side of the facing-surface Ha opposed to the recording medium (Y1 direction shown in FIG. 26).

The perpendicular magnetic recording head H8 shown in FIG. 26 to FIG. 28 is constructed including the same constituents as in the above-described perpendicular magnetic recording head H4 shown in FIG. 10 to FIG. 12 and the above-described perpendicular magnetic recording head H6 shown in FIG. 20 to FIG. 22. Therefore, in the above-described perpendicular magnetic recording head H8, the same constituents as in the above-described perpendicular magnetic recording heads H4 and H6 are indicated by the same reference numerals as those set forth above and detailed explanations thereof will not be provided.

As shown in FIG. 26 to FIG. 28, the above-described perpendicular magnetic recording head H8 is configured to have a structure in which an integral-type yoke layer 335 shown in FIG. 10 to FIG. 12 is disposed in place of the above-described yoke layer 135 of the above-described perpendicular magnetic recording head H6 shown in FIG. 20 to FIG. 22.

As shown in FIG. 26 and FIG. 27, the above-described yoke layer 335 is surrounded by the insulating layer 12. The front end 335f of the above-described yoke layer 335 is positioned behind the above-described facing-surface Ha in the height direction.

As shown in FIG. 27, the front end 335f of the above-described yoke layer 335 is disposed at a position a predetermined distance L5 behind the front-end surface 24a (facing-surface Ha opposed to the recording medium) of the main magnetic pole layer 24 in the height direction (Y2 direction side shown in the drawing). The above-described distance L5 from the front-end surface 24a (facing-surface Ha opposed to the recording medium) of the above-described main magnetic pole layer 24 to the above-described front end 335f of the above-described yoke layer 335 corresponds to a recess. For example, the above-described distance L5 is more than 0 μm and 10 μm or less.

As described above, in the above-described perpendicular magnetic recording head H8, the front-end 335f of the above-described yoke layer 335 is disposed at a position a predetermined distance L5 behind the above-described front-end surface 24a of the above-described main magnetic pole layer 24 in the height direction (Y2 direction shown in the drawing). Therefore, the leakage magnetic field from the above-described yoke layer 335 is allowed to become resistant to flowing to the recording medium M, so that an occurrence of side fringing can be suppressed effectively.

As shown in FIG. 27, the above-described yoke layer 335 is configured to include a front portion 335A having a width dimension divergent gradually and extending from the front end 335f toward the rear in the height direction and a rear portion 335B extending from this front portion 335A toward the rear in the height direction.

The above-described front portion 335A of the above-described yoke layer 335 is extended from the above-described front end 335f toward the rear in the height direction up to the position at which side-edge portions 335a4 of the above-described yoke layer 335 are opposed to the above-described main magnetic pole layer 24 in a film thickness direction (Z1 or Z2 direction shown in the drawing). The above-described rear portion 335B is constructed from the position at which the side-edge portions 335a4 of the above-described yoke layer 335 are opposed to the main magnetic pole layer 24 in the film thickness direction toward the rear in the height direction. As shown in FIG. 27, the above-described rear portion 335B is formed into the shape exhibiting a plan view in accordance with the shape formed by an outer edge 24d of the above-described main magnetic pole layer 24, when viewed from immediately above.

As shown in FIG. 27, this yoke layer 335 is constructed in such a way that the width dimension W6 in a direction orthogonal to the height direction of the front end 335f of the above-described yoke layer 335 is divergent continuously toward the rear in the height direction (Y2 direction shown in the drawing).

As shown in FIG. 28, in the above-described front portion 335A of the above-described yoke layer 335, lower sloped surfaces 335A2 which ascend in the upward direction (Z1 direction shown in the drawing) with increasing proximity to both side-edge surfaces 335g and 335g of the above-described yoke layer 335 are disposed on a lower surface 335A1 of the above-described front portion 335A. Furthermore, upper sloped surfaces 335d1 which ascend in the upward direction with increasing proximity to both side-edge surfaces 335g and 335g of the above-described yoke layer 335 are disposed on the front-end surface 335d of the above-described front portion 335A. The above-described film thickness dimension is configured to gradually increase from both side-edge portions of the front end 335f of the above-described yoke layer 335 up to a film thickness dimension t8 at both the above-described side-edge surfaces 335g and 335g. Therefore, the width dimension W6 in a direction orthogonal to the height direction of the front end 335f of the above-described yoke layer 335 is configured to increase continuously from the lower surface 335c toward the upper surface 335b (toward Z1 direction shown in the drawing, that is, in an upward direction), in such a way that the above-described width dimension W6 is increased in a direction farther from the above-described main magnetic pole layer 24.

On the other hand, the above-described rear portion 335B is formed having a constant film thickness dimension. Preferably, the film thickness dimension t9 of the above-described rear portion 335B is made larger than the above-described front end 335f. When the film thickness of the above-described rear portion 335B is configured as described above, the magnetic volume of the above-described yoke layer 335 as a whole can be increased, so that the recording magnetic field can easily be induced to the main magnetic pole layer 24.

As shown in FIG. 26, the front-end surface 335d of the above-described yoke layer 335 is formed from a sloped surface that approaches the above-described facing-surface Ha with increasing proximity to the lower surface 335c from the upper surface 335b. Therefore, in the above-described front-end surface 335d disposed as the sloped surface, the film thickness is configured to increase continuously toward the rear in the height direction (Y2 direction shown in the drawing). Preferably, the interior angle θ2 between the upper surface 24c of the main magnetic pole layer 24 disposed under the above-described yoke layer 335 and the front-end surface 335d of the above-described yoke layer 335 is within the range of 0° to 150°. When the above-described front-end surface 335d is disposed as the sloped surface and the above-described interior angle θ2 is specified to be within the above-described range, flowing of the recording magnetic field from the above-described yoke layer 335 to the recording medium M can easily be suppressed and, thereby, an occurrence of side fringing can be suppressed.

The above-described front-end surface 335d may be disposed as a curved surface protruded toward the side of the facing-surface Ha opposed to the recording medium (Y1 direction side shown in FIG. 26), or a curved surface dented toward the rear side in the height direction (Y2 direction side shown in FIG. 26).

As shown in FIG. 26, similarly to the above-described perpendicular magnetic recording head H6 shown in FIG. 20, the above-described perpendicular magnetic recording head H8 is of a so-called shielded pole type, and is configured to have a form in which the above-described main magnetic pole layer 24 is disposed at a position on the leading side relative to the above-described auxiliary magnetic pole layer 521 and the front-end portion 521a of the above-described auxiliary magnetic pole layer 521 approaches toward the above-described main magnetic pole layer 24. Therefore, in the configuration, the above-described main magnetic pole layer 24 is positioned on the leading side (Z2 direction side shown in the drawing) relative to the above-described auxiliary magnetic pole layer 521. Consequently, in the perpendicular magnetic recording head H8 shown in FIG. 26 as well, the above-described auxiliary magnetic pole layer 521 can be positioned on the trailing side of the main magnetic pole layer 24, so that the recording magnetic field from the main magnetic pole layer 24 can be concentrated on the trailing side.

The above-described front-end surface 335d may be disposed as a curved surface protruded toward the side of the facing-surface Ha opposed to the recording medium (Y1 direction side shown in FIG. 26), or a curved surface dented toward the rear side in the height direction (Y2 direction side shown in FIG. 26).

In the above-described perpendicular magnetic recording head H7 shown in FIG. 23 to FIG. 25 and the above-described perpendicular magnetic recording head H8 shown in FIG. 26 to FIG. 28 as well, preferably, the above-described yoke layers 235 and 335 are configured to have larger saturation magnetic flux densities with increasing proximity to the above-described main magnetic pole layer 24 in order to improve the recording density.

EXAMPLES

Figure 13:
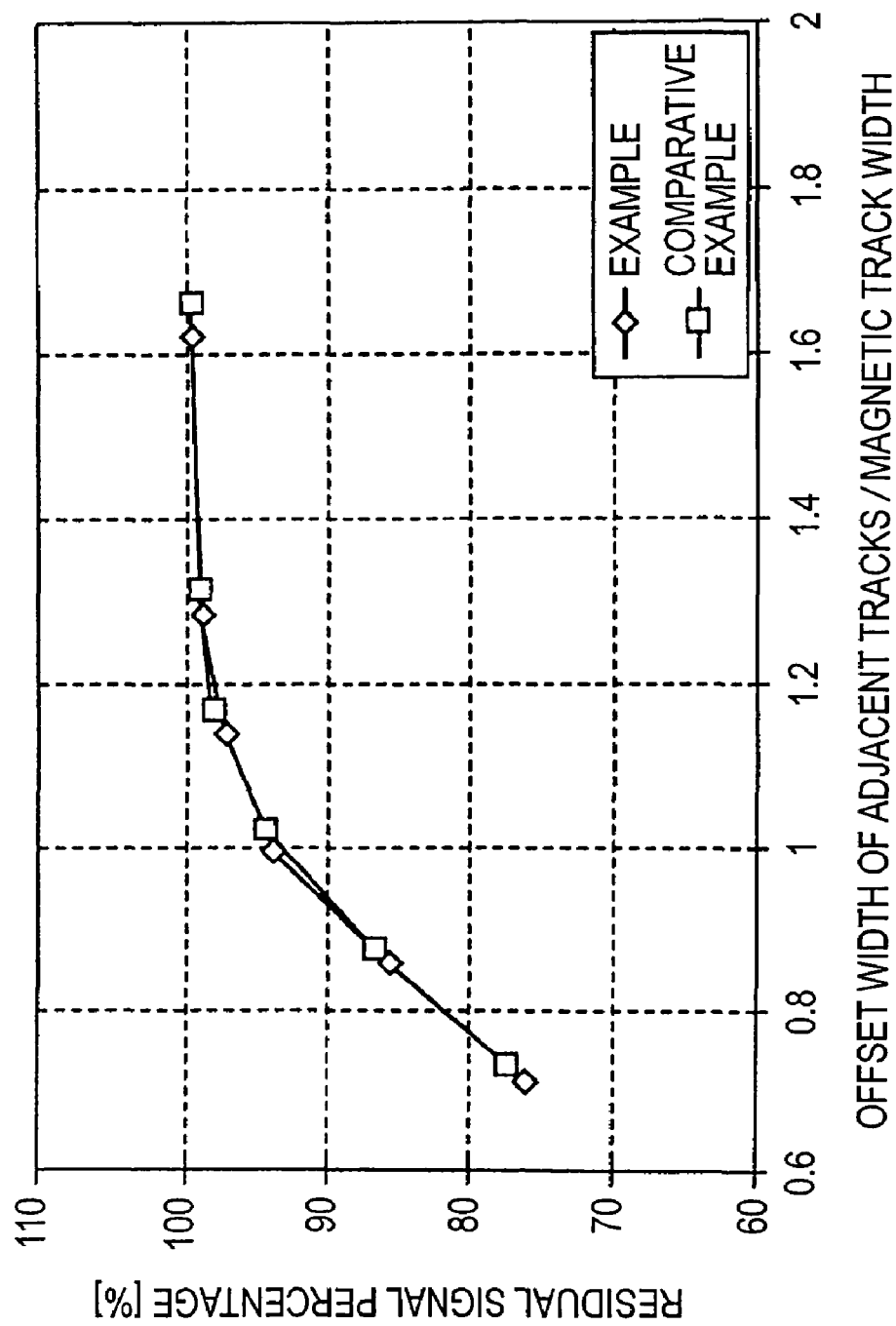
FIG. 13 is a graph showing a comparison of residual signal percentages between Example and Comparative example.
Figure 14:
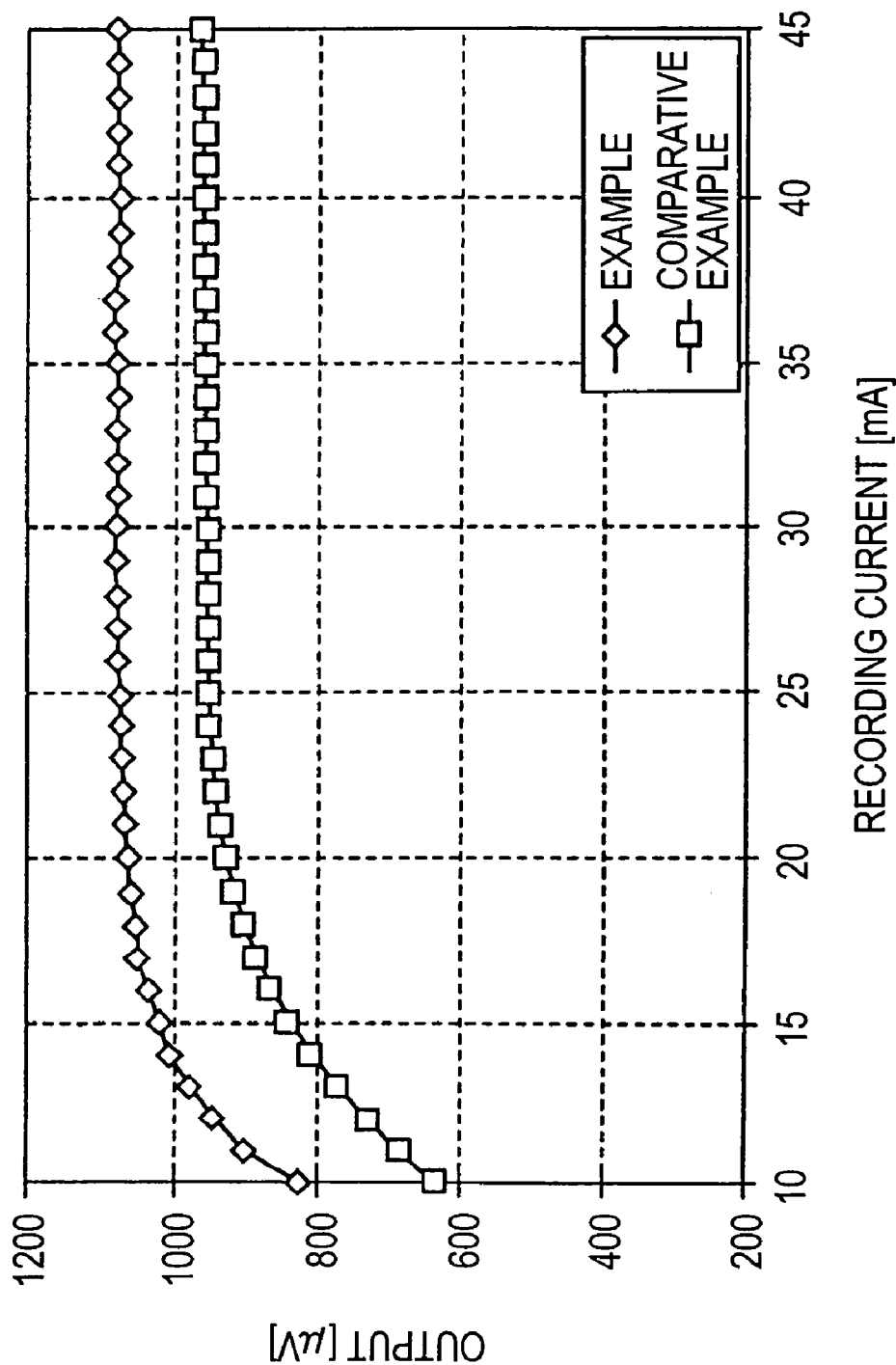
FIG. 14 is a graph showing a comparison of outputs between Example and the above-described Comparative example.
Figure 15:
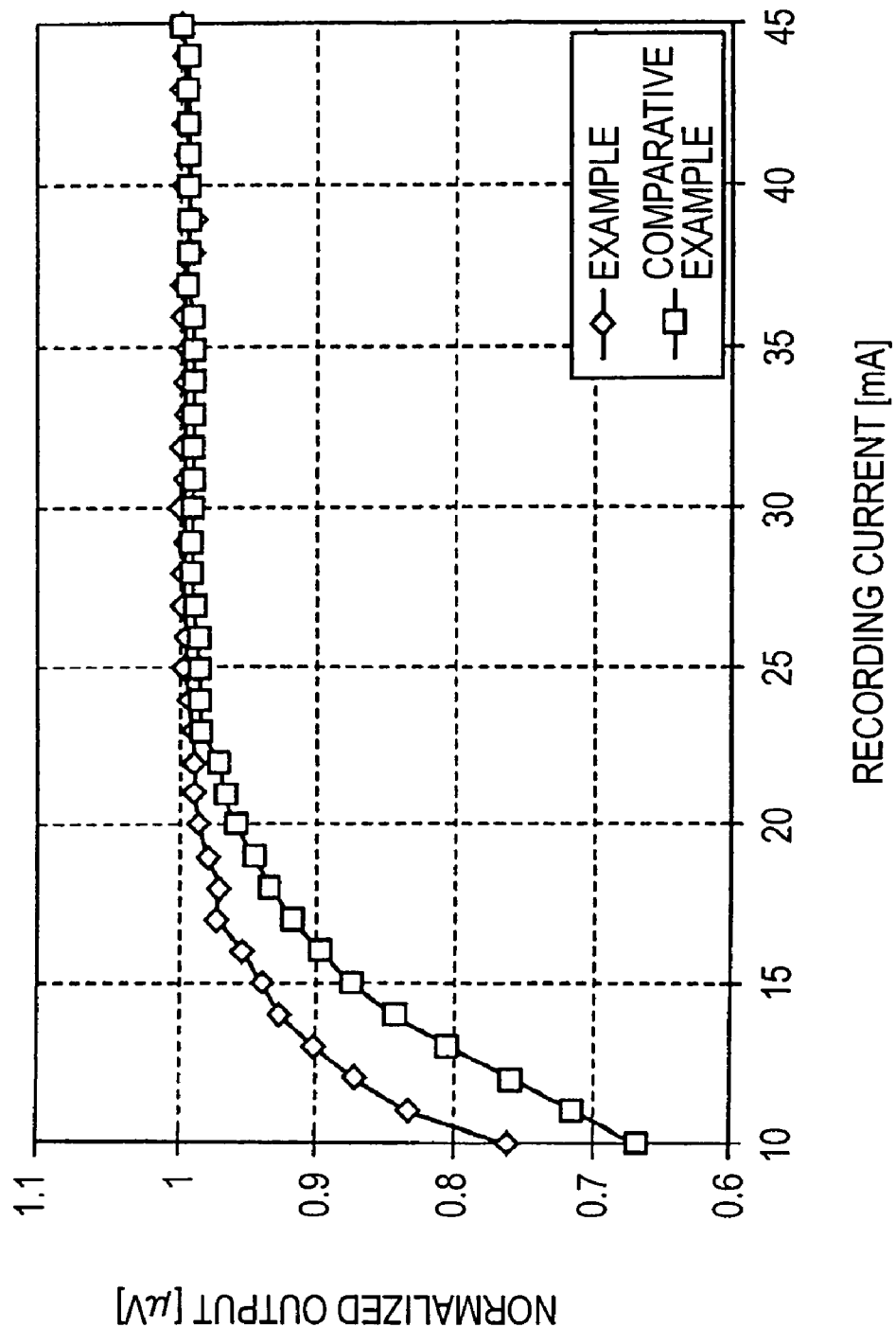
FIG. 15 is a graph in a normalized form of the graph shown in FIG. 14, where the output at saturation magnetization is assumed to be 1.
Figure 16:
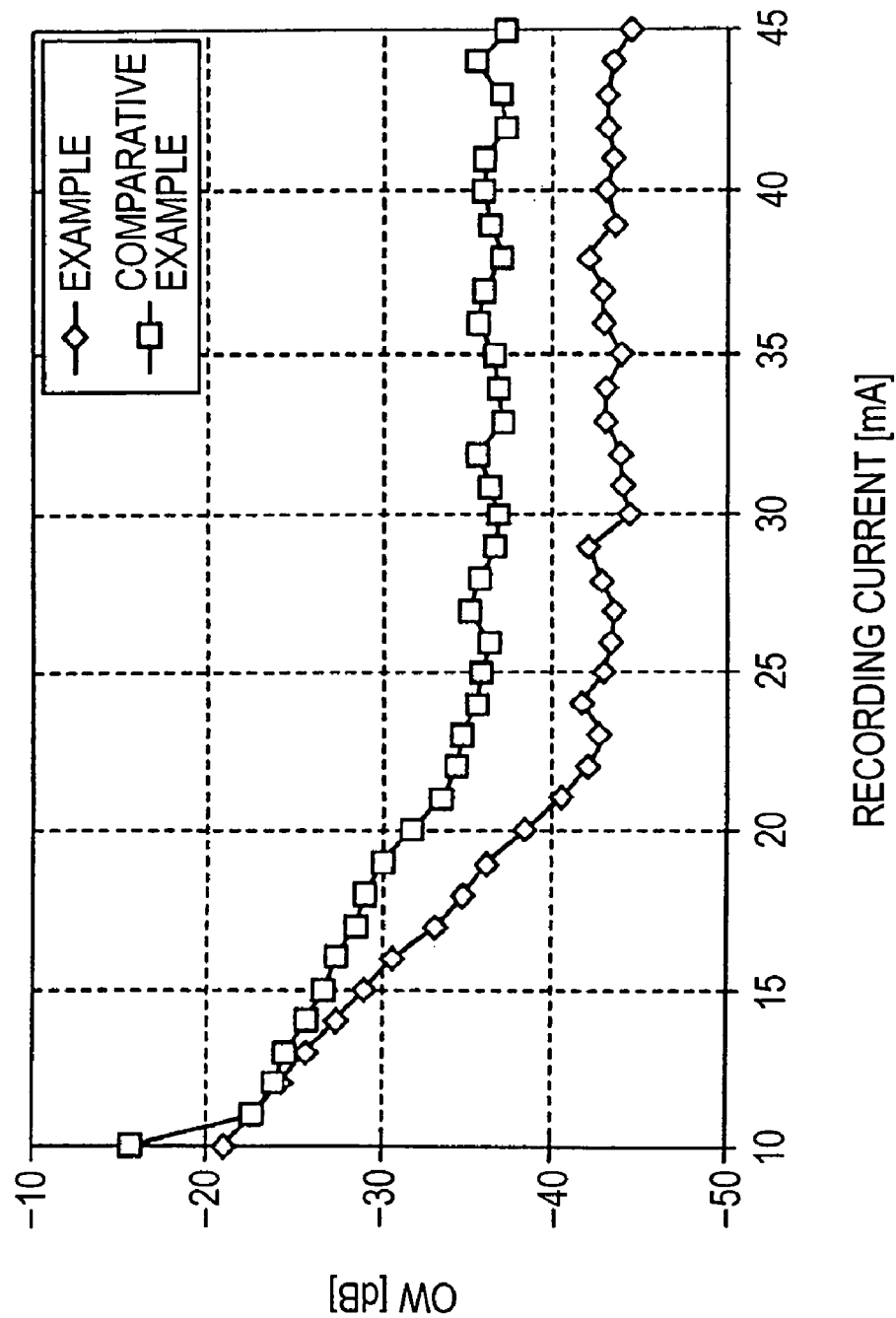
FIG. 16 is a graph showing overwrite properties of Example and the above-described Comparative example.

FIG. 13 is a graph showing a comparison of residual signal percentages between Example of the present invention and Comparative example. FIG. 14 is a graph showing a comparison of outputs between the above-described Example and the above-described Comparative example. FIG. 15 is a graph in a normalized form of the graph shown in FIG. 14, where the output at saturation magnetization is assumed to be 1. FIG. 16 is a graph showing overwrite properties of the above-described Example and the above-described Comparative example. In FIG. 16, the vertical axis indicates "OW (dB)" determined based on "OW=20×log(signal intensity after overwrite/signal intensity before overwrite)".

In the above-described Example, a yoke layer composed of a first layer and a second layer was disposed on the downward direction side (Z2 direction side shown in FIG. 17) of the main magnetic pole layer 24 of the perpendicular magnetic recording head H5 shown in FIG. 17, and an auxiliary magnetic pole layer was further disposed on the upward direction side thereof (Z1 direction side shown in the drawing). A front-end surface of the above-described first layer was disposed at a position 0.2 μm behind the facing-surface opposed to a recording medium in a height direction (that is, the recess was 0.2 μm). The above-described second layer was disposed at a position 2 μm behind the facing-surface opposed to the recording medium in a height direction (that is, the recess was 2 μm). The film thickness of the first layer was set at 0.1 μm, and the film thickness of the second layer was set at 1.0 μM.

On the other hand, the above-described Comparative example had a structure in which the second layer was disposed alone under the main magnetic pole layer while the first layer was not included in the structure of the above-described Example. In this Comparative example as well, the recess of the second layer was set at 2 µm and the film thickness was set at 1.0 µm.

In both Example and Comparative example, the film thicknesses of the main magnetic pole layers were set at 0.25 µm.

The residual signal percentage shown in FIG. 13 is determined by applying a recording magnetic field (current 45 mA, frequency 60 KFCI) to a recording medium so as to form a recording track, applying an erasing magnetic field (current 45 mA, frequency 65 KFCI) beside the recording track so as to form an erase track, and measuring a residual signal percentage (%) of the above-described recording track. The horizontal axis indicates an "offset width of adjacent tracks" 0 referring to the center-to-center distance between the recording track and the erase track divided by a magnetic track width Tw so as to normalize. The coercive force (Hc) of the main magnetic pole layer was set at 4,500 Oe, and erasing was conducted 5,000 times.

The output (µV) shown in FIG. 14 and FIG. 15 is a measurement value when a recording magnetic field is applied at a current indicated by the horizontal axis and a frequency of 60 KFCI.

As shown in FIG. 13, the residual signal percentages of Example and Comparative example are substantially equal in spite of the fact that the recess of the first layer constituting the yoke layer in Example is smaller than the recess of the second layer constituting the yoke layer of Comparative example. Therefore, it is clear that even when the recess is reduced, Example exhibits side fringing properties equivalent to side fringing properties in Comparative example having the large recess.

On the other hand, as is clear from FIG. 14, when outputs are compared, the output in Example is higher than the output in Comparative example. As is clear from FIG. 15, the output in Example tends to be maintained at a high value even when the recording current is reduced, as compared with that in Comparative example.

Furthermore, as is clear from FIG. 16, good overwrite properties are exhibited in Example as compared with that in Comparative example, since larger absolute values are exhibited in Example as a whole.

That is, as is clear from FIG. 13 to FIG. 16, even when the recess is reduced in Example, the side fringing properties can be controlled at a comparable level, and the output and the overwrite properties can be maintained at good levels.

What is claimed is:

1. A perpendicular magnetic recording head for recording magnetic data on a recording medium, the perpendicular magnetic recording head comprising a first magnetic portion, a second magnetic portion disposed leaving a space to the first magnetic portion, and a coil layer which is disposed in the space between the first magnetic portion and the second magnetic portion and which applies a recording magnetic field to the first magnetic portion and the second magnetic portion, wherein a yoke layer is disposed in contact with the second magnetic portion, and a width dimension in a direction orthogonal to a height direction of a front end of the yoke layer is increased stepwise or continuously toward a rear of the yoke layer in the height direction and is increased stepwise or continuously in a direction farther from the second magnetic portion, wherein a saturation magnetic flux density of the yoke layer increases with increasing proximity to the second magnetic portion.

2. The perpendicular magnetic recording head according to claim 1, wherein the yoke layer includes a region having a film thickness dimension increasing stepwise or continuously toward the rear in the height direction.

3. The perpendicular magnetic recording head according to claim 1, wherein the yoke layer has a magnetic permeability larger than that of the second magnetic layer.

4. The perpendicular magnetic recording head according to claim 1, wherein the second magnetic portion is disposed in a side nearer to a leading edge than is the first magnetic portion.

5. The perpendicular magnetic recording head according to claim 1, wherein the second magnetic portion is disposed in a side nearer to a trailing edge than is the first magnetic portion.

* * * * *